United States Patent
Yamahara et al.

(10) Patent No.: US 8,115,405 B2
(45) Date of Patent: Feb. 14, 2012

(54) HIGH PRESSURE DISCHARGE LAMP LIGHTING DEVICE AND LUMINAIRE USING SAME

(75) Inventors: Daisuke Yamahara, Shijonawate (JP); Nobutoshi Matsuzaki, Neyagawa (JP); Takeshi Kamoi, Kyoto (JP); Satoru Nagata, Kobe (JP); Naoki Komatsu, Kobe (JP); Jun Kumagai, Himeji (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 341 days.

(21) Appl. No.: 12/585,773

(22) Filed: Sep. 24, 2009

(65) Prior Publication Data
US 2010/0072913 A1    Mar. 25, 2010

(30) Foreign Application Priority Data

Sep. 24, 2008   (JP) ................................. 2008-244949
Sep. 24, 2008   (JP) ................................. 2008-244950

(51) Int. Cl.
*H05B 37/00*    (2006.01)
*H05B 39/00*    (2006.01)
*H05B 41/14*    (2006.01)
*H05B 37/02*    (2006.01)
*H05B 39/04*    (2006.01)
*H05B 41/36*    (2006.01)
*H05F 1/00*     (2006.01)

(52) U.S. Cl. .......................... 315/276; 315/291; 315/287
(58) Field of Classification Search .................... 315/82, 315/246, 247, 291, 287, 276
See application file for complete search history.

(56) References Cited

U.S. PATENT DOCUMENTS

2011/0037406 A1*    2/2011   Matsuzaki et al. ............. 315/276
* cited by examiner

*Primary Examiner* — Jacob Y Choi
*Assistant Examiner* — Henry Luong
(74) *Attorney, Agent, or Firm* — Bacon & Thomas, PLLC

(57) ABSTRACT

A high pressure discharge lamp lighting device includes a DC power source circuit; a power supply circuit for converting an output from the DC power source circuit into a square wave AC output to be supplied to a high pressure discharge lamp; a starting circuit for applying a high voltage output for lamp startup to the high pressure discharge lamp; a control circuit; and a half-wave discharge detection circuit for detecting a half-wave discharge. The detection circuit detects the half-wave discharge at an initial stage of the lamp startup and the control circuit controls the magnitude of a voltage of a square wave half period of one polarity having a load voltage of a larger magnitude and that of a square wave half period of the other polarity having a load voltage of a smaller magnitude to approximate to each other.

42 Claims, 55 Drawing Sheets

HIGH PRESSURE DISCHARGE LAMP LIGHTING DEVICE AND LUMINAIRE USING SAME

FIELD OF THE INVENTION

The present invention relates to a high pressure discharge lamp lighting device and a luminaire using the same.

BACKGROUND OF THE INVENTION

Although a high pressure discharge lamp is widely used as a lamp with high luminance and high light output, a lighting device called a stabilizer, which is a kind of discharge lamp, is required for stable lighting. The lighting device mainly includes a copper-iron type consisting of an inductance and an electronic type using the switching control of an electronic circuit. In recent years, the electronic type has been increasingly speeded in view of power saving.

CONVENTIONAL EXAMPLE 1

FIG. 48 shows an example of a high pressure discharge lamp lighting device of an electronic type. This high pressure discharge lamp lighting device includes a rectifier DB connected to a commercial AC power source 1 for rectifying an AC voltage thereof; a DC power source circuit 2 for receiving the voltage rectified by the rectifier DB as an input and outputting a DC voltage Vdc; an inverter circuit 4 for converting the DC voltage Vdc into a square wave AC voltage and applying it to a high pressure discharge lamp DL; a starting circuit 5 for generating a high voltage to start and restart the high pressure discharge lamp DL; a detection circuit unit 6 for detecting a state of the high pressure discharge lamp DL; a control circuit 7 for controlling switching elements Q3 to Q6 of the inverter circuit 4; and a control circuit 9 for controlling the switching element Q1 of the DC power source circuit 2.

The detection circuit unit 6 is provided with a detection circuit 6a for detecting a voltage applied to both ends of the high pressure discharge lamp DL and a half-wave discharge detection unit 6b for receiving an output of the detection circuit 6a and detecting the presence or absence of a half-wave discharge state.

The control circuit 7 is provided with a lighting decision unit 7a for deciding between lighting and unlighting of the high pressure discharge lamp DL based on a detection result of the detection circuit unit 6; a switch circuit 7b for receiving a lighting decision signal of the lighting decision unit 7a and switching the operation of the inverter circuit 4 to a first operating state for generating a high voltage for the startup of the high pressure discharge lamp DL and a second operating state for stably lighting the high pressure discharge lamp DL, and an arithmetic circuit 7c for receiving the detection result of the detection circuit unit 6 to determine the chopping frequency and ON period of the switching elements Q5 and Q6. An output of the arithmetic circuit 7c passes through the switch circuit 7b and then controls each of the switching elements Q3 to Q6 during the second operating state.

The control circuit 9 is provided with a Vdc detection circuit 9a for detecting an output voltage Vdc of the DC power source circuit 2; and a Q1 control circuit 9b for controlling the switching element Q1 based on a detection result of the Vdc detection circuit 9a.

FIG. 49 shows the waveforms of the respective parts of the high pressure discharge lamp lighting device of FIG. 48. An operation from the inputting of a commercial AC power 1 to the stable lighting of the high pressure discharge lamp DL is shown therein, and the AC voltage Vs of the commercial AC power source 1, the output voltage Vdc of a step-up chopper circuit serving as the DC power source circuit 2, the both-end voltage Vo of the high pressure discharge lamp, e.g., high-intensity discharge lamp (HID lamp) DL; the lamp current Io, the output of the lighting decision unit 7a, and the operating states of the switching elements Q3 to Q6 are shown from the top.

When a commercial AC power source 1 is input, the DC power source circuit 2 keeps the DC voltage Vdc constant at a predetermined value both during unlighted state of the high pressure discharge lamp DL is not lighted and during lighted state of the high pressure discharge lamp DL is lighted by allowing the control circuit 9 to turn the switching element Q1 on and off at several 10 kHz and properly control the pulse width depending on the DC voltage Vdc. Also, the DC power source circuit 2 functions to improve the input power factor from the commercial AC power source 1 and suppress input current distortion.

When the DC voltage Vdc reaches a predetermined value, the inverter circuit 4 starts operation thereof. At this period of time, the high pressure discharge lamp DL is in an unlighted state, which is equivalent to an open state, and thus the high pressure discharge lamp DL is in a high impedance state whose equivalent impedance is close to infinity. At this time, the inverter circuit 4 starts operation thereof in the first operating state for starting the high pressure discharge lamp DL, and the ON state of the switching elements Q3 and Q6 and the ON state of the switching elements Q4 and Q5 are alternately repeated at a predetermined frequency f0 (about several 100 kHz).

The frequency f0 is a frequency which is close to a resonance frequency fr of a serial resonance circuit including a primary coil N1 of a pulse transformer L3 and a capacitor C3, wherein a high voltage of sine wave is generated in the primary coil N1. The high voltage of sine wave generated in the primary coil N1 is stepped up by the winding ratio between the primary coil N1 and secondary coil N2 of the pulse transformer L3, and applied to the high pressure discharge lamp DL through a capacitor C2. As a result, the high pressure discharge lamp DL dielectrically breaks down and is started up.

When the high pressure discharge lamp DL is started up, the high pressure discharge lamp DL becomes a low impedance state close to a short circuit, and the both-end voltage Vo of the high pressure discharge lamp DL is reduced to approximately 0 V. If the both-end voltage Vo of the high pressure discharge lamp DL is below a threshold value of a lighting decision voltage, the lighting decision unit 7a decides that the high pressure discharge lamp DL is lighted, and then an output signal of the lighting decision unit 7a changes from H level to L level and is input to the switch circuit 7b of the control circuit 7. The switch circuit 7b receives this signal and switches the operation of the inverter circuit 4 to the second operating state for stably lighting the high pressure discharge lamp DL.

During the second operating state of the inverter circuit 4, the switching elements Q3 and Q4 are alternately turned on and off at a predetermined frequency fa (about several hundreds of Hz). At this time, the switching elements Q5 and Q6 repeat an operation in which the switching element Q6 is turned on and off at a predetermined frequency fb (about several tens of kHz) during an ON period of the switching element Q3 and the switching element Q5 is turned on and off at the predetermined frequency fb (about several tens of kHz) during an ON period of the switching element Q4. By this polarity inverting type step-down chopper operation, the square wave AC voltage of the frequency fa is applied to the high pressure discharge lamp DL. At this time, the capacitor C2 and an inductor L2 function as a filter circuit of a step-down chopper circuit, and reverse parallel diodes incorporated in the switching elements Q5 and Q6 function as regenerative current carrying diodes of the step-down chopper circuit.

The both-end voltage of the high pressure discharge lamp DL is low right after the startup of the lamp, and increased as the voltage and temperature in the lamp become higher, and then the high pressure discharge lamp DL is becomes a stable lighting state when a rate value is reached.

The control circuit 7 detects a state of the high pressure discharge lamp DL by the detection circuit 6a, and properly controls the chopping frequency or ON period of the switching elements Q5 and Q6 by the arithmetic circuit 7C based on the both-end voltage of the high pressure discharge lamp DL so that an appropriate power is supplied to the high pressure discharge lamp DL and the high pressure discharge lamp DL is stably lighted.

In the conventional example, in a startup process, a half-wave discharge detecting function is stopped in order to prevent error detection. Thus, the detecting operation is started after the high pressure discharge lamp DL is shifted to a stable lighting state. If a half-wave discharge is detected, it is determined that an end stage of the life span of the high pressure discharge lamp DL has come, and thus the discharge lamp DL is shifted to a protecting operation for stopping or reducing the output of the lighting device.

CONVENTIONAL EXAMPLE 2

FIG. 50 shows an example of another high pressure discharge lamp lighting device. This lighting device includes a rectifier DB connected to a commercial AC power source 1 for rectifying an AC voltage thereof; a DC power source circuit 2 for receiving the voltage rectified by the rectifier DB as an input and outputting a DC voltage Vdc; a step-down chopper circuit 3 controlled to supply an appropriate power to the high pressure discharge lamp DL by using the DC voltage Vdc as a power source; an inverter circuit 4 for converting the DC output of the step-down chopper circuit 3 into a square wave AC voltage and applying it to the high pressure discharge lamp DL; and a starting pulse generating circuit for generating and applying a high voltage required for starting up the high pressure discharge lamp DL, and a control circuit for controlling the above components to operate properly.

Details of the configuration of the starting pulse generating circuit will be described. The starting pulse generating circuit is provided with a pulse transformer PT whose secondary coil N2 is connected between an output of the inverter circuit 4 and the high pressure discharge lamp DL; a voltage response type switching element Q7 which is ON when the both-end voltage exceeds a predetermined value; a capacitor C7 connected in series between a primary coil N1 of the pulse transformer PT and the switching element Q7; and a resistor R7 connected in parallel to the switching element Q7 for controlling current for charging the capacitor Q7 when the switching element Q7 is off.

The configuration of the control circuit will be described. A half-wave discharge detection circuit unit 6, a lighting decision unit 7a, and a power factor improvement control circuit unit 9 may have the same configuration as FIG. 48. A step-down chopper output detection unit 7d detects an output voltage of the step-down chopper circuit 3, and a step-down chopper control circuit unit 8 controls the switching element Q2 to have a predetermined current depending on the output voltage of the step-down chopper circuit 3, to supply an appropriate power to the high pressure discharge lamp DL. A polarity inversion control circuit 7e performs switching control of the switching elements Q3 to Q6 of the inverter circuit 4.

Hereinafter, the operation of this circuit will be described with reference to the waveform diagram of FIG. 51. During unlighting of the high pressure discharge lamp DL, the step-down chopper circuit 3 outputs a DC voltage higher than the voltage of the high pressure discharge lamp DL during stable lighting to smoothly start up the high pressure discharge lamp DL, converts it into a square wave AC voltage by the inverter circuit 4, and applies it to the high pressure discharge lamp DL through the starting pulse generating circuit.

In the starting pulse generating circuit, the capacitor C7 is charged through the primary coil N1 of the pulse transformer PT and the resistor R7. Here, the sum of the output voltage of the inverter circuit 4 and a voltage Vc7 of the capacitor C7 is applied to the switching element Q7 of voltage response type. Meanwhile, if a value of the output voltage of the inverter circuit 4 is almost equal to a value of the output voltage of the step-down chopper circuit 3 and the output voltage of the step-down chopper circuit 3 is set to Vc2, when the square wave is stable, a voltage of $|Vc2|-|Vc7|$ is provided, thus failing to reach an on voltage of the switching element Q7 and turn on the switching element Q7. However, if the polarity of the square wave voltage is inverted, the voltage of the capacitor C7 does not change rapidly because the resistor R7 is connected thereto, and a voltage of $|Vc2|+|Vc7|$ is applied to the switching element Q7, thereby reaching the ON voltage of the switching element Q7 and turning on the switching element Q7.

Thus, a steep pulse current flows in the primary coil N1 of the pulse transformer N1, and a high voltage, which is a multiple of the voltage generated in the primary coil N1 by the winding ratio, is generated in the secondary coil N2 and applied to the high pressure discharge lamp DL by using the capacitor C2 connected to the output of the step-down chopper circuit 3 and the capacitor C7 of the starting pulse generating circuit as a power source, thereby dielectrically breaking down the high pressure discharge lamp DL.

When the high pressure discharge lamp DL is started up, the startup of the high pressure discharge lamp DL is detected by the lighting decision unit 7a, the output voltage of the step-down chopper circuit 3 is detected by the step-down chopper output detection unit 7d, the switching element Q2 is controlled to have a predetermined current depending on the output voltage by the step-down chopper control circuit unit 8, and an appropriate power having a rectangular waveform is supplied to the high pressure discharge lamp DL through the inverter circuit 4, thus stably lighting up the high pressure discharge lamp DL.

It is known that the high pressure discharge lamp DL is in a so-called 'half-wave discharge' state, which is one of abnormal conditions of the end stage of the life span, in which discharge is asymmetric as discharge is formed from one electrode only or discharge from one electrode is suppressed. In case of 'half-wave discharge', a normal lighting control cannot be performed, and thus there is a risk of abnormal heating of the high pressure discharge lamp lighting device or an increase of electrical stress on the electronic parts constituting the high pressure discharge lamp lighting device. Therefore, there is provided a high pressure discharge lamp lighting device which has the half-wave discharge detection circuit unit 6 installed therein and has a protection function for stopping an operation of a ballast when detecting a half-wave discharge of the high pressure discharge lamp DL.

FIG. 52 shows an operating diagram of a protection function by detection of a half-wave discharge in the high pressure discharge lamp lighting device of FIG. 50. A half-wave discharge phenomenon is detected by detecting variations of the output voltage of the step-down chopper circuit 3 by the half-wave discharge detection circuit unit 6 of FIG. 50. If a half-wave discharge is detected, power supply to the high pressure discharge lamp DL is stopped by stopping a control signal from the step-down chopper control circuit unit 8 to the switching element Q2.

In the conventional example, in a startup process, a half-wave discharge detecting function is stopped in order to prevent error detection. Thus, the detecting operation is started after the high pressure discharge lamp DL is shifted to a stable lighting state. If a half-wave discharge is detected, the discharge lamp DL is shifted to a protecting operation for stopping or reducing the output of the lighting device.

CONVENTIONAL EXAMPLE 3

FIG. 54 is a circuit diagram of a high pressure discharge lamp lighting device disclosed Japanese Patent Laid-open Application No. 2005-100829. To a DC power source circuit 2, a serial circuit of capacitors Ce1 and Ce2 and a serial circuit of switching elements Q5 and Q6 are connected in parallel. A serial circuit of an inductor L2 and a capacitor C2 is connected between a connection point of the capacitors Ce1 and Ce2 and a connection point of the switching elements Q5 and Q6. A high pressure discharge lamp DL is connected to both ends of the capacitor C2 through a secondary coil of a pulse transformer PT of a starting circuit 5. The switching elements Q5 and Q6 are composed of MOSFETs, and includes reverse parallel diodes therein. An auxiliary chopper circuit 9 consisting of a diode D9, a switching element Q9, and an inductor L9 is additionally provided.

FIG. 55 shows operation waveforms of the respective parts from an unlighted state to a lighted state. A control signal applied to the switching elements Q5, Q6, and Q9 has the operation waveforms shown in FIG. 55.

The on and off of the switching elements Q5 and Q6 is controlled through a driving circuit 72 by a control signal output from a control circuit 71. During stable lighting, in a first period T1, the switching element Q5 is turned on and off at a high frequency, and thus the switching element Q6 is turned off. In a second period T2, the switching element Q6 is turned on and off at a high frequency, and thus the switching element Q5 is turned off. The capacitors Ce1 and Ce2 have sufficiently large capacitance, and the voltage Vce1 of the capacitor Ce1 and the voltage Vce2 of the capacitor Ce2 are not varied in an alternating period of the periods T1 and T2. The voltage Vdc of the DC power source circuit 2 is divided by the capacitors Ce1 and Ce2, and thus Vdc=Vce1+Vce2. If the capacitances of the capacitors Ce1 and Ce2 are almost the same, Vce1#Vce2.

In the first period T1, when the switching element Q5 is turned on, current flows in the order of capacitor Ce1, switching element Q5, inductor L2, capacitor C2 (starting circuit 5 and high pressure discharge lamp DL) and capacitor Ce1. When the switching element Q5 is turned off, current flows in the order of inductor L2, capacitor C2 (starting circuit 5 and high pressure discharge lamp DL), capacitor Ce2, switching element Q6 (reverse parallel diode thereof) and inductor L2 by energy stored in the inductor L2.

In the second period T2, when the switching element Q6 is turned on, current flows in the order of capacitor Ce2, capacitor C2 (high pressure discharge lamp DL and starting circuit 5), inductor L2, switching element Q6 and capacitor Ce2. When the switching element Q6 is turned off, current flows in the order of inductor L2, switching element Q6 (reverse parallel diode thereof), capacitor Ce, capacitor C2 (high pressure discharge lamp DL and starting circuit 5) and inductor L2 by energy stored in the inductor L2. Therefore, during stable lighting, the voltage Vo of the high pressure discharge lamp DL becomes a square wave voltage having a low frequency shown on the right side (the periods T1 and T2 following the period T3) of FIG. 55.

During unlighted state of the high pressure discharge lamp DL, the starting circuit 5 generates a high pulse voltage for startup. An operation waveform during unlighted state during which the starting circuit 5 operates is shown on the left side (prior to the period T3) of FIG. 55. During unlighted state of the high pressure discharge lamp DL, the amplitude of the lamp voltage Vo is Vdc/2, to which a high pulse voltage is superposed, thereby reaching a peak voltage Vp.

In accordance with the third conventional example, during unlighted state and in a time period from the startup of the high pressure discharge lamp DL to a definite transition to arc discharge, only the switching element Q5 is turned on and off at a high frequency, and the switching element Q6 is kept off, thereby preventing a half-wave discharge by performing a DC startup (DC voltage input). If a half-wave discharge occurs when there is a transition from an unlighted state to a lighted state, current flows only in one direction in the discharge lamp DL. However, if only the switching element Q5 is turned on and off, current flowing only in one direction due to occurrence of half-wave discharge can be prevented, even though the discharge lamp DL may not be turned on.

As shown in the waveform of the lamp voltage Vo of FIG. 55, in a period from the startup of the lamp DL to a definite transition to arc discharge, the period T3 for several tens of seconds to several minutes is set, during which only the switching element Q5 is continuously turned on and off during unlighted state to thus stabilize the discharge, and thereafter the switching element Q6 is also turned on and off so as to be switched alternately with the switching element Q5.

In the period T3 for stabilizing the discharge, while the switching element Q5 is on, current I1 flows in the high pressure discharge lamp DL (and the capacitor C2) through the inductor L2 so that energy is stored in the inductor L2. When the switching element Q5 is off, the energy stored in the inductor L2 is emitted and current I1' flows in the high pressure discharge lamp DL (and the capacitor C2) through the capacitor Ce2, a reverse parallel diode of the switching element Q6, and the inductor L2. At this time, the energy emitted from the capacitor Ce1 is applied to the capacitor Ce2.

However, only the switching element Q5 is driven in the period T3 so that there is no path for emitting the energy stored in the capacitor Ce2 when a DC startup is carried out, thus only leading to the storage of a voltage in the capacitor Ce2. Consequently, an auxiliary chopper circuit 9 indicated in dotted line is installed in the circuit of FIG. 54 to provide an emission path of the energy to be charged in the capacitor Ce2.

By adding the auxiliary chopper circuit 9 shown in FIG. 54, if a voltage stored in the capacitor Ce2 exceeds a predetermined value, the switching element Q9 is turned on, and the energy charged in the capacitor Ce2 is discharged and stored in the inductor L9 through the switching element Q9. Next, when the switching element Q9 is turned off, the energy stored in the inductor L9 is emitted and charged in the capacitor Ce1 through the diode D9. At this time, the switching element Q9 is turned on and off at a high frequency. As a result, the energy stored in the capacitor Ce2 can be emitted, and an overvoltage application can be prevented.

It is known that a 'half-wave discharge' phenomenon occurs not only in the above-mentioned end stage of the lifespan, but also during the startup of the high pressure discharge lamp DL. FIGS. 53A to 53C show waveforms illustrating 'half-wave discharge' occurring during startup, in which FIG. 53A shows a waveform illustrating one example of 'half-wave discharge' during startup in the first conventional example (the circuit of FIG. 48), FIGS. 53B and 53C show waveforms illustrating one example of 'half-wave discharge' during startup in the second conventional example (the circuit of FIG. 50), FIGS. 53A and 53B represent transition to discharge to a typical full wave after the duration of the half-wave discharge, and FIG. 53C represents a continuing half-wave discharge.

'Half-wave discharge' arises because the cathode electrode from which electrons are emitted towards anode electrode cannot transit from glow discharge to arc discharge, and is caused by instability of thermal electron emission from the cathode electrode. The causes thereof may be low electrode temperature, adhesion of impurities, or the like.

'Half-wave discharge' during startup is a phenomenon which occurs during a process leading to normal lighting as shown in FIGS. 53A and 53B. Thus, if the protection function for stopping the operation of a ballast by detection by the aforementioned half-wave discharge detection circuit unit 6 is operated, there occurs a failure that the high pressure discharge lamp DL is not lighted. Therefore, the aforementioned function of protection is stopped for a predetermined time period from the startup of the high pressure discharge lamp DL.

Japanese Patent Laid-open Application No. 2005-100829 discloses the high pressure discharge lamp lighting device as shown in FIGS. 54 and 55, and also discloses a technique in which half-wave discharge is prevented by controlling the switching elements such that a DC voltage is applied in the period T3 from the startup of the high pressure discharge lamp DL to a secure transition to arc discharge, but the number of parts increases because of the addition of the auxiliary chopper circuit 9. Further, once a DC voltage is applied and there is a definite transition to arch discharge, the temperature of the arc tube of the high pressure discharge lamp increases and electrons are easily emitted from both of the electrodes, thus making transition to stable lighting easier. However, under a condition in which a DC voltage is applied, one electrode is fixed as an anode and the opposite electrode is fixed as a cathode, and thus a difference is easily generated between the states of both electrodes depending on the duration of the DC voltage. Moreover, a DC voltage application time for securely suppressing the occurrence of half-wave discharge is varied depending on the type or state of the high pressure discharge lamp, so it is very difficult to properly set the DC voltage application time.

Additionally, if 'half-wave discharge' continues, a difference is generated between the states of both electrodes and it is difficult to make a transition to stable discharge of a full wave. Further, a vapor pressure inside the arc tube of the high pressure discharge lamp increases due to arc discharge at one side, and it is also difficult to maintain 'half-wave discharge'. Although the high pressure discharge lamp returns to the unlighted state because extinguishing occurs, the inside of the arc tube has a high temperature and high pressure. Thus, it is necessary to wait until the lowering of the temperature and pressure in the arc tube to enter a so-called restart mode and start up the high pressure discharge lamp again and it takes time to start up the high pressure discharge lamp.

SUMMARY OF THE INVENTION

In view of the above, the present invention provides a high pressure discharge lamp lighting device which can quickly shift to an appropriate discharge of a full wave in the event of a half-wave discharge during startup of a high pressure discharge lamp.

In accordance with a first aspect of the present invention, there is provided a high pressure discharge lamp lighting device, including: a DC power source circuit; a power supply circuit for converting an output from the DC power source circuit into a square wave AC output to be supplied to a high pressure discharge lamp; a starting circuit for applying a high voltage output for lamp startup to the high pressure discharge lamp; a control circuit for controlling the DC power source circuit, the power supply circuit and the starting circuit; and a half-wave discharge detection circuit for detecting a half-wave discharge in which load voltages or load currents of two half periods of two different polarities of the square wave AC output are asymmetric with each other. The half-wave discharge detection circuit detects the half-wave discharge at an initial stage of the lamp startup from dielectric breakdown of the high pressure discharge lamp until a lamp voltage of the high pressure discharge lamp approximates a rated lamp voltage, and judges that the half-wave discharge has occurred, if it is detected that the absolute value of a load voltage difference or a load current difference of the two different polarities is larger than a maximum variation of a load voltage difference or a load current difference of the two different polarities of the square wave AC output during normal lighting of the discharge lamp. Further, the control circuit adjusts the output of each of at least one of the DC power source circuit, the power supply circuit, and the starting circuit if the half-wave discharge detection circuit detects the half-wave discharge, thereby controlling the magnitude of a voltage of a square wave half period of one polarity having a load voltage of a larger magnitude and that of a square wave half period of the other polarity having a load voltage of a smaller magnitude to approximate to each other.

In accordance with a second aspect of the present invention, there is provided a high pressure discharge lamp lighting device, including: a DC power source circuit; a power supply circuit for converting an output from the DC power source circuit into a square wave AC output to be supplied to a high pressure discharge lamp; a starting circuit for applying a high voltage output for lamp startup to the high pressure discharge lamp; a control circuit for controlling the DC power source circuit, the power supply circuit and the starting circuit; and a half-wave discharge detection circuit for detecting a half-wave discharge in which load voltages or load currents of two half periods of two different polarities of the square wave AC output are asymmetric with each other. The half-wave discharge detection circuit detects the half-wave discharge at an initial stage of startup from dielectric breakdown of the high pressure discharge lamp until a lamp voltage of the high pressure discharge lamp approximates a rated lamp voltage, and judges that a half-wave discharge condition has occurred, if the absolute value of a load voltage difference or a load current difference of the two different polarities is larger than a maximum variation of a load voltage difference or a load current difference of the two different polarities of the square wave AC output during normal lighting of the discharge lamp. Further, if the half-wave discharge detection circuit detects the half-wave discharge, the control circuit turns off the high pressure discharge lamp for a predetermined time period and then restarts the lamp, and wherein when restarting the lamp, the control circuit adjusts the output of each of at least one of the DC power source circuit, the power supply circuit, and the starting circuit, thereby controlling the magnitude of a voltage or a current of a square wave half period of one polarity having a load voltage of a larger magnitude to approximate to that of a square wave half period of the other polarity having a load voltage of a smaller magnitude.

In accordance with a third aspect of the present invention, there is provided a luminaire including one of the high pressure discharge lamp lighting device of the first and the second aspect of the present invention.

In accordance with the present invention, the half-wave discharge detection circuit decides that a half-wave discharge phenomenon has occurred, at an initial stage of startup from dielectric breakdown of the high pressure discharge lamp until reaching an approximate rated lamp voltage of the high pressure discharge lamp, if it is detected that an absolute value of a voltage difference or current difference of the other polarity is larger than the maximum variation of a voltage difference or current difference of each half period of a square wave AC output during normal lighting.

The control circuit controls such that a voltage value of the square wave half period of a polarity having load voltage of larger magnitude and a voltage value of a square wave half period of a polarity having the load voltage of smaller magnitude are approximate to each other by adjusting the output of at least one of the DC power source circuit, the power supply circuit, and the starting circuit upon decision of a half-wave discharge by the half-wave discharge detection circuit, thereby making a transition to an operation of a half-wave improvement mode for facilitating a discharge from an electrode in a cathode period, and extinguishing the high pressure discharge lamp for a predetermined period.

Thereafter, when restarting, it is possible to prevent the duration of a half-wave discharge phenomenon in a startup process because a discharge from an electrode in a cathode period is facilitated by performing a half-wave improvement control to make a voltage value of a square wave half period of a polarity having the load voltage of larger magnitude and a voltage value of a square wave half period of a polarity having the load voltage of smaller magnitude approximate to each other by adjusting the output of at least one of the DC power source circuit, the power supply circuit, and the starting circuit. As a result, it is possible to make a quick transition to a stable lighting mode.

BRIEF DESCRIPTION OF THE DRAWINGS

The objects and features of the present invention will become apparent from the following description of preferred embodiments, given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Embodiment 1

Figure 1:
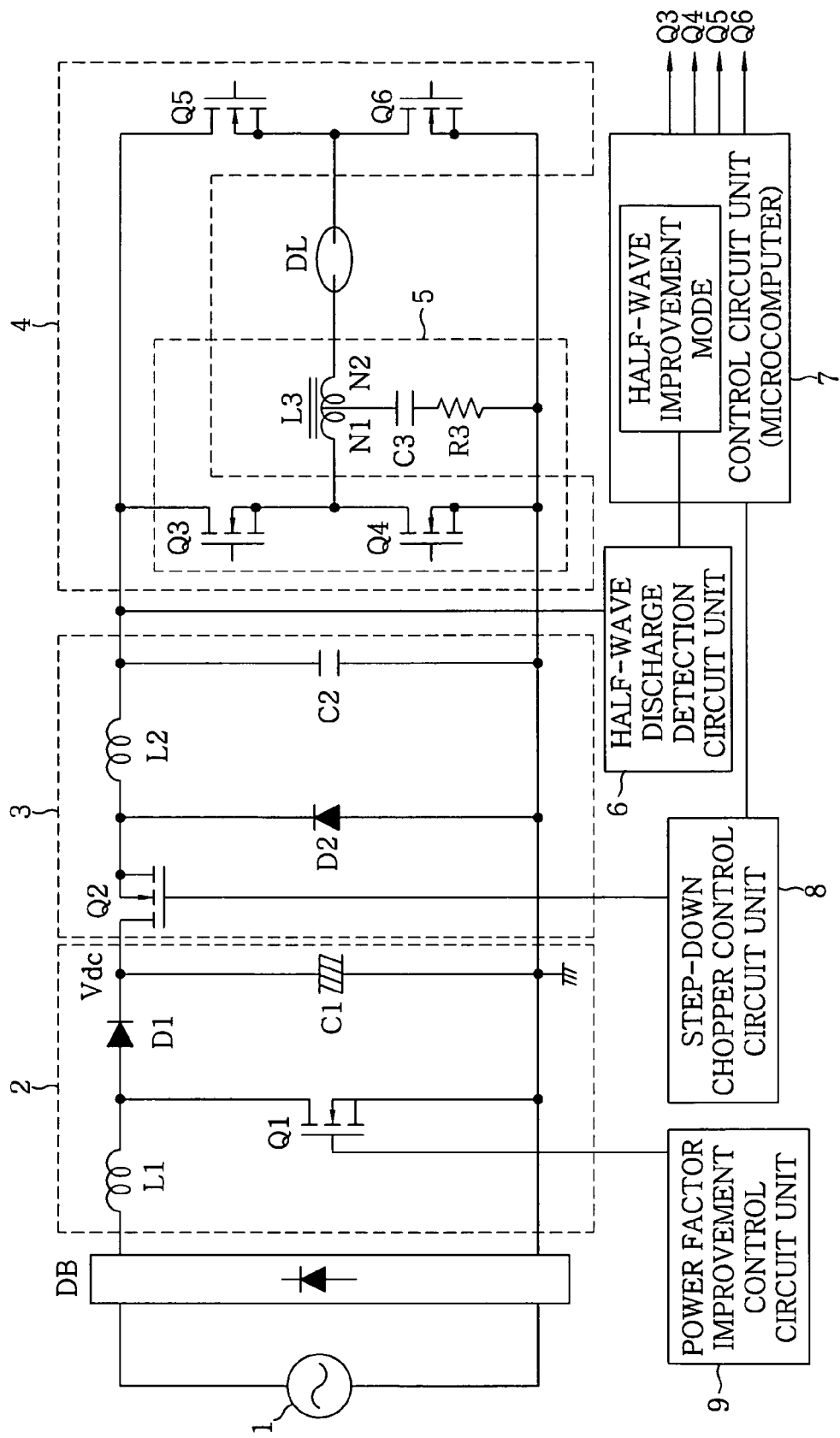
FIG. 1 is a circuit diagram of a first embodiment of the present invention of the present invention.

FIG. 1 shows a circuit diagram of a lighting device of a first embodiment of the present invention. An AC power source 1 is full-wave rectified by a rectifier DB, and converted into a DC voltage by a DC power source circuit 2. The DC power source circuit 2 is comprised of a step-up chopper circuit having an inductor L1, a switching element Q1, a diode D1, and a capacitor C1. The switching element Q1 of the DC power source circuit 2 is turned on and off at a high frequency by a power factor improvement control circuit unit 9. The power factor improvement control circuit unit 9 can be easily realized by using a commercially available integrated circuit (MC33262 or the like). Although not shown, current of the switching element Q1, current of the inductor L1, and input and output voltages of the DC power source circuit 2 are monitored by the power factor improvement control circuit unit 9, an AC input from the commercial AC power source 1 is converted into a predetermined DC voltage, and a power factor improvement control for giving resistance to the circuits is performed such that the phase of an input current and the phase of an input voltage are identical to each other.

A step-down chopper circuit 3 and an inverter circuit 4 serving as a power conversion circuit are connected to the output of the DC power source circuit 2. The step-down chopper circuit 3 includes a switching element Q2, a diode D2, an inductor L2, and a capacitor C2, is a circuit that outputs a DC voltage obtained by stepping down an input voltage, and is used as a stabilizer that adjusts power supplied to the high pressure discharge lamp DL by controlling on and off of the switching element Q2 by a PWM signal from a step-down chopper control circuit unit 8.

The inverter circuit 4 is a full-bridge circuit including switching elements Q3 to Q6. As the pair of the switching elements Q3 and Q6 and the pair of the switching elements Q4 and Q5 are alternately turned on at a low frequency of several tens to several hundreds of Hz by a control signal from a control circuit unit 7, the inverter circuit 4 supplies a square wave AC power to the discharge lamp DL. Further, upon startup, the switching elements Q3 and Q4 are alternately turned on at a high frequency of several tens to several hundreds of kHz which is near a resonance frequency of a resonant starting circuit 5 or a frequency near 1 of the integer part thereof, thereby supplying a high voltage for startup to the high pressure discharge lamp DL.

The resonant starting circuit 5 is comprised of a resonance step-up circuit including a pulse transformer L3 connected between one end of the high pressure discharge lamp DL and a connection point of the switching elements Q3 and Q4; a serial circuit of a capacitor C3; and a resistor R3 that are inserted between the center tap of the pulse transformer L3 and the ground.

The control circuit unit 7 detects a lamp voltage Vo and a lamp current Io of the high pressure discharge lamp DL by a detection unit (not shown), performs on and off control of the switching element Q2 based on detection results thereof, and performs control of the switching element Q2 of the step-down chopper circuit 3 and control of the switching elements Q3 to Q6 of the inverter circuit 4 to supply desired current or power to the high pressure discharge lamp DL. The control circuit unit 7 is configured by including a microcomputer for example.

The discharge lamp DL is a high-luminance and high pressure discharge lamp (HID), such as a metal halide lamp or a high-pressure mercury lamp.

A half-wave discharge detection circuit unit 6 detects a half-wave discharge state in a startup process, and switches the operation of the control circuit unit 7 to a half-wave improvement mode upon detection of the half-wave discharge state in the startup process.

In order for the high pressure discharge lamp DL to reach a stable lighting state from a no load (unlighted) state by using this circuit, the lighting device undergoes the three main processes as follows.

No load mode: The high pressure discharge lamp DL is in an unlighted state, and a resonance pulse voltage, which is generated by alternately turning on/off the switching elements Q3 and Q4 at near an LC resonance frequency (or 1 of the integer part of the resonance frequency) of a primary coil N1 of the pulse transformer L3 and the capacitor C3 constituting a resonance circuit, is stepped up by the winding ratio (N2/N1) of the pulse transformer L3 and applied between the lamp electrodes, thereby dielectrically breaking down the high pressure discharge lamp DL and making a transition to the startup mode.

Startup mode: When the high pressure discharge lamp DL dielectrically breaks down by a resonance pulse voltage, a transition to arc discharge through glow discharge is performed. In a process from the start of arc discharge to the stabilization of the temperature in the arc tube, the lamp voltage Vo gradually rises up to a stable voltage from several V over several minutes.

Stable lighting mode: Upon lapse of several minutes after the lighting of the high pressure discharge lamp DL, the temperature in the arc tube of the high pressure discharge lamp DL increases and becomes stable, and the lamp voltage Vo becomes almost constant and the lighting continues in this state.

However, there may occur a half-wave discharge which causes electron emission asymmetric in positive and negative periods between a pair of electrodes of the discharge lamp which is AC-lighted right after startup. This problem arises because one electrode in a cathode period cannot be shifted from glow discharge to arc discharge. In other words, this problem is caused by instable formation of bright spots of the electrodes, i.e., the instability of thermal electron emission. If this half-wave discharge state continues, the lamp may be extinguished, which acts as one of the factors that deteriorate the startability of the lamp.

Figure 2:
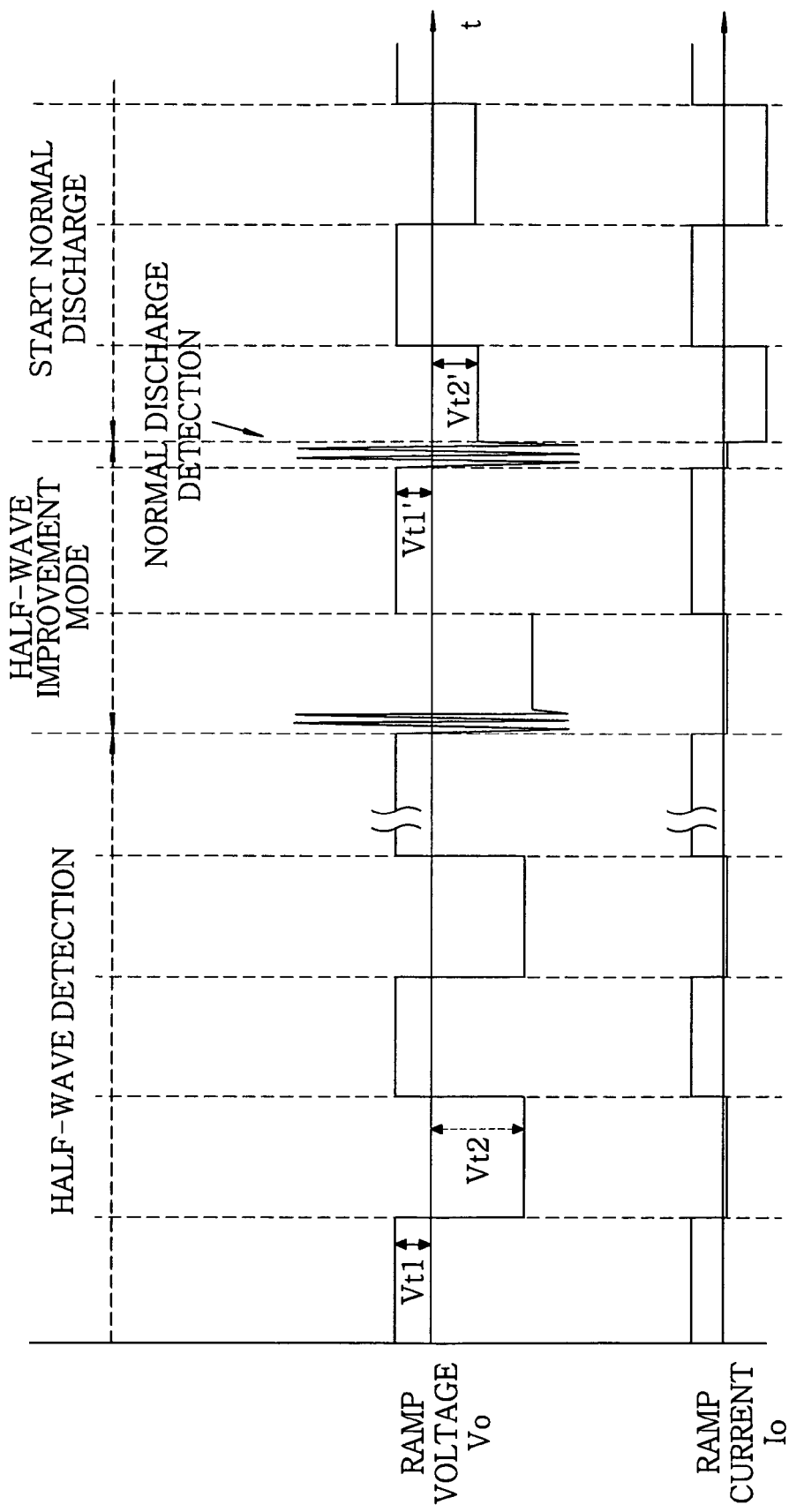
FIG. 2 is an operation waveform diagram of the first embodiment of the present invention.

In the present invention, as shown in the period of 'half-wave detection' of FIG. 2, the half-wave discharge detection circuit unit 6 detects that a half-wave discharge state continues for a predetermined time period, the half-wave discharge state consisting of a square wave half period (lamp voltage: Vt1) during which normal discharge occurs and a square wave half period (lamp voltage: Vt2) during which normal discharge does not occur, and the operation of the control circuit unit 7 is shifted to the half-wave improvement mode.

Here, as for the detection of half-wave discharge, it is judged that a half-wave discharge occurs when a voltage difference between a lamp voltage (absolute value) detected by the half-wave discharge detection circuit unit 6 during the turn-on of the switching elements Q3 and Q6 and a lamp voltage (absolute value) detected by the half-wave discharge detection circuit unit 6 during the turn-on of the switching elements Q4 and Q5 is above a predetermined decision threshold value. For example, if a difference between the lamp voltages of the positive and negative polarities during normal discharge is less than 20V, a decision threshold value of half-wave discharge detection is preferably set to 20 V.

Further, when a voltage difference higher than the decision threshold value of half-wave discharge detection is detected, relating to deciding which polarity normal discharge occurs and which polarity normal discharge does not occur, it may be appropriate to determine the higher one of the detected lamp voltages Vt1 and Vt2 as being the polarity where normal discharge does not occur.

In the half-wave improvement mode, as shown in FIG. 2, a high-frequency switching operation period is set before polarity inversion to the polarity where normal discharge does not occur (thermal electron emission does not occur). Thus, a resonance voltage is generated by using the starting circuit 5, like in the no load mode, and discharge is facilitated so that the high pressure discharge lamp DL can be quickly shifted to a stable lighting state. Depending on the half-wave improvement mode, if the formation of symmetric discharge in positive and negative periods is detected, the high pressure discharge lamp lighting device terminates the half-wave improvement mode and is controlled in a normal stable lighting mode.

As to whether a transition to a normal discharge is made, if a voltage difference between the detected lamp voltages Vt1' and Vt2' falls within the range of variations (for example, less than 20V) of a lamp voltage difference between the positive and negative polarities in a normal discharge, it can be determined that transition to normal discharge is made.

As described above, if the duration of a half-wave discharge state in the startup process of the high pressure discharge lamp is detected for a predetermined time period, a resonant operation is carried out again to cause discharge in the polarity where normal discharge does not occur, too, and the initiation of electric field emission is facilitated. Thus, an asymmetric discharge state of the high pressure discharge lamp is eliminated and the high pressure discharge lamp is quickly shifted to a stable lighting state, thereby realizing a high pressure discharge lamp lighting device with less startup failure and good startability.

Embodiment 2

Figure 3:
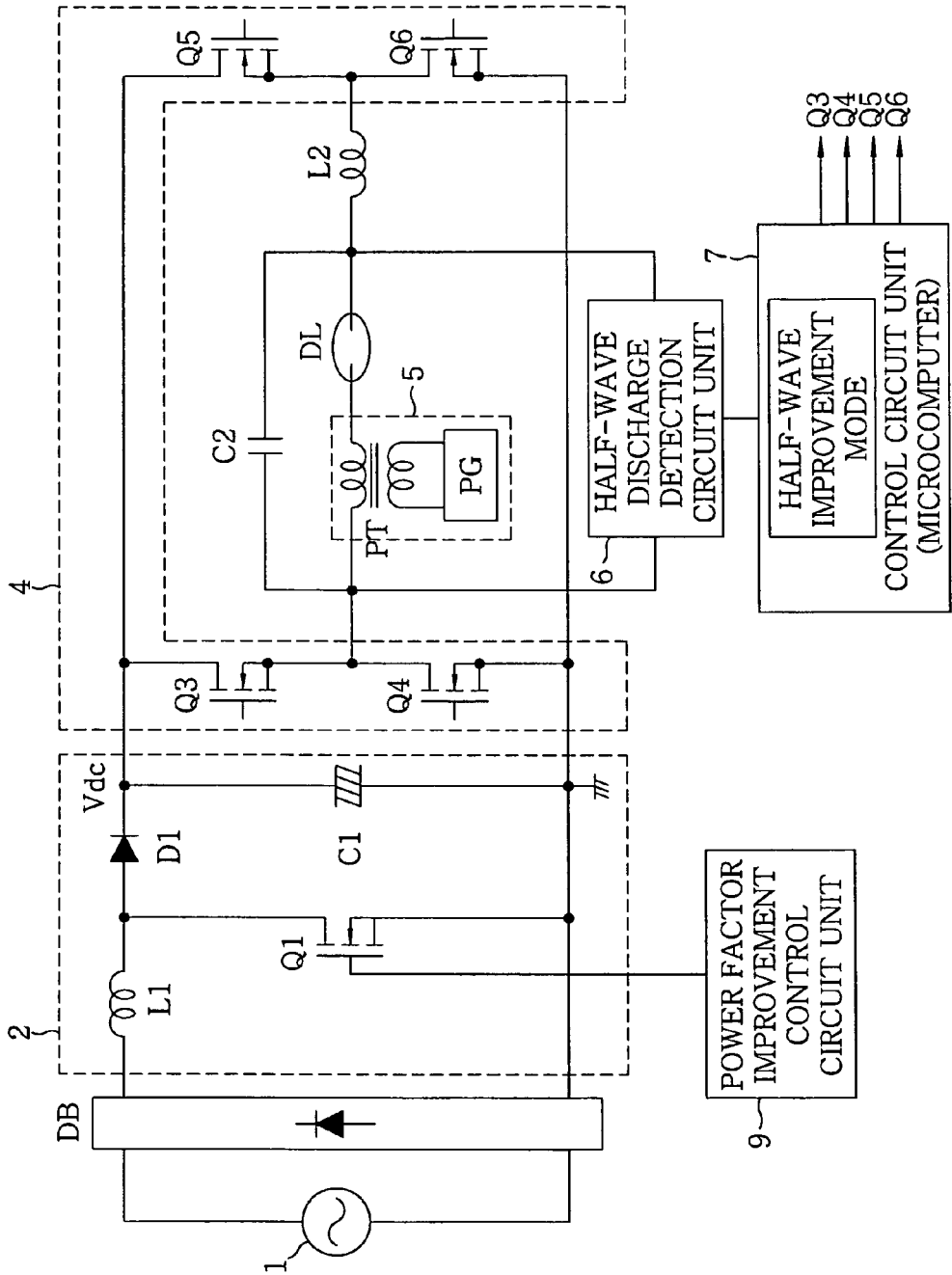
FIG. 3 is a circuit diagram of a second embodiment of the present invention.

FIG. 3 shows a circuit diagram of a lighting device of a second embodiment of the present invention. In this embodiment, the step-down chopper circuit 3 of FIG. 1 is omitted, and instead the switching elements Q3 and Q4 are driven at a low frequency and the switching elements Q5 and Q6 are driven at a high frequency to thus combine the functions of the step-down chopper circuit 3 and the inverter circuit 4 of the first embodiment in a single circuit. That is, during stable lighting, the switching elements Q3 and Q4 are alternately turned on and off at a low frequency, and the on/off operation of the switching element Q5 at a high frequency in the on period of the switching element Q4 and the on and off operation of the switching element Q6 at a high frequency in the on period of the switching element Q3 are alternated at a low frequency, thereby supplying a square wave voltage of a low frequency to the high pressure discharge lamp DL. Here, the inductor L2 and the capacitor C2 function as a low pass filter of the step-down chopper circuit. Further, reverse parallel diodes incorporated in the switching elements Q5 and Q6 function as regenerative current carrying diodes of the step-down chopper circuit.

As the starting circuit 5, a high voltage generation circuit including a combination of a pulse generator PG and a pulse transformer PT is used instead of the resonance step-up circuit of FIG. 1. The pulse generator PG is a circuit that generates a pulse voltage applied to the primary coil of the pulse transformer PT. Here, the pulse generator PG is a circuit capable of generating a startup pulse voltage at a given timing in response to a command from the control circuit unit 7. Regarding a concrete circuit configuration of the pulse generator PG, the pulse generator PG may have the same configuration as, e.g., the conventional example (FIG. 50) as long as it generates a pulse voltage right after polarity inversion, but the on and off of the switching element Q7 for generating a startup pulse is preferably controllable by the control circuit unit 7.

Further, the half-wave discharge detection circuit unit 6 detects a half-wave discharge state in a startup process, and switches the operation of the control circuit unit 7 to a half-wave improvement mode upon detection of the half-wave discharge state in the startup process.

In order for the high pressure discharge lamp DL to reach a stable lighting state from a no load (unlighted) state by using this circuit, the lighting device undergoes the three main processes as follows.

No load mode: The high pressure discharge lamp DL is in an unlighted state, and a pulse voltage generated by the pulse generator PG is stepped up by the pulse transformer PT and applied between the electrodes of the high pressure discharge lamp DL through the capacitor c2, thereby dielectrically breaking down the high pressure discharge lamp DL and making a transition to the startup mode.

Startup mode: When the high pressure discharge lamp DL dielectrically breaks down by a high pulse voltage, a transition to arc discharge through glow discharge is performed. In a process from the start of arc discharge to the stabilization of the temperature in the arc tube, the lamp voltage Vo gradually rises up to a stable voltage from several V over several minutes.

Stable lighting mode: Upon lapse of several minutes after the lighting of the high pressure discharge lamp DL, the temperature in the arc tube of the high pressure discharge lamp DL increases and becomes stable, and the lamp voltage Vo becomes almost constant and the lighting continues in this state.

However, there may occur a half-wave discharge which causes electron emission asymmetric in positive and negative periods between a pair of electrodes of the high pressure discharge lamp which is AC-lighted right after startup. This problem arises because one electrode in a cathode period cannot be shifted from glow discharge to arc discharge. In other words, this problem is caused by instable formation of bright spots of the electrodes, i.e., the instability of thermal electron emission. If this half-wave discharge state continues, the lamp may be extinguished, which acts as one of the factors that deteriorate the startability of the lamp.

Figure 4:
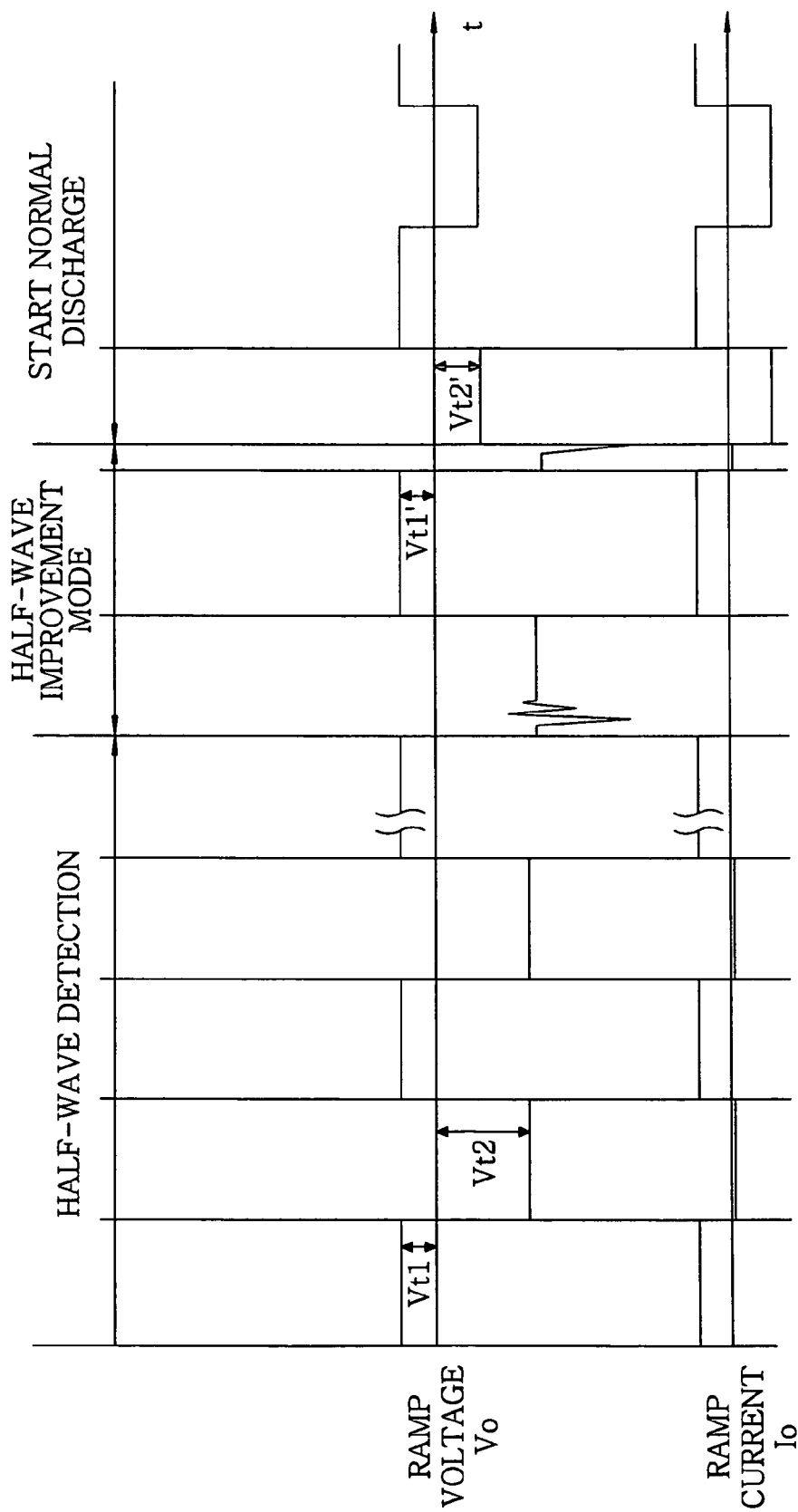
FIG. 4 is an operation waveform diagram of the second embodiment of the present invention.

In the present invention, as shown in the period of 'half-wave detection' of FIG. 4, the half-wave discharge detection circuit unit 6 detects that a half-wave discharge state continues for a predetermined time period, the half-wave discharge state consisting of a square wave half period (lamp voltage: Vt1) during which normal discharge occurs and a square wave half period (lamp voltage: Vt2) during which normal discharge does not occur, and then shifts to the half-wave improvement mode.

Here, as for the detection of half-wave discharge, it is decided that a half-wave discharge occurs when a voltage difference between a lamp voltage (absolute value) detected by the half-wave discharge detection circuit unit 6 during the turn-on of the switching element Q3 (during chopping of the switching element Q6) and a lamp voltage (absolute value) detected by the half-wave discharge detection circuit unit 6 during the turn-on of the switching element Q4 (during chopping of the switching element Q5) is above a predetermined decision threshold value. For example, if a difference between the lamp voltages of the positive and negative polarities during normal discharge is less than 20V, a decision threshold value of half-wave discharge detection is preferably set to 20 V.

Further, when a voltage difference higher than the decision threshold value of half-wave discharge detection is detected, relating to deciding which polarity normal discharge occurs and which polarity normal discharge does not occur, it may be appropriate to determine the higher one of the detected lamp voltages Vt1 and Vt2 as being the polarity where normal discharge does not occur.

In the half-wave improvement mode, in a square wave half period of the polarity where normal discharge does not occur (thermal electron emission does not occur), a pulse voltage is applied by using the starting circuit 5, like in the no load mode, and discharge is facilitated so that the high pressure discharge lamp DL can be quickly shifted to a stable lighting state. Depending on the half-wave improvement mode, if the formation of symmetric discharge in positive and negative periods is detected, the high pressure discharge lamp lighting device terminates the half-wave improvement mode and is controlled in a normal stable lighting mode.

As to whether a transition to a normal discharge is made, if a voltage difference between the detected lamp voltages Vt1' and Vt2' falls within the range of variations (for example, less than 20 V) of a lamp voltage difference between the positive and negative polarities in a normal discharge, it can be determined that transition to normal discharge is made.

As can be seen from above, if the duration of a half-wave discharge state in the startup process of the high pressure discharge lamp is detected for a predetermined time period, a pulse voltage is applied to cause discharge in the polarity where normal discharge does not occur, too, and the initiation of electric field emission is facilitated. Thus, an asymmetric discharge state of the high pressure discharge lamp is eliminated and the high pressure discharge lamp is quickly shifted to a stable lighting state, thereby realizing a high pressure discharge lamp lighting device with less startup failure and good startability.

Embodiment 3

Figure 5:
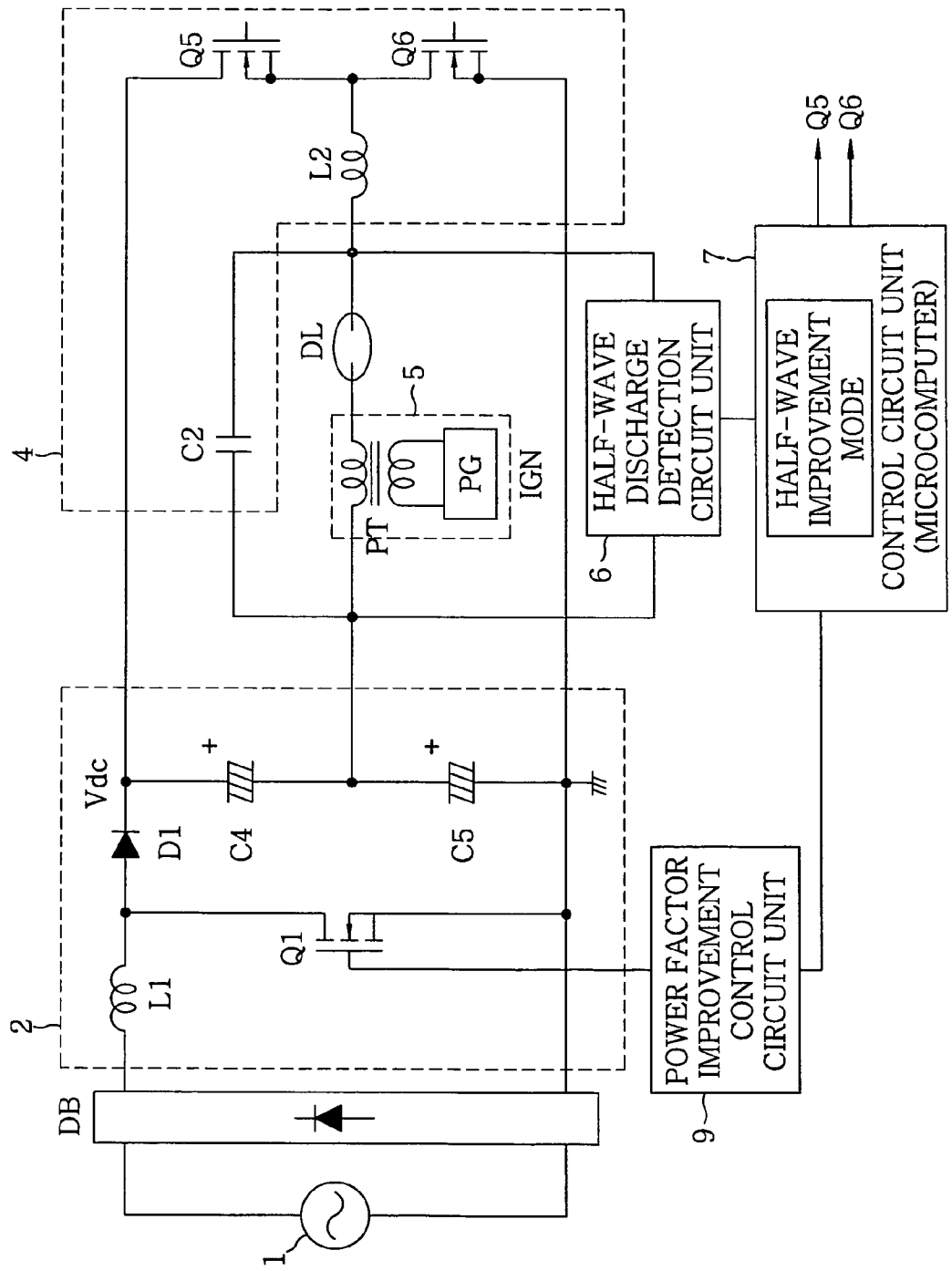
FIG. 5 is a circuit diagram of a third embodiment of the present invention.

FIG. 5 shows a circuit diagram of a lighting device of a third embodiment of the present invention. In this embodiment, a half-bridge type inverter circuit is used as a power conversion circuit. In this embodiment, the inverter circuit 4 also functions as the step-down chopper circuit 3 of the first embodiment. A serial circuit of an inductor L2 and a capacitor C2 is used as a low pass filter for a step-down chopper. A serial circuit of switching elements Q5 and Q6 is connected in parallel with a serial circuit of electrolytic capacitors C4 and C5 of a DC power source circuit 2, the serial circuit of the capacitor C2 and the inductor L2 is connected between a connection point of the capacitors C4 and C5 and a connection point of the switching elements Q5 and Q6, and a high pressure discharge lamp DL is connected in parallel with the capacitor C2 through a secondary coil of a pulse transformer PT.

The on and off period of the switching element Q5 at a high frequency of several tens to several hundreds of kHz and the on and off period of the switching element Q6 at a high frequency of several tens to several hundreds of kHz are alternated at a low frequency of several tens to several hundreds of Hz by a control signal of a control circuit unit 7, thereby generating a square wave voltage of a low frequency at both ends of the capacitor C2.

Figure 50:
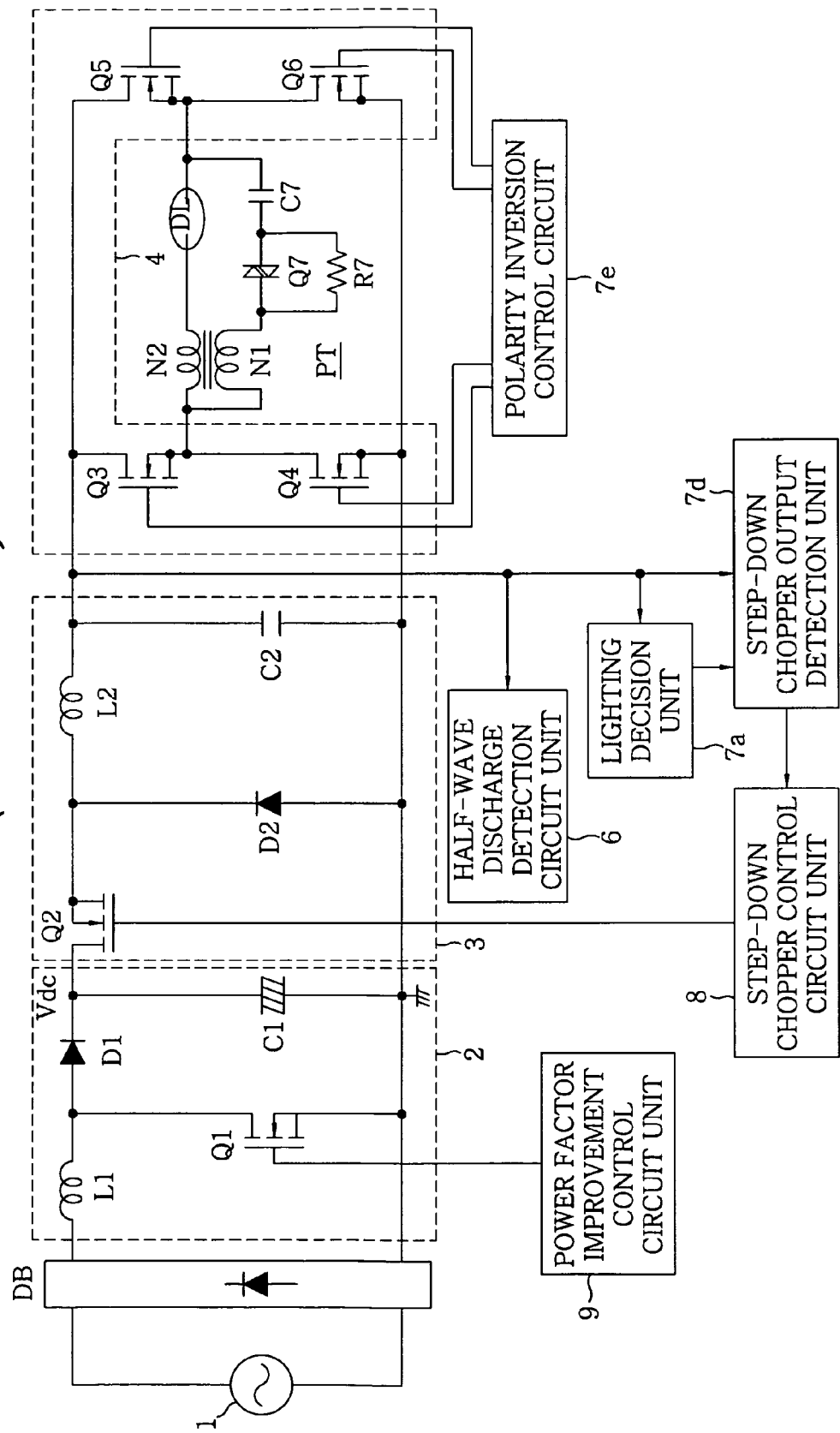
FIG. 50 is a circuit diagram of a second conventional example.
Figure 51:
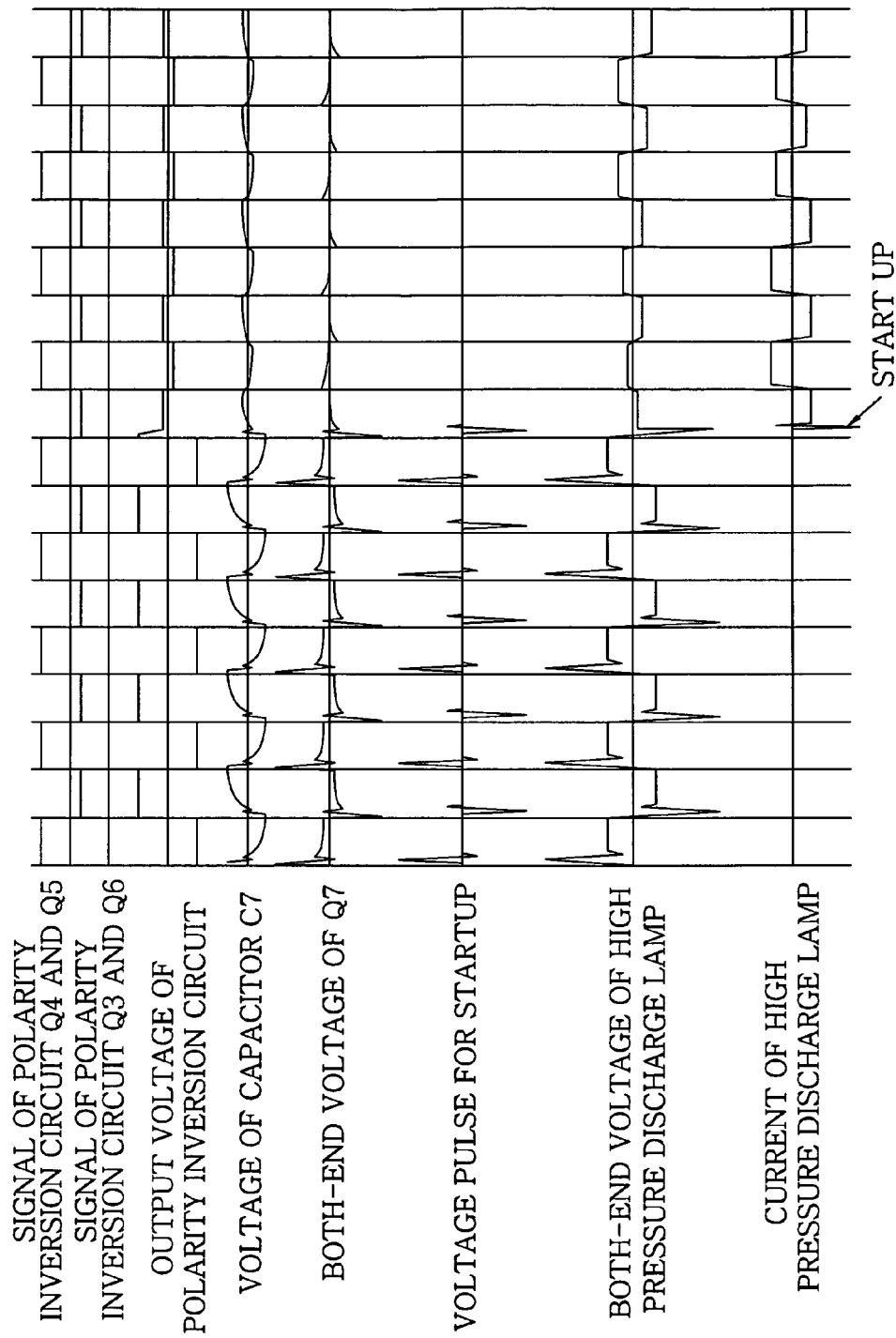
FIG. 51 is an operation waveform diagram of the second conventional example upon startup.
Figure 52:
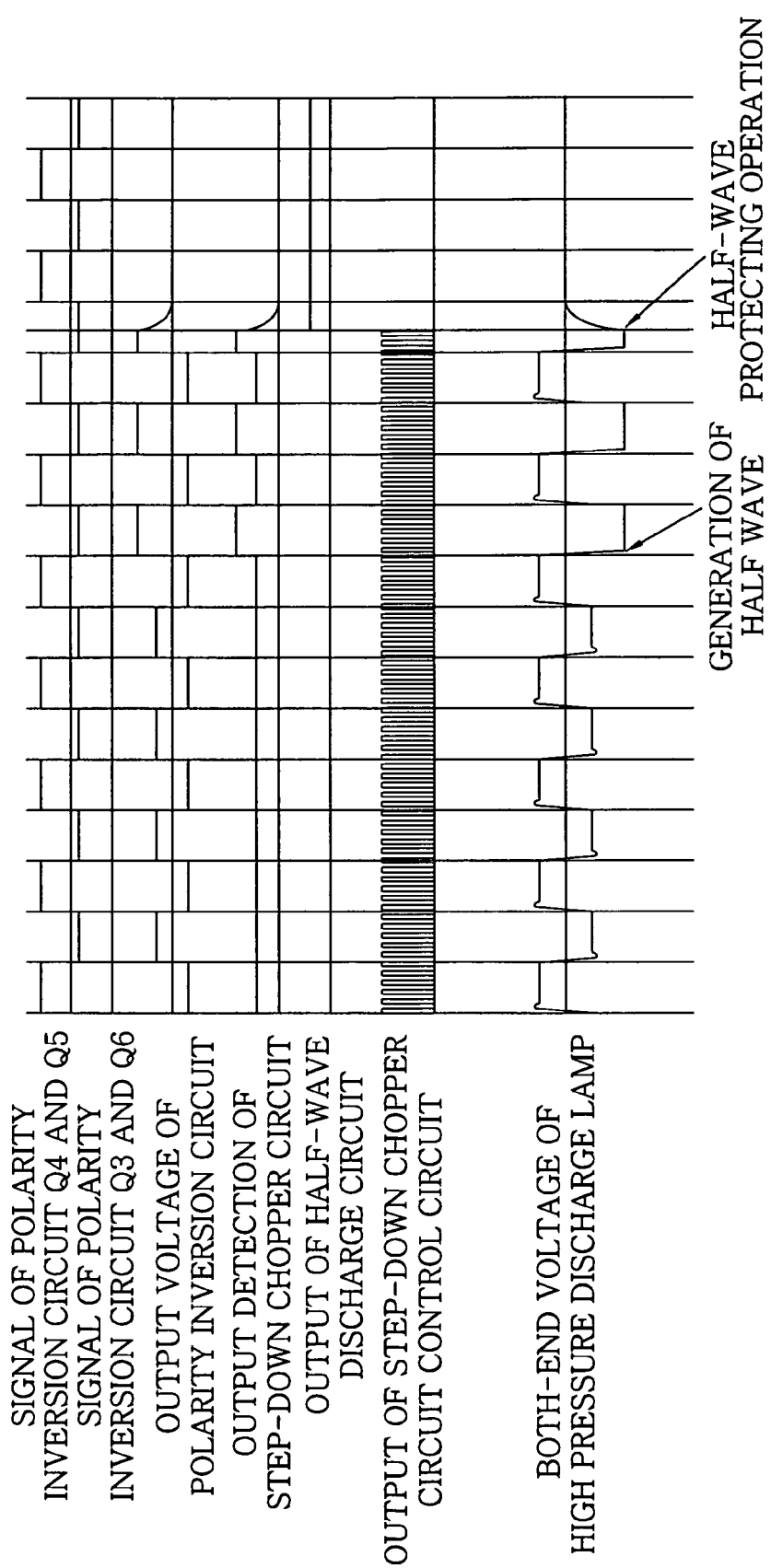
FIG. 52 is an operation waveform diagram of the second conventional example upon occurrence of half-wave discharge after stable lighting.
Figure 53A:
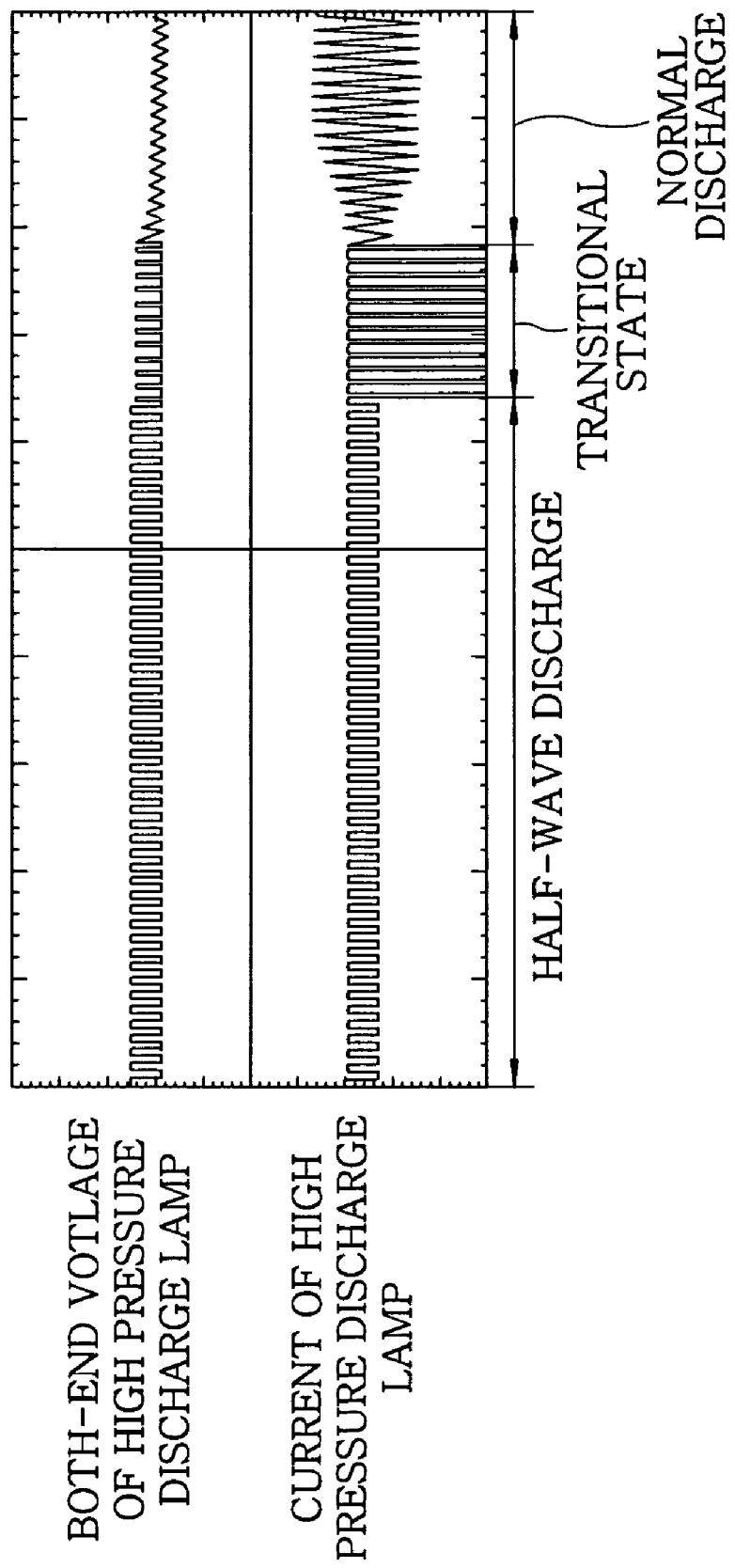
FIGS. 53A to 53C are operation waveform diagrams showing a half-wave discharge right after startup in the first and second conventional examples.
Figure 53B:
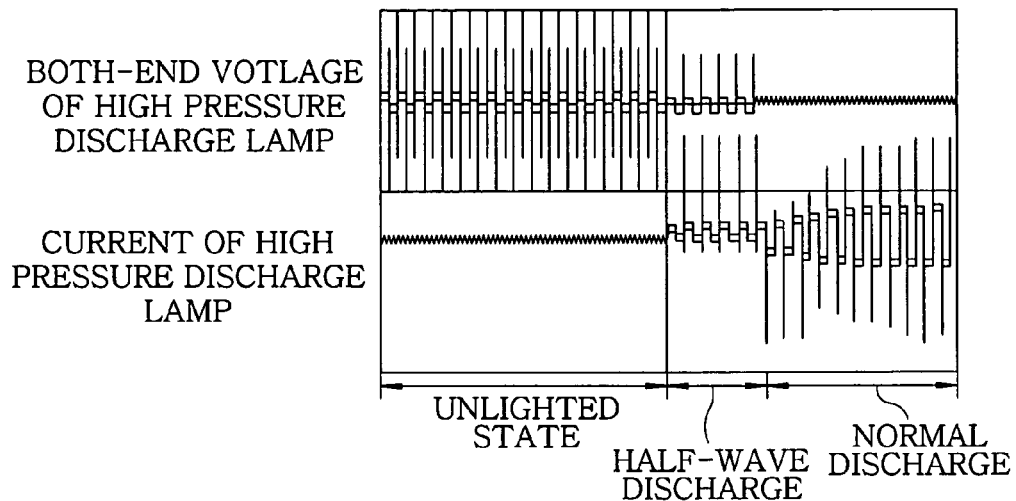
Figure 53C:
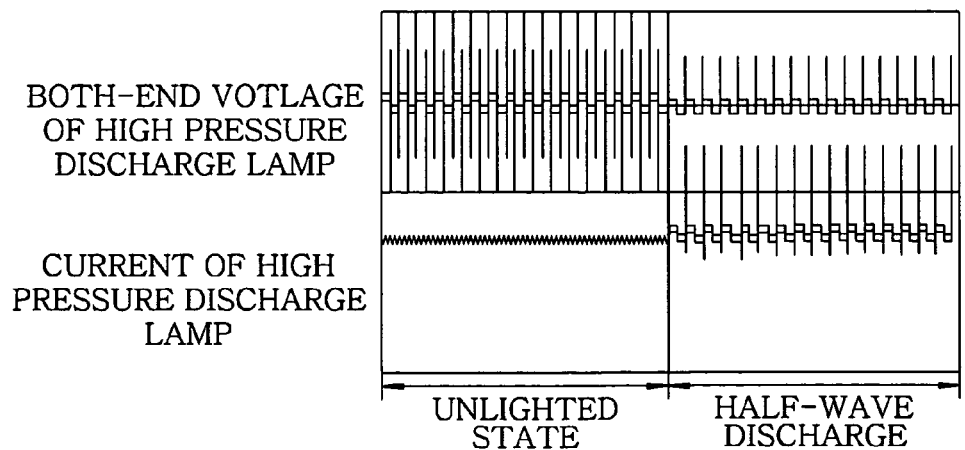
Figure 54:
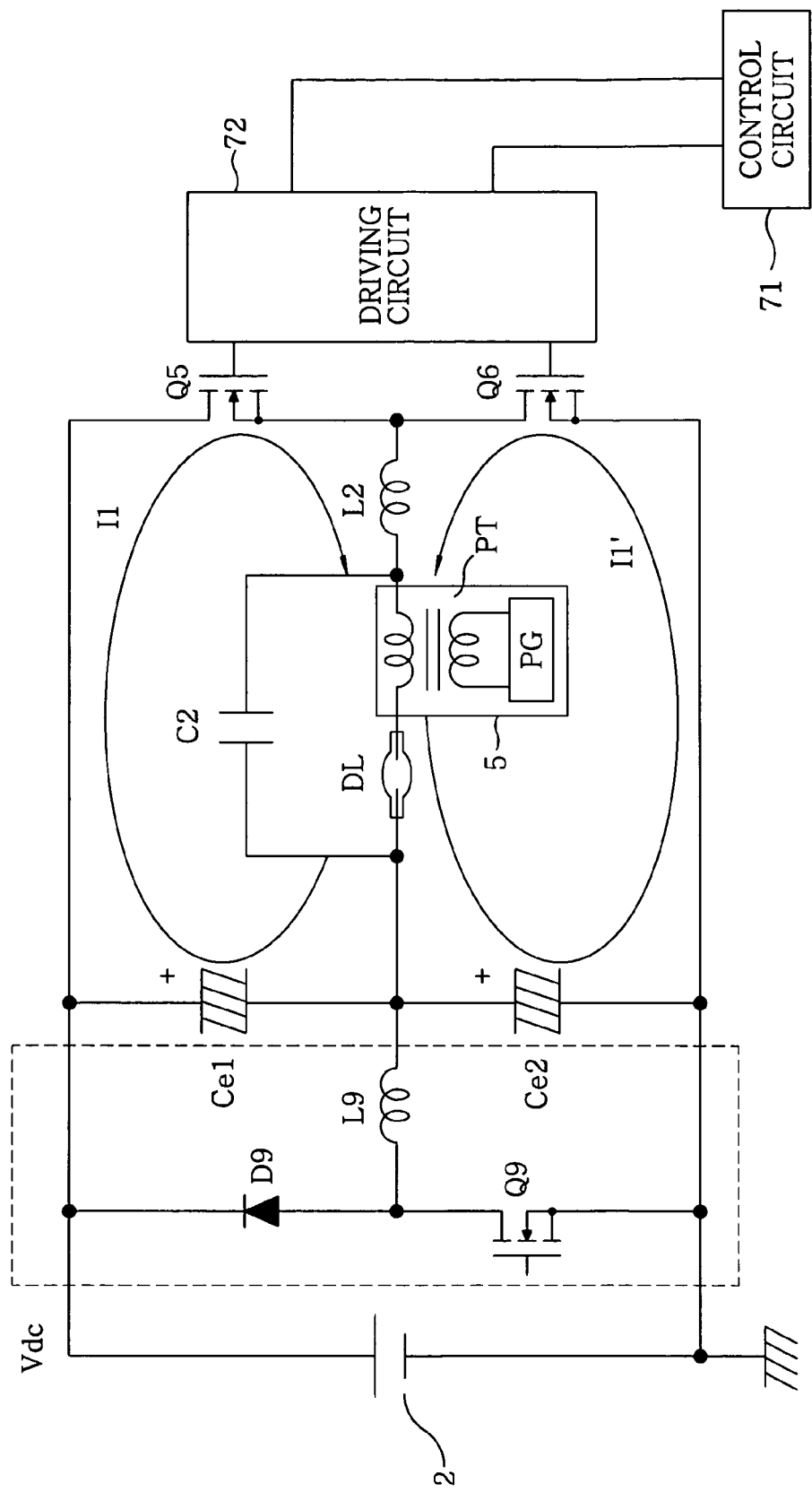
FIG. 54 is a circuit diagram of a third conventional example.
Figure 55:
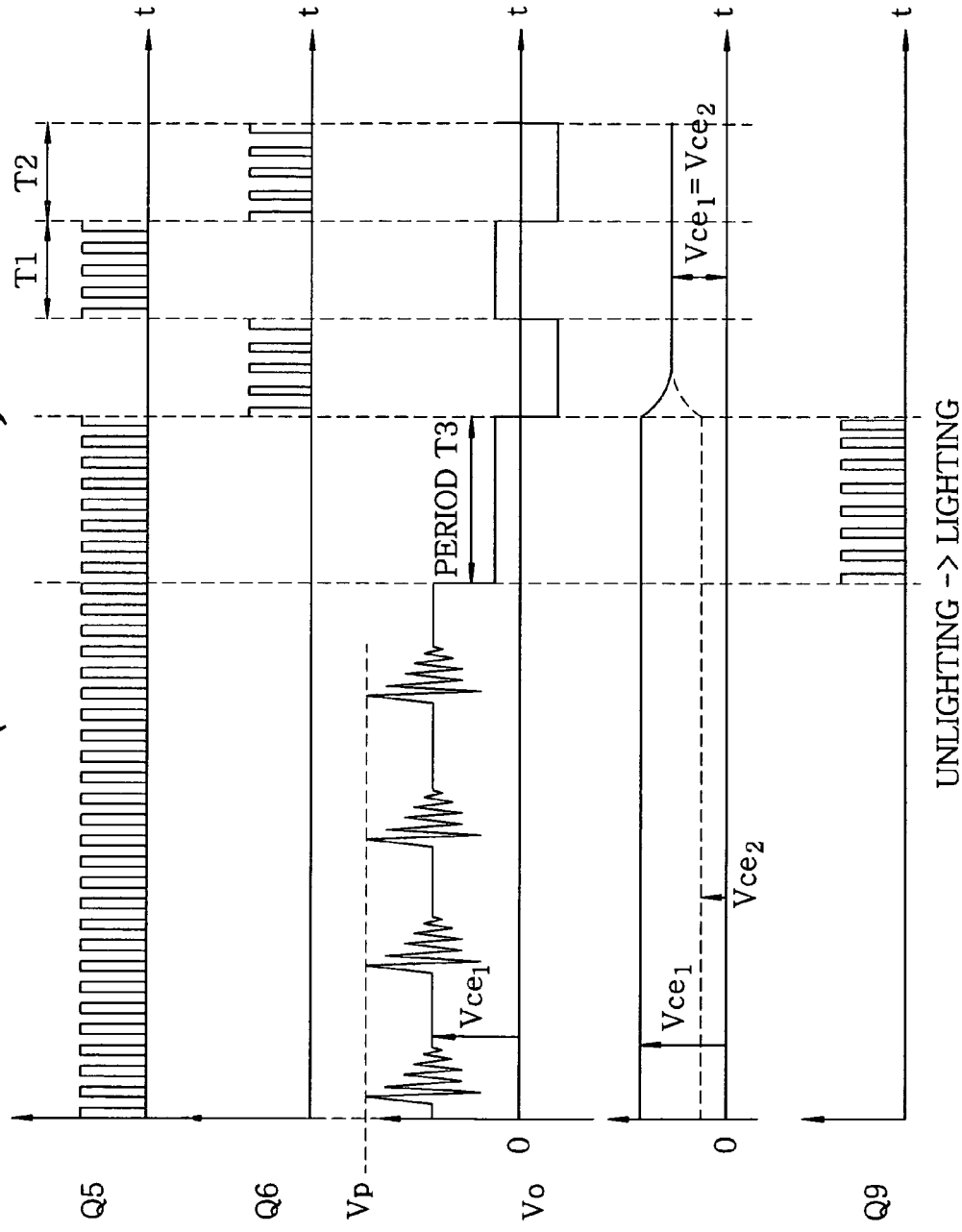
FIG. 55 is an operation waveform diagram of the third conventional example.

Further, as the starting circuit 5, a high voltage generation circuit including a combination of a pulse generator PG and the pulse transformer PT is used instead of the resonance step-up circuit of FIG. 1. The pulse generator PG is a circuit that generates a pulse voltage right after polarity inversion of the inverter circuit 4, and may have the same configuration as the conventional example (FIG. 50).

Further, a half-wave discharge detection circuit unit 6 detects a half-wave discharge state in a startup process, and switches the operation of the control circuit unit 7 to a half-wave improvement mode upon detection of the half-wave discharge state in the startup process.

In order for the high pressure discharge lamp DL to reach a stable lighting state from a no load (unlighted) state by using this circuit, the lighting device undergoes the three main processes as follows.

No load mode: The high pressure discharge lamp DL is in an unlighted state, and a pulse voltage generated by the pulse generator PG is stepped up from the primary coil of the pulse transformer PT toward the secondary coil, and is superposed on the square wave voltage and applied between the electrodes, thereby dielectrically breaking down the high pressure discharge lamp DL and making a transition to the startup mode.

Startup mode: When the high pressure discharge lamp DL dielectrically breaks down by a pulse voltage, a transition to arc discharge through glow discharge is performed. In a process from the start of arc discharge to the stabilization of the temperature in the arc tube, the lamp voltage Vo gradually rises up to a stable voltage from several V over several minutes.

Stable lighting mode: Upon lapse of several minutes after the lighting of the high pressure discharge lamp DL, the temperature in the arc tube of the high pressure discharge lamp DL increases and becomes stable, and the lamp voltage Vo becomes almost constant and the lighting continues in this state.

However, there may occur a half-wave discharge which causes electron emission asymmetric in positive and negative periods between a pair of electrodes of the high pressure discharge lamp which is AC-lighting right after startup. This problem arises because one electrode in a cathode cycle cannot make transition from glow discharge to arc discharge. In other words, this problem is caused by instable formation of bright spots of the electrodes, i.e., the instability of thermal electron emission. If this half-wave discharge state continues, the lamp may be extinguished, which acts as one of the factors that deteriorate the startability of the lamp.

Figure 6:
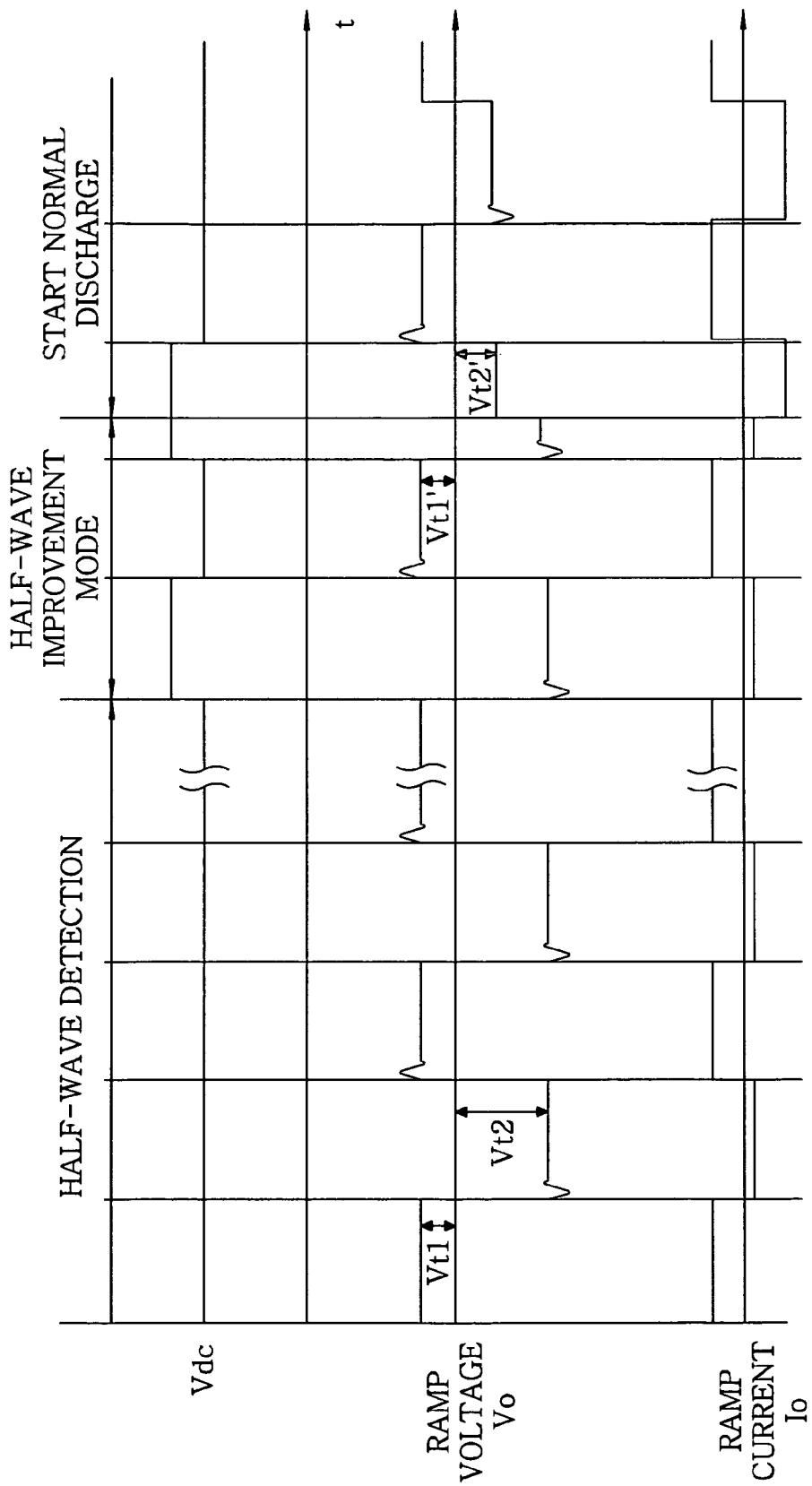
FIG. 6 is an operation waveform diagram of the third embodiment of the present invention.

In the present invention, as shown in the period of 'half-wave detection' of FIG. 6, the half-wave discharge detection circuit unit 6 detects that a half-wave discharge state continues for a predetermined time period, the half-wave discharge state consisting of a square wave half period (lamp voltage: Vt1) during which normal discharge occurs and a square wave half period (lamp voltage: Vt2) during which normal discharge does not occur, and then shifts to the half-wave improvement mode.

Here, as for the detection of half-wave discharge, it is decided that a half-wave discharge occurs when a voltage difference between a lamp voltage (absolute value) detected by the half-wave discharge detection circuit unit 6 during chopping of the switching element Q5 and a lamp voltage (absolute value) detected by the half-wave discharge detection circuit unit 6 during chopping of the switching element Q6 is above a predetermined decision threshold value. For example, if a difference between the lamp voltages of the positive and negative polarities during normal discharge is less than 20 V, a decision threshold value of half-wave discharge detection is preferably set to 20 V.

Further, when a voltage difference higher than the decision threshold value of half-wave discharge detection is detected, relating to deciding which polarity normal discharge occurs and which polarity normal discharge does not occur, it is preferable to determine the higher one of the detected lamp voltages Vt1 and Vt2 as being the polarity where normal discharge does not occur.

In the half-wave improvement mode, in a square wave half period of the polarity where normal discharge does not occur (thermal electron emission does not occur), a pulse voltage is applied by using the starting circuit 5, like in the no load mode, and discharge is facilitated so that the high pressure discharge lamp DL can be quickly shifted to a stable lighting state. Depending on the half-wave improvement mode, if the formation of symmetric discharge in positive and negative periods is detected, the high pressure discharge lamp lighting device terminates the half-wave improvement mode and is controlled in a normal stable lighting mode.

Figure 7:
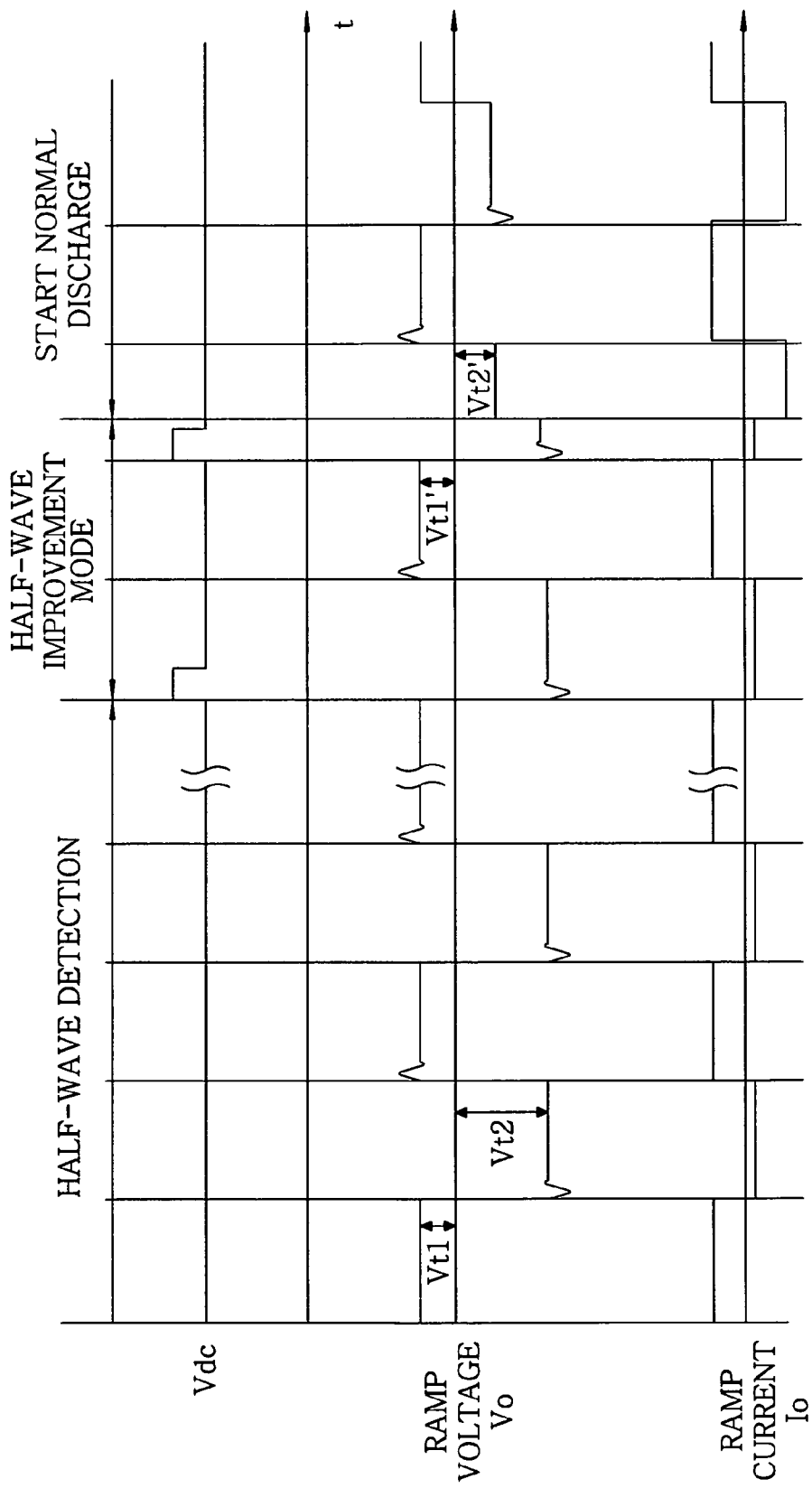
FIG. 7 is an operation waveform diagram of the third embodiment of the present invention.

Further, in the half-wave improvement mode, a DC voltage Vdc is stepped up to a voltage higher than that at normal time in accordance with the polarity inversion to the polarity where normal discharge does not occur (FIG. 6). At this time, the rising period of the DC voltage Vdc may be a predetermined period, immediately after polarity inversion as shown in FIG. 7. That is, the control circuit adjusts the output of the DC power source circuit or the power supply circuit such that the magnitude of an output voltage of the DC power source circuit or the power supply circuit is increased only during the whole power supply period of the square wave half period of the polarity having the load voltage of the larger magnitude, or only during an initial part of the power supply period of the square wave half period of the polarity having the load voltage of the larger magnitude. It may be appropriate that the rise of the DC voltage Vdc is carried out by applying a boosting command from the control circuit unit 7 to a power factor improvement control circuit unit 9.

Although a concrete circuit configuration is not shown, the power factor improvement control circuit unit 9 generally divides the DC voltage Vdc by a resistance voltage-division circuit, and controls the pulse width of the switching element Q1 so that the DC voltage Vdc has a predetermined value. Thus, it is preferred to temporarily increase the boosting ratio by temporarily switching the voltage division ratio of the resistance voltage-division circuit to a low level.

Accordingly, the high pressure discharge lamp is quickly shifted to a stable lighting state. Depending on the half-wave improvement mode, if the formation of symmetric discharge in positive and negative periods is detected, the high pressure discharge lamp lighting device terminates the half-wave improvement mode and is controlled in a normal stable lighting mode.

As to whether a transition to a normal discharge is made, if a voltage difference between the detected lamp voltages Vt1' and Vt2' falls within the range of variations (e.g., less than 20 V) of a lamp voltage difference between the positive and negative polarities in a normal discharge, it can be determined that transition to normal discharge is made.

As described above, if the duration of a half-wave discharge state in the startup process of the lamp is detected for a predetermined time period, an output voltage Vdc of the DC power source circuit 2 at the side where normal discharge does not occur is stepped up for a predetermined period, thereby allowing lighting to be kept upon generation of a refiring voltage. Also, when a hotspot which is the origin of thermal electron emission is formed, instantaneous current supply is possible. Thus, an asymmetric discharge state of the high pressure discharge lamp is eliminated and the high pressure discharge lamp is quickly shifted to a stable lighting state, thereby realizing a high pressure discharge lamp lighting device with less startup failure and good startability.

Embodiment 4

Figure 8:
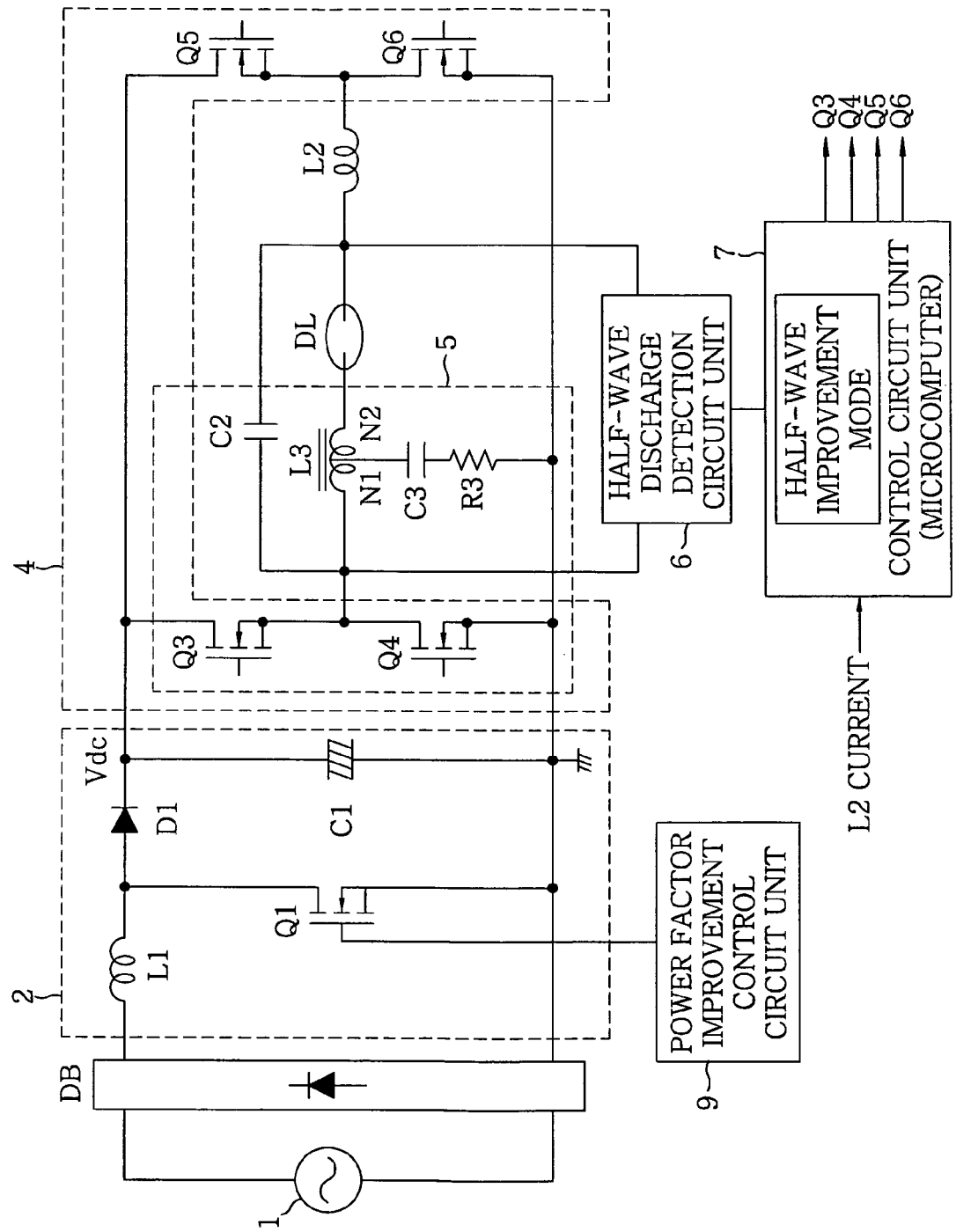
FIG. 8 is a circuit diagram of a fourth embodiment of the present invention.

FIG. 8 shows a circuit diagram of a lighting device of a fourth embodiment of the present invention. In this embodiment, the step-down chopper circuit 3 of FIG. 1 is omitted, and instead the switching elements Q3 and Q4 are driven at a low frequency and the switching elements Q5 and Q6 are driven at a high frequency during stable lighting to thus combine the functions of the step-down chopper circuit 3 and the inverter circuit 4 of the first embodiment in a single circuit. That is, during stable lighting, the switching elements Q3 and Q4 are alternately turned on and off at a low frequency, and the on and off operation of the switching element Q5 at a high frequency in the on period of the switching element Q4 and the on/off operation of the switching element Q6 at a high frequency in the on period of the switching element Q3 are alternated at a low frequency, thereby supplying a square wave voltage of a low frequency to the discharge lamp DL.

Here, the inductor L2 and the capacitor C2 function as a low pass filter of the step-down chopper circuit. Further, reverse parallel diodes incorporated in the switching elements Q5 and Q6 function as regenerative current carrying diodes of the step-down chopper circuit. The resonance step-up circuit of FIG. 1 is used as the starting circuit 5, and thus, during startup, the switching elements Q3 and Q4 are driven at a high frequency, thereby generating a high voltage for startup by a resonance operation.

In order for the high pressure discharge lamp DL to reach a stable lighting state from a no load (unlighted) state by using this circuit, the lighting device undergoes the three main processes as follows.

No load mode: The high pressure discharge lamp DL is in an unlighted state, and a resonance pulse voltage, which is generated by alternately turning on and off the switching elements Q3 and Q4 at near an LC resonance frequency (or 1 of the integer part of the resonance frequency) of a primary coil N1 of the pulse transformer L3 and the capacitor C3 constituting a resonance circuit, is stepped up by the winding ratio (N2/N1) of the pulse transformer L3 and applied between the lamp electrodes, thereby dielectrically breaking down the high pressure discharge lamp DL and making a transition to the startup mode.

Startup mode: When the high pressure discharge lamp DL dielectrically breaks down by a resonance pulse voltage, a transition to arc discharge through glow discharge is performed. In a process from the start of arc discharge to the stabilization of the temperature in the arc tube, the lamp voltage Vo gradually rises up to a stable voltage from several V over several minutes.

Stable lighting mode: Upon lapse of several minutes after the lighting of the high pressure discharge lamp DL, the temperature in the arc tube of the high pressure discharge lamp DL increases and becomes stable, and the lamp voltage Vo becomes almost constant and the lighting continues in this state.

However, there may occur a half-wave discharge which causes electron emission asymmetric in positive and negative periods between a pair of electrodes of the high pressure discharge lamp which is AC-wisely turned on after startup. This problem arises because one electrode in a cathode period cannot be shifted from glow discharge to arc discharge. In other words, this problem is caused by instable formation of bright spots of the electrodes, i.e., the instability of thermal electron emission. If this half-wave discharge state continues, the lamp may be extinguished, which acts as one of the factors that deteriorate the startability of the lamp.

Figure 9:
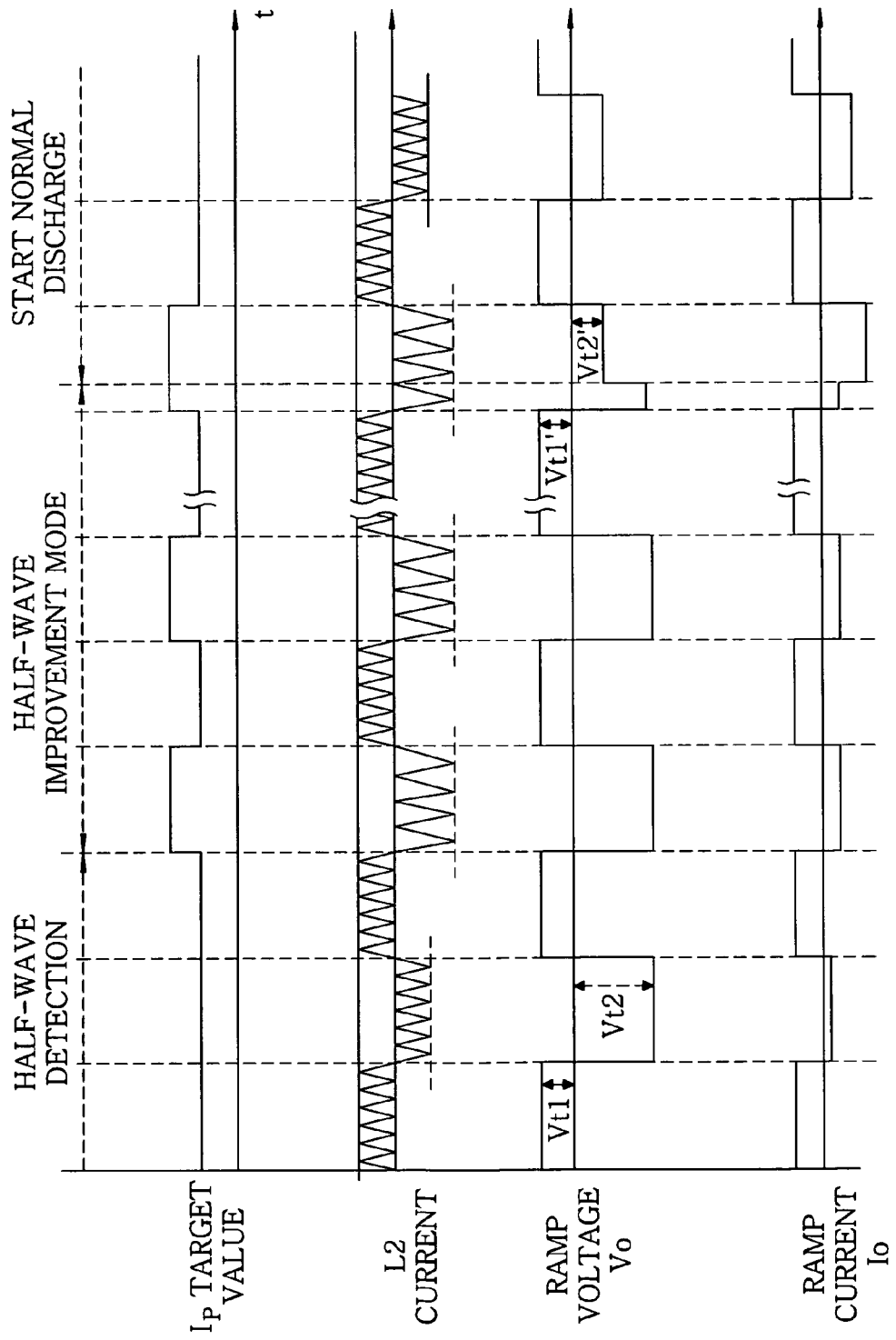
FIG. 9 is an operation waveform diagram of the fourth embodiment of the present invention.
Figure 10:
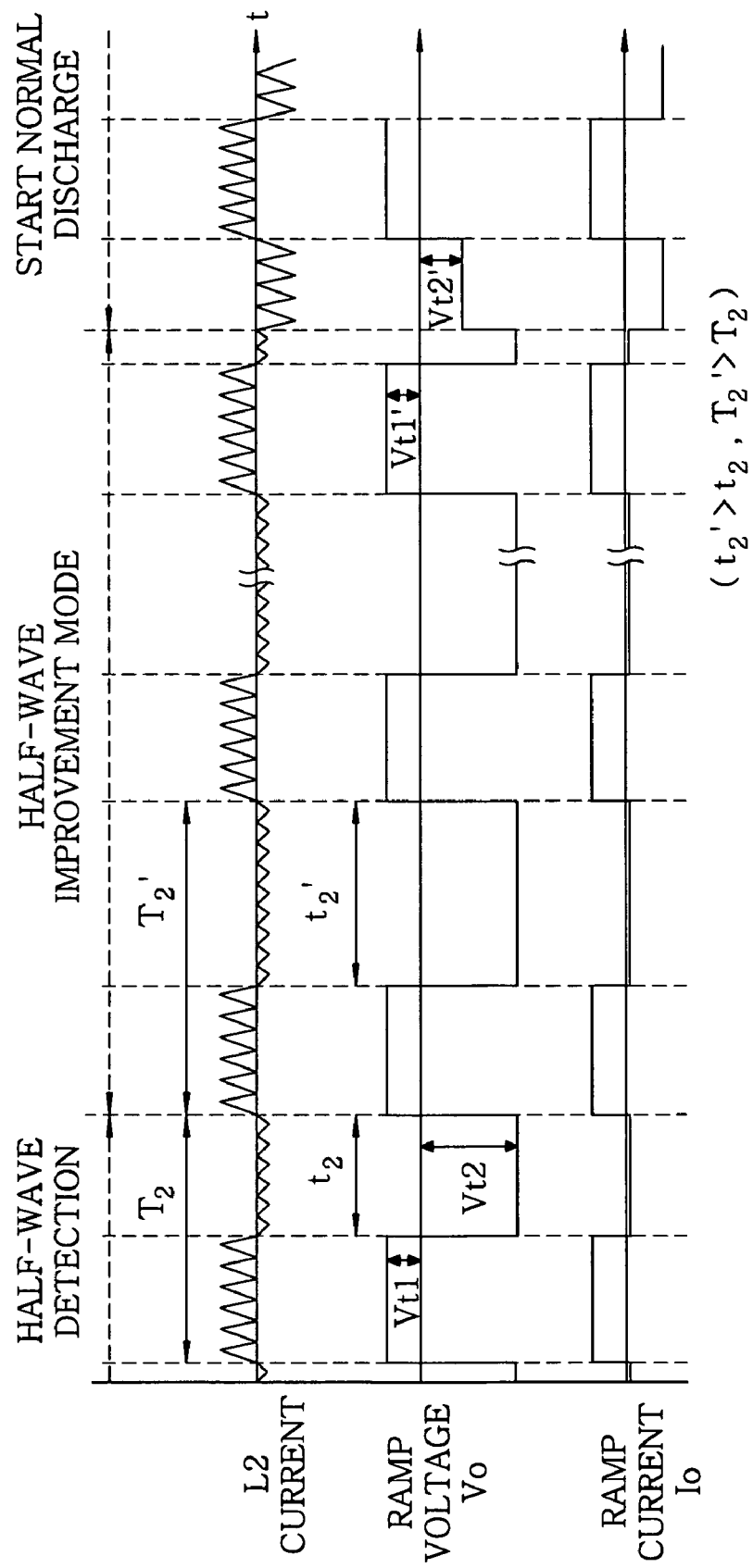
FIG. 10 is an operation waveform diagram of the fourth embodiment of the present invention.

In the present invention, as shown in FIGS. 9 and 10, the half-wave discharge detection circuit unit 6 detects that a half-wave discharge state continues for a predetermined time period, and then makes a transition to the half-wave improvement mode.

In the drawings, an Ip target value represents a target value of the peak value of chopper current, and an L2 current value represents an instantaneous value of current flowing in the inductor L2. The current flowing in the inductor L2 is detected by a detection unit (not shown) and input to the control circuit unit 7. The control circuit unit 7 turns off a switching element being driven at a high frequency when the L2 current reaches the Ip target value. Also, when the L2 current becomes zero, a switching element being driven at a high frequency is turned on.

To be more specific, if the switching element Q6 is turned on in a square wave half period in which the switching element Q3 is on, the current flowing in the inductor L2 gradually increases, and when the Ip target value is reached, the switching element Q6 is turned off. Then, energy stored in the inductor L2 flows as regenerative current through an reverse parallel diode in the switching element Q5, the current flowing in the inductor L2 gradually decreases, and when the current becomes zero, the switching element Q6 is turned on again.

Further, if the switching element Q5 is turned on in a square wave half period in which the switching element Q4 is on, the current flowing in the inductor L2 gradually increases, and when the Ip target value is reached, the switching element Q5 is turned off. Then, energy stored in the inductor L2 flows as regenerative current through an reverse parallel diode in the switching element Q6, the current flowing in the inductor L2 gradually decreases, and when the current becomes zero, the switching element Q5 is turned on again.

As for the detection of a half-wave mode, as a result of detecting a lamp voltage Vt1 upon driving of the switching elements Q3 and Q6 and detecting a lamp voltage Vt2 upon driving of the switching elements Q4 and Q5, it is decided that a half-wave discharge occurs when |Vt1−Vt2| is within the range of a predetermined decision threshold value. For example, if a difference between the lamp voltages of the positive and negative polarities in normal times is less than 20 V, the decision threshold value of half-wave discharge detection may be set to 20 V<|Vt1−Vt2|<Vdc.

Further, when a value within the range of a decision threshold value of half-wave discharge detection is detected, relating to deciding which polarity normal discharge occurs and which polarity normal discharge does not occur, it may be appropriate to determine the higher one of the detected lamp voltages Vt1 and Vt2 as being the polarity where normal discharge does not occur.

In the half-wave improvement mode, in a square wave half period of the polarity (of glow discharge) where no normal discharge occurs, a current control target value (Ip target value) is temporarily increased, as shown in FIG. 9, to thereby facilitate discharge so that the high pressure discharge lamp DL may be quickly shifted to a stable lighting state.

Alternatively, a period (t2') of a square wave half period of the polarity where normal discharge does not occur may be made longer than a normal period (t2) as shown in FIG. 10 to warm up the electrodes and facilitate discharge.

Further, while 1 period of a square wave is extended by the relationship of T2<T2' because of t2'>t2 in FIG. 10, it is also possible to achieve the same effect by changing the duty ratio between the square wave half period in which normal discharge occurs and the square wave half period in which normal discharge does not occur while maintaining 1 period of the square wave equal.

Depending on the half-wave improvement mode, if the formation of nearly symmetric discharge in positive and negative periods is detected, the high pressure discharge lamp lighting device terminates the half-wave improvement mode and is controlled in a normal stable lighting mode.

As to whether normal discharge has occurred or not, as a result of detecting a lamp voltage Vt1' when driving the switching elements Q3 and Q6 and detecting a lamp voltage Vt2' when driving the switching elements Q4 and Q5, it is preferably judged that a normal discharge occurs when |Vt1'−Vt2'| is less than a variation (e.g., 20 V) of the difference between the lamp voltages of the positive and negative polarities in normal times.

As described above, if the duration of a half-wave discharge state in the startup process of the high pressure discharge lamp DL is detected for a predetermined time period, a current target value is increased to initiate arc discharge from the polarity of glow discharge, too, thereby enabling instantaneous current supply when a hotspot which is the origin of thermal electron emission is formed. Thus, an asymmetric discharge state of the lamp is quickly eliminated and the lamp is shifted to a stable lighting state, thereby realizing a high pressure discharge lamp lighting device with less startup failure and good startability.

In each of the above-described embodiments, a combination of a step-down chopper circuit and a full-bridge circuit (FIG. 1), a full-bridge circuit serving as a step-down chopper circuit (FIGS. 3 and 8), and a half-bridge circuit also serving as a step-down chopper circuit (FIG. 5) are illustrated as a power converter circuit, and a starting circuit (FIGS. 1 and 8) using a resonance circuit and a starting circuit (FIGS. 3 and 5) using a pulse generator PG and a pulse transformer PT are illustrated as a starting circuit. However, it is needless to say that the present invention is not limited thereto and their concrete circuit configurations may be properly changed. This is also applied to the following respective embodiments.

Embodiment 5

Figure 11:
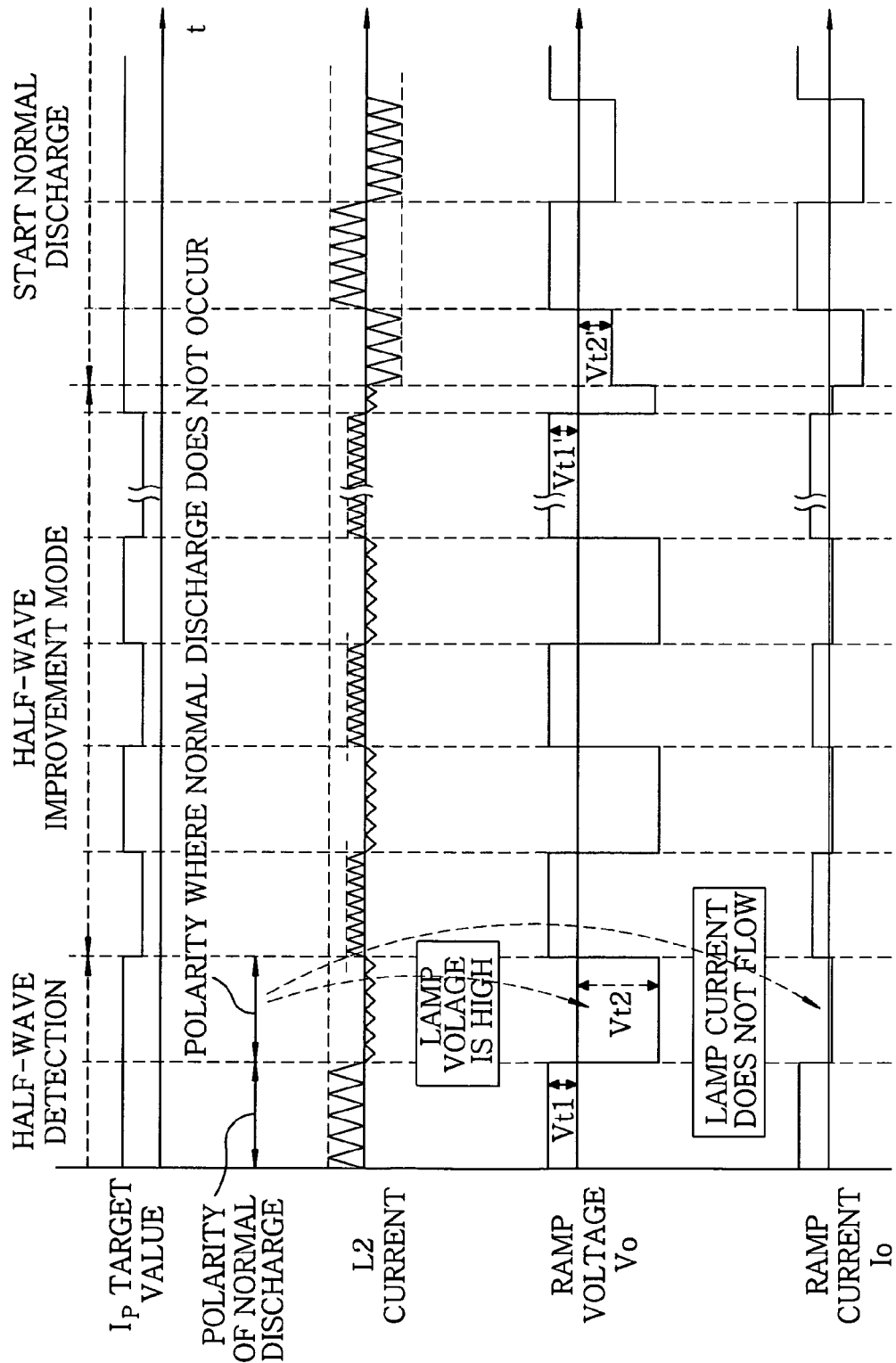
FIG. 11 is an operation waveform diagram of a fifth embodiment of the present invention.
Figure 12:
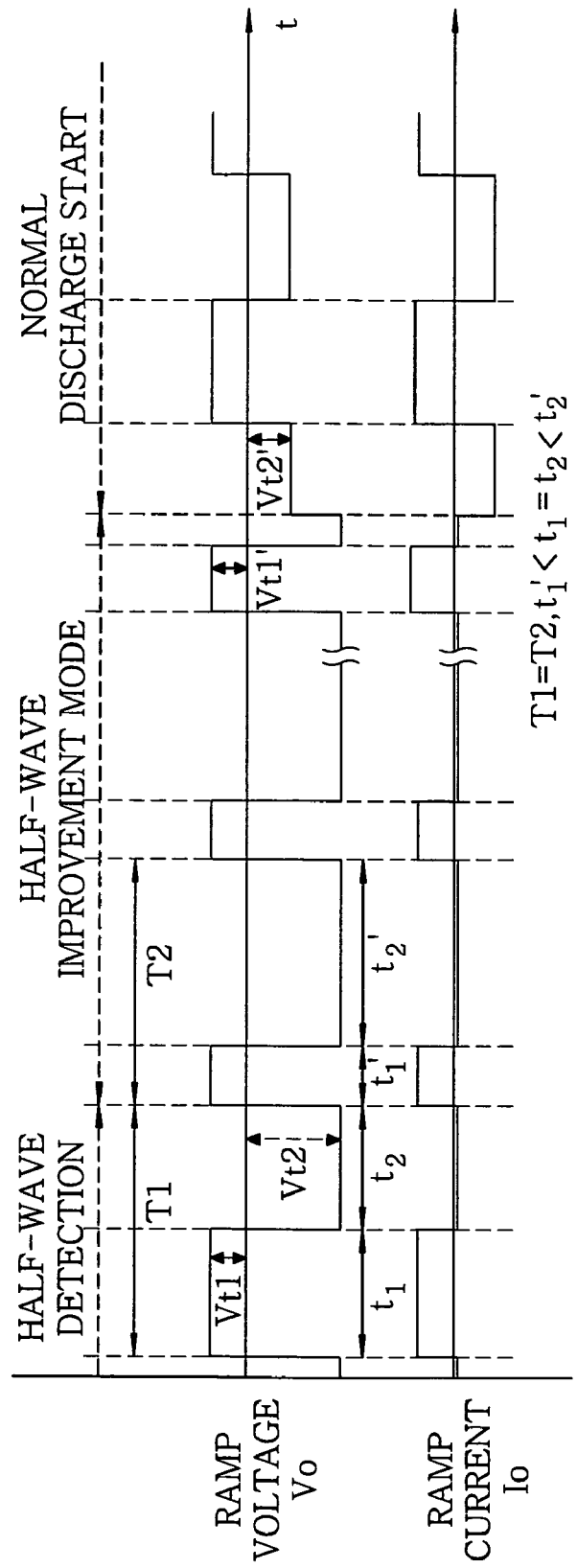
FIG. 12 is an operation waveform diagram of the fifth embodiment of the present invention.
Figure 13:
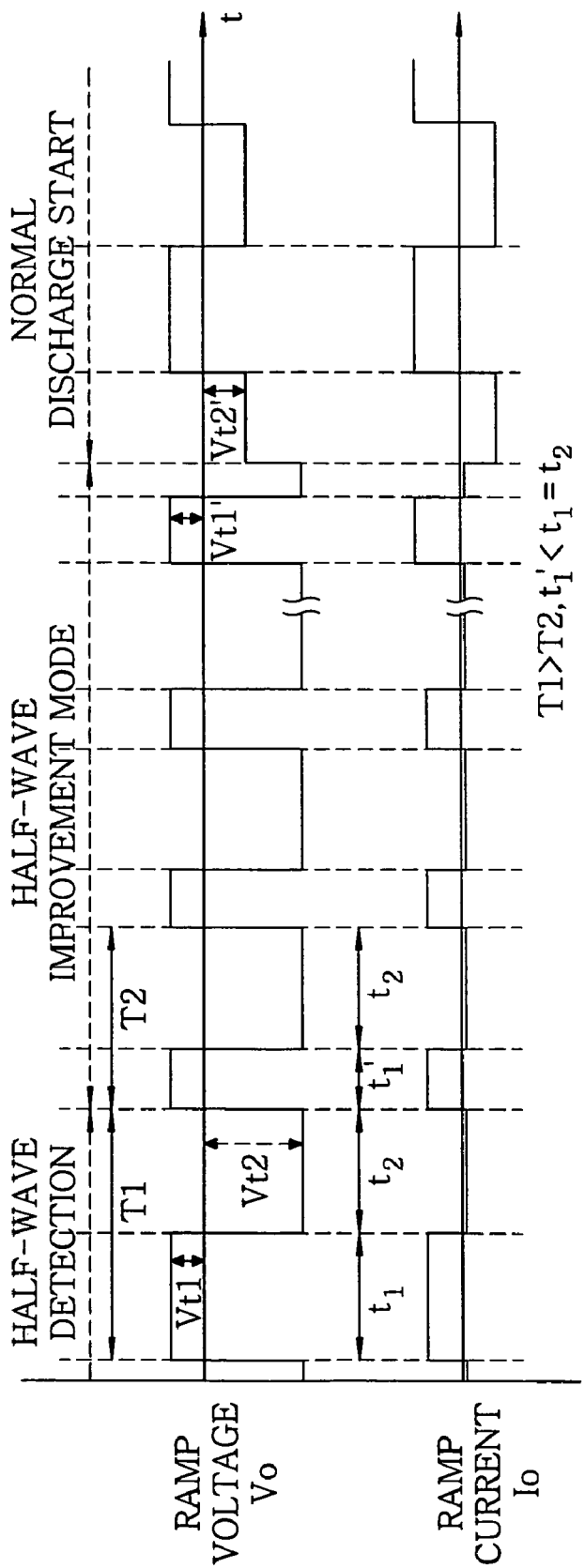
FIG. 13 is an operation waveform diagram of the fifth embodiment of the present invention.

FIGS. 11 to 13 show the operation of a fifth embodiment of the present invention. One of circuit configuration of the first to fourth embodiments, e.g., the configuration of FIG. 8, may be employed. If a lamp voltage of a square wave half period at a normal lighting side right after startup is above a predetermined threshold value, a current peak target value (Ip target value) of the polarity where normal discharge occurs is lowered, as shown in FIG. 11, before or simultaneously with the startup of the half-wave improvement mode explained in the first to fourth embodiments, so that the rising speed of the vapor pressure in the arc tube is alleviated. This facilitates the initiation of thermal electron emission from the polarity where normal discharge does not occur, too, thereby quickly shifting the high pressure discharge lamp to a stable lighting state.

In addition, as shown in FIGS. 12 and 13, the same effect can be achieved by making the square wave duty width of the polarity where normal discharge occurs shorter than the square wave duty width of the polarity where normal discharge does not occur. While the example of FIG. 12 shows that the square wave duty width is controlled as in $t1'<t1=t2<t2'$ under a state where $T1=T2$, the example of FIG. 13 shows that $t1'<t1=t2$ by shortening the square wave period as in $T1>T2$.

As described so far, depending on the half-wave improvement mode, if the formation of nearly symmetric discharge in positive and negative periods is detected, the high pressure discharge lamp lighting device terminates the half-wave improvement mode and is controlled in a normal stable lighting mode.

As described above, the amount of current of the polarity where normal discharge occurs is altered before or simultaneously with the startup of the half-wave improvement mode explained in the first to fourth embodiments. Thus, an asymmetric discharge state of the high pressure discharge lamp is eliminated and the high pressure discharge lamp is quickly shifted to a stable lighting state, thereby realizing a high pressure discharge lamp lighting device with less startup failure and good startability.

Embodiment 6

Figure 14:
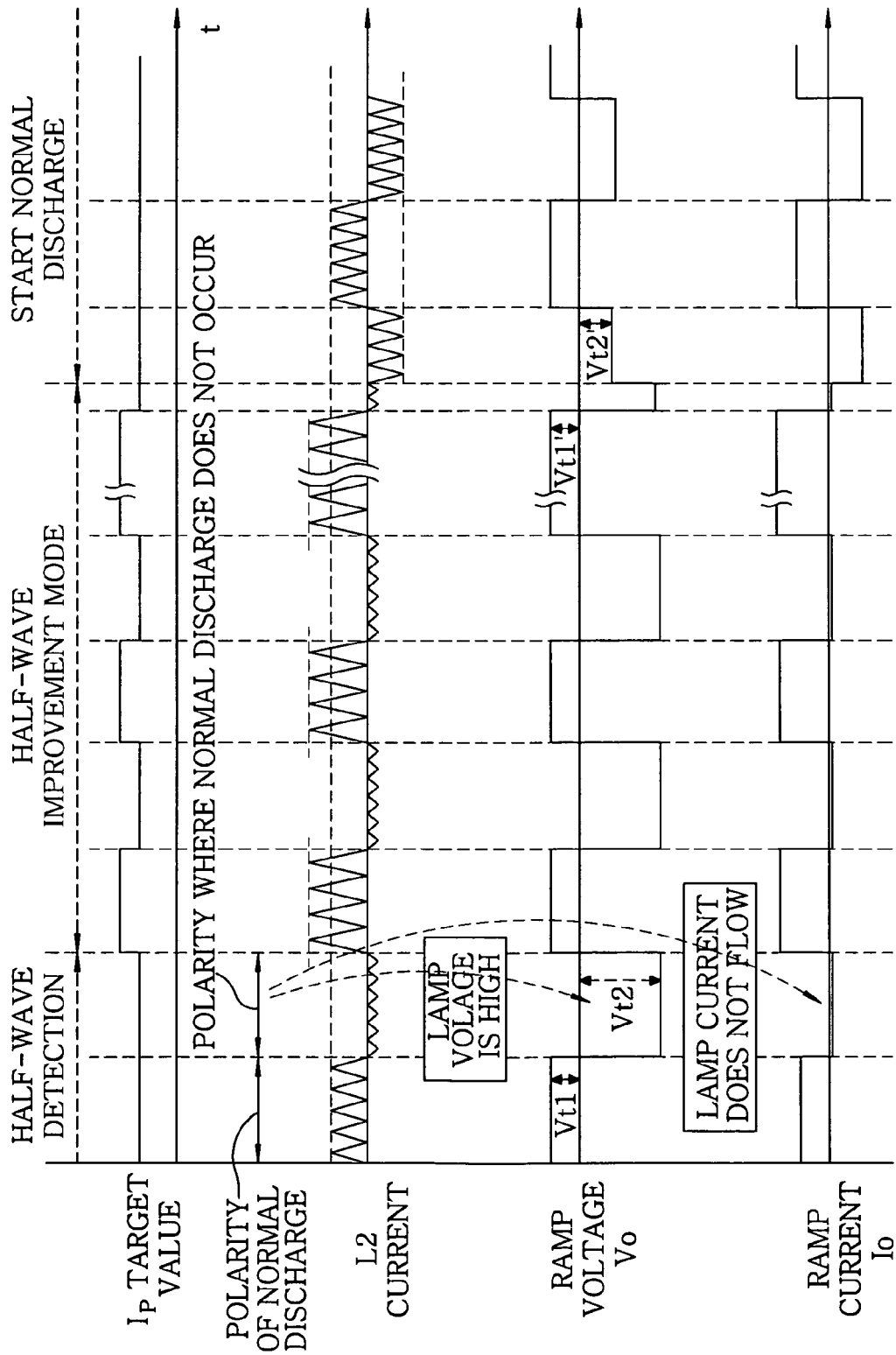
FIG. 14 is an operation waveform diagram of a sixth embodiment of the present invention.
Figure 15:
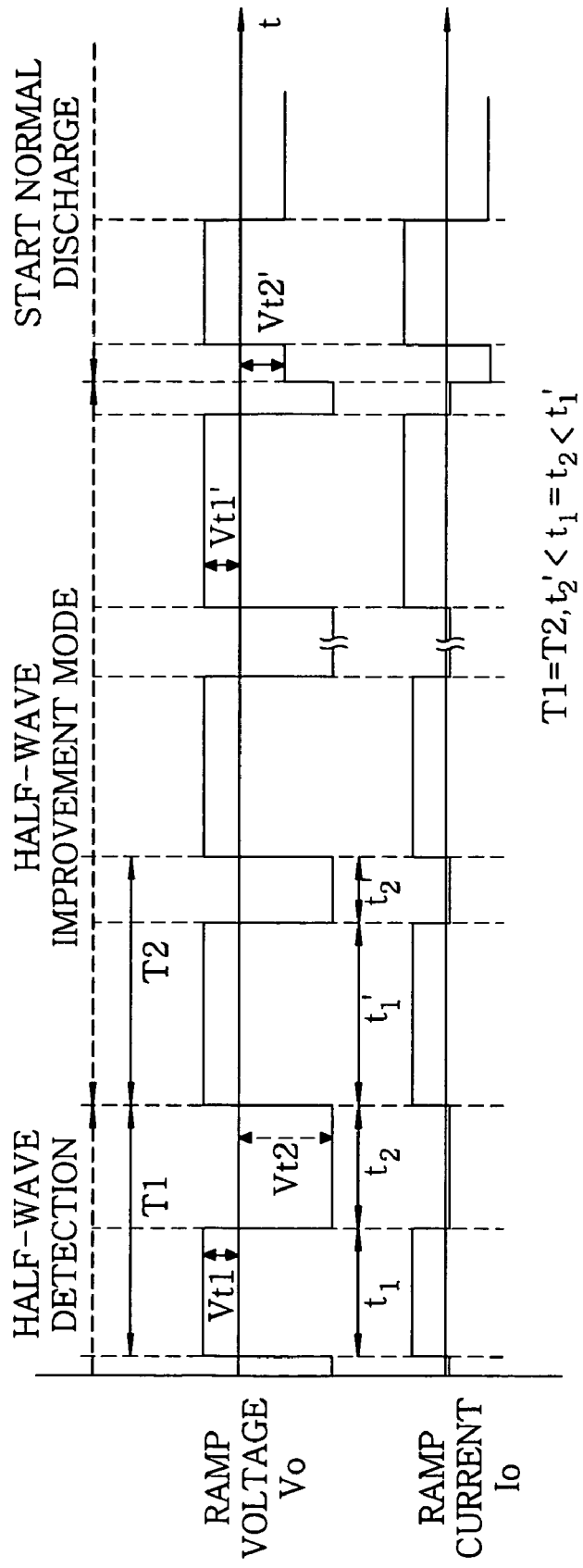
FIG. 15 is an operation waveform diagram of the sixth embodiment of the present invention.
Figure 16:
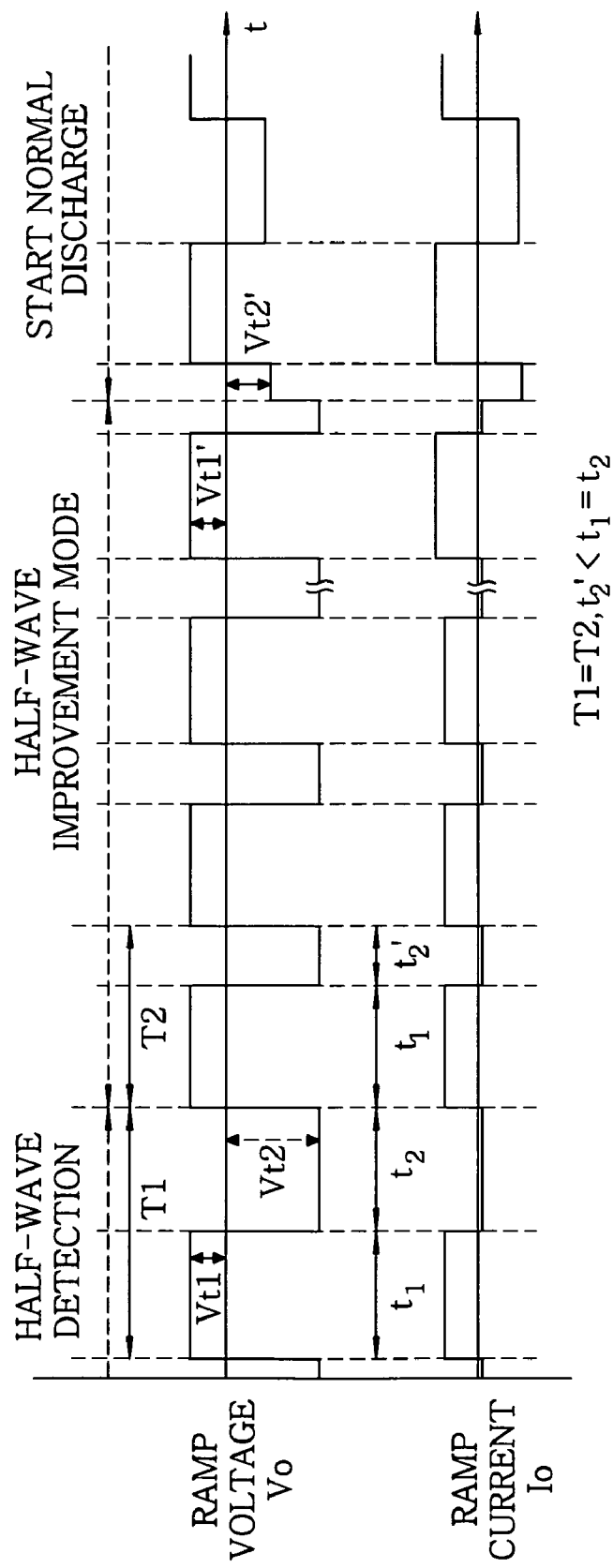
FIG. 16 is an operation waveform diagram of the sixth embodiment of the present invention.

FIGS. 14 to 16 show the operation of a sixth embodiment of the present invention. One of circuit configuration of the first to fourth embodiments, e.g., the configuration of FIG. 8, may be employed.

If a lamp voltage of a square wave half period at a normal lighting side right after startup is below a predetermined threshold value, a current peak target value of the polarity where normal discharge occurs is raised, as shown in FIG. 14, before or simultaneously with the startup of the half-wave improvement mode explained in the first to fourth embodiments, so that the electrode temperature of the polarity where normal discharge does not occur is increased. This facilitates the initiation of thermal electron emission, thereby quickly shifting the high pressure discharge lamp to a stable lighting state.

In addition, as shown in FIGS. 15 and 16, the same effect can be achieved by making the square wave duty width of the polarity where normal discharge occurs longer than the square wave duty width of the polarity where normal discharge does not occur. While the example of FIG. 15 shows that the square wave duty width is controlled as in $t2'<t1=t2<t1'$ under a state where $T1=T2$, the example of FIG. 13 shows that $t2'<t1=t2$ by shortening the square wave period as in $T1>T2$.

As described so far, depending on the half-wave improvement mode, if the formation of nearly symmetric discharge in positive and negative periods is detected, the high pressure discharge lamp lighting device terminates the half-wave improvement mode and is controlled in a normal stable lighting mode.

As described above, the amount of current of the polarity where normal discharge occurs is altered before or simultaneously with the startup of the half-wave improvement mode explained in the first to fourth embodiments. Thus, an asymmetric discharge state of the lamp is eliminated and the high pressure discharge lamp is quickly shifted to a stable lighting state, thereby realizing a high pressure discharge lamp lighting device with less startup failure and good startability.

Embodiment 7

Figure 17:
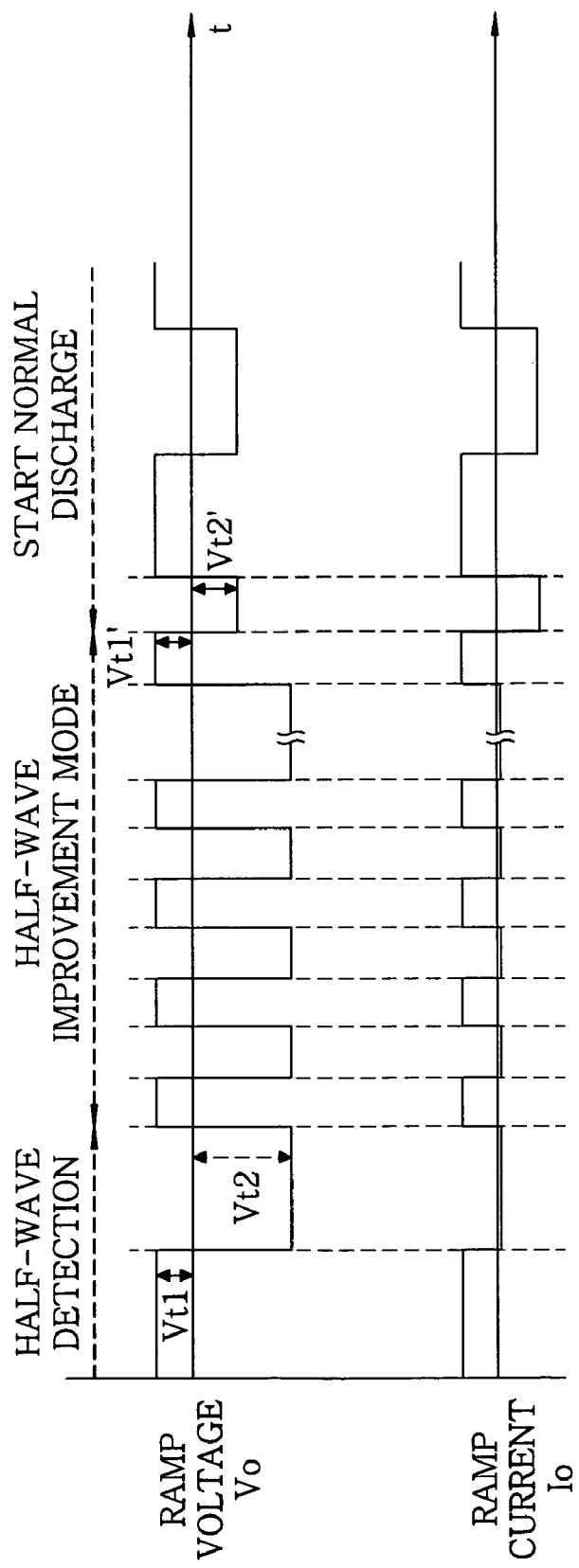
FIG. 17 is an operation waveform diagram of a seventh embodiment of the present invention.
Figure 18:
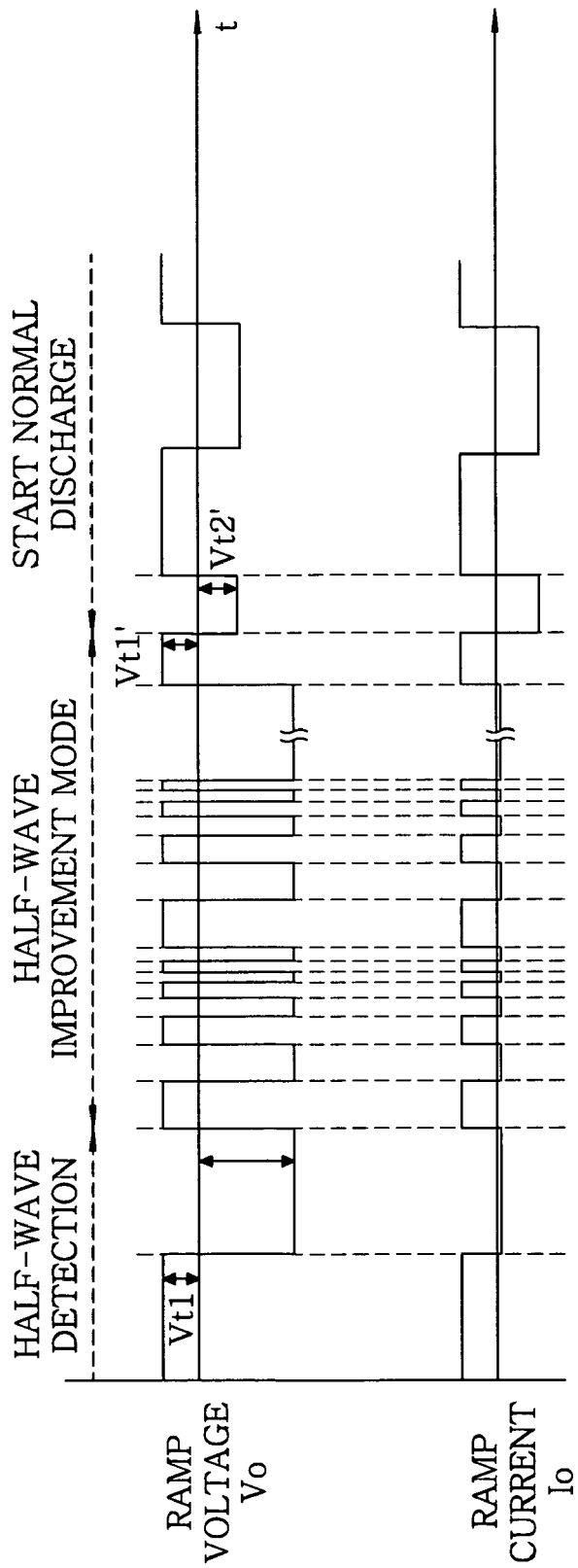
FIG. 18 is an operation waveform diagram of the seventh embodiment of the present invention.

FIGS. 17 and 18 show the operation of a seventh embodiment of the present invention. One of circuit configuration of the first to fourth embodiments, e.g., the configuration of FIG. 8, may be employed.

The half-wave improvement mode explained in the first to sixth embodiments is adopted, and a polarity inversion frequency is increased to facilitate discharge, thereby enabling the high pressure discharge lamp to be quickly shifted to the stable lighting state. At this time, the polarity inversion frequency may be fixed to a frequency higher than that during normal lighting as shown in FIG. 17, or may be varied as shown in FIG. 18. Depending on the half-wave improvement mode, if the formation of nearly symmetric discharge in positive and negative periods is detected, the high pressure discharge lamp lighting device terminates the half-wave improvement mode and is controlled in a normal stable lighting mode.

Here, as shown in FIG. 10 of the fourth embodiment, in case where the duty width of the polarity where normal discharge does not occur is increased to facilitate discharge, the polarity inversion frequency is already being lowered and thus a control for frequency increase of the seventh embodiment cannot be performed. Therefore, it is necessary to improve a half-wave discharge by either one unit.

As described above, the polarity inversion frequency is increased simultaneously with the half-wave improvement mode of the first to sixth embodiments. Thus, an asymmetric discharge state of the lamp is eliminated and the high pressure discharge lamp is quickly shifted to a stable lighting state, thereby realizing a high pressure discharge lamp lighting device with less startup failure and good startability.

Embodiment 8

Figure 19:
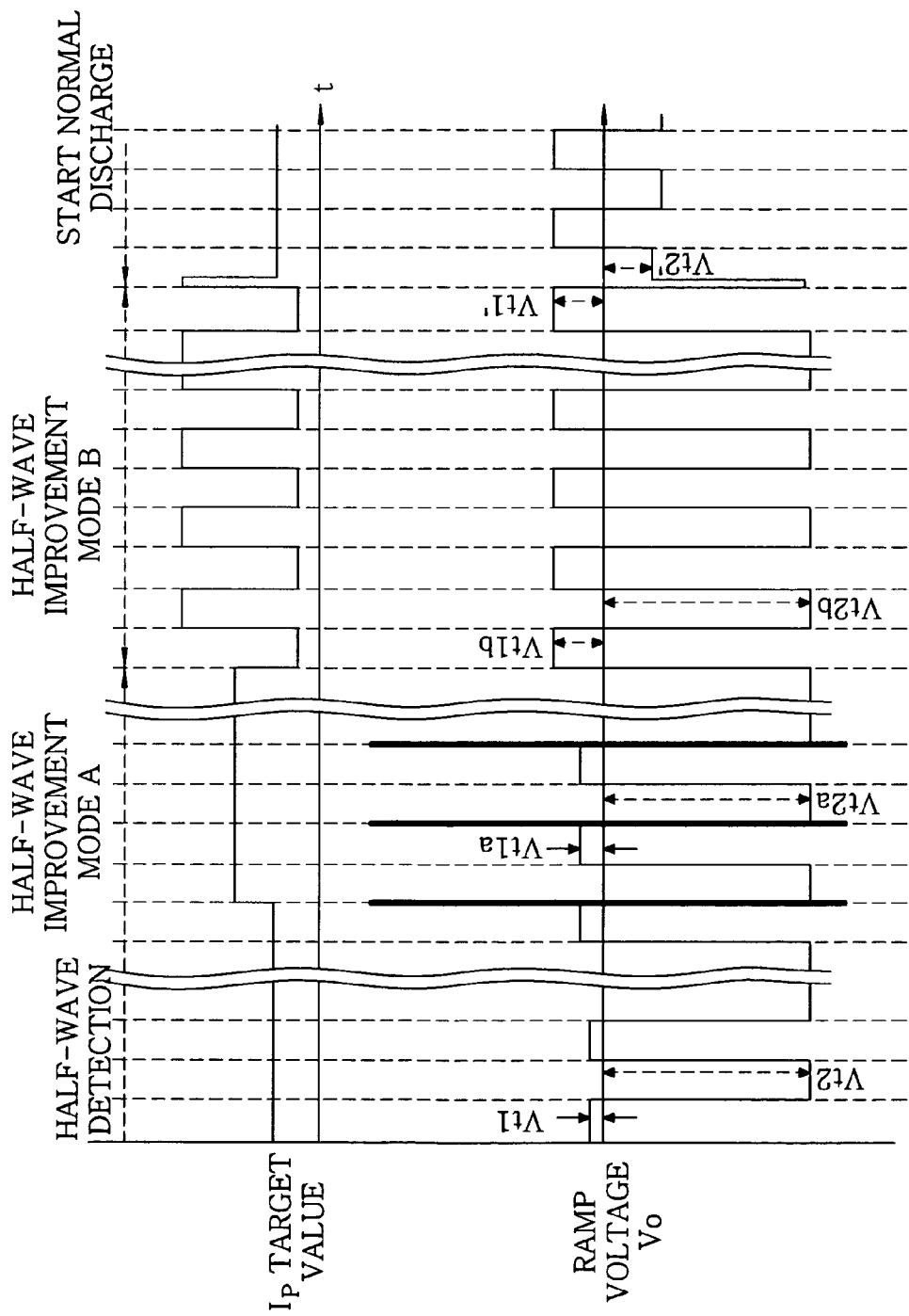
FIG. 19 is an operation waveform diagram of an eighth embodiment of the present invention.

FIG. 19 shows the operation of an eighth embodiment of the present invention. One of circuit configuration of the first to fourth embodiments, e.g., the configuration of FIG. 8, may be employed.

In the half-wave improvement mode explained in the first to seventh embodiments, as shown in FIG. 19, it is possible to realize startup improvement for each state of the lamp by adopting a proper control depending on the lamp voltage Vo of a square wave half period in which normal discharge occurs or varying a control target value (Ip target value).

Hereinafter, control of FIG. 19 will be explained. If a half-wave mode is detected and the lamp voltage at that time is Vt1a in the drawing, a half-wave improvement mode A starts. In this half-wave improvement mode A, the current peak target value (Ip target value) is increased, and thermal electron emission is further accelerated in the polarity where normal discharge occurs to increase the temperature of the electrode with which electrons are in contact.

In the polarity where normal discharge does not occur, current flows as soon as a hot spot, which is the origin of the thermal electron emission, is formed. Further, at the time of polarity inversion from the square wave half period where normal discharge occurs to the square wave half period where normal discharge does not occur, a startup voltage is generated to facilitate electric field emission.

In case of Vt1b where the lamp voltage is high due to the detection of the half-wave mode or due to an increase of the lamp voltage in the state of the half-wave improvement mode A, the control circuit unit 7 performs control of a half-wave improvement mode B. In the half-wave improvement mode B, the current peak target value in the polarity where normal discharge does not occur is further increased, compared with in the half-wave improvement mode A, to increase the current level after initiation of thermal electron emission, while the current peak target value in the polarity where normal discharge occurs is lowered to facilitate an operation of lowering the vapor pressure in the arc tube.

As described above, the control of the first to seventh embodiments is adopted for each state of the high pressure discharge lamp or the control target value is varied. Thus, an asymmetric discharge state of the high pressure discharge lamp is eliminated and the high pressure discharge lamp is quickly shifted to a stable lighting state, thereby realizing a high pressure discharge lamp lighting device with less startup failure and good startability.

Embodiment 9

Figure 20:
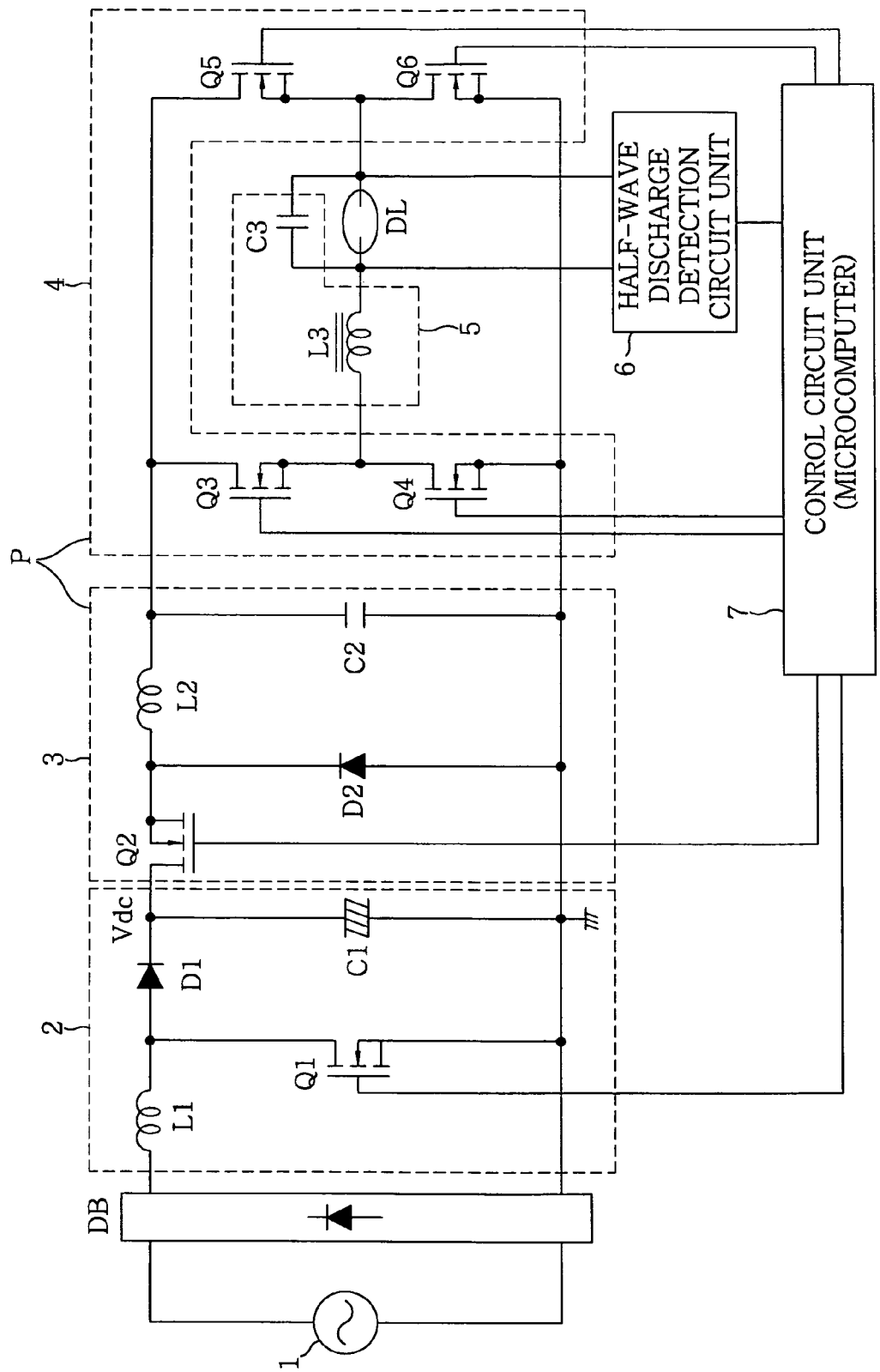
FIG. 20 is a circuit diagram of a ninth embodiment of the present invention.

FIG. 20 shows a circuit diagram of a lighting device of a ninth embodiment of the present invention. An AC power source 1 is full-wave rectified by a rectifier DB, and converted into a DC voltage Vdc by a DC power source circuit 2. The DC power source circuit 2 includes a step-up chopper circuit having an inductor L1, a switching element Q1, a diode D1, and a capacitor C1.

The switching element Q1 of the DC power source circuit 2 is turned on and off at a high frequency by a control circuit unit 7. Although not shown, current of the switching element Q1, current of the inductor L1, and input and output voltages of the DC power source circuit 2 are monitored by the control circuit unit 7, an AC input from the commercial AC power 1 is converted into a predetermined DC voltage, and a power factor improvement control for giving resistance to the circuits is performed such that the phase of an input current and the phase of an input voltage are identical to each other A power supply circuit P serving as a stabilizer for controlling power supplied to the high pressure discharge lamp DL is connected to the output of the DC power source circuit 2. Although FIG. 20 shows a circuit configuration in which the step-down chopper circuit 3 and the inverter circuit 4 are combined as the power supply circuit P, the function of the step-down chopper circuit 3 may be used as the inverter circuit 4 as described in the conventional examples.

The step-down chopper circuit 3 includes a switching element Q2, a diode D2, an inductor L2, and a capacitor C2, and is a circuit that outputs a DC voltage obtained by stepping down an input voltage. Further, the step-down chopper circuit 3 is used as a stabilizer that adjusts power supplied to the high pressure discharge lamp DL by controlling on/off of the switching element Q2 by a PWM signal from the control circuit unit 7.

The inverter circuit 4 is a full-bridge circuit including switching elements Q3 to Q6. As the pair of the switching elements Q3 and Q6 and the pair of the switching elements q4 and Q5 are alternately turned on at a low frequency of several tens to several hundreds of Hz by a control signal from a control circuit unit 7, this inverter circuit 4 supplies a square wave AC power to the discharge lamp DL.

Further, upon startup, the pair of the switching elements Q3 and Q6 and the pair of the switching elements Q4 and Q5 are alternately turned on at a high frequency of several tens to several hundreds of kHz which is near a resonance frequency of a resonant starting circuit 5 or a frequency near 1 of the integer part thereof by a control signal from a control circuit unit 7, thereby supplying a high voltage for startup to the high pressure discharge lamp DL.

The resonant starting circuit 5 includes an LC serial resonance circuit of an inductor L3 and a capacitor C3 connected to the output of the inverter circuit 4, and the high pressure discharge lamp DL is connected in parallel with the capacitor C3.

A lamp voltage Vo is detected by a half-wave discharge detection circuit unit 6. Further, the control circuit unit 7 detects a lamp current Io of the high pressure discharge lamp DL, current of the switching element Q2, and current of the inductor L2 by a detection unit (not shown), performs on and off control of the switching element Q2 based on detection results thereof, and performs control of the switching element Q2 of the step-down chopper circuit 3 and control of the switching elements Q3 to Q6 of the inverter circuit 4 to supply desired current or power to the high pressure discharge lamp DL. This control circuit unit 7 is configured by including, e.g., a microcomputer.

The discharge lamp DL is a high-luminance and high pressure discharge lamp (HID), such as a metal halide lamp or a high pressure mercury lamp. The high pressure discharge lamp becomes a low impedance state if it dielectrically breaks down upon startup, and the lamp voltage Vo is lowered to several V, but thereafter, the lamp voltage Vo gradually rises up to a stable voltage over several minutes and becomes nearly constant at a rated lamp voltage (several tens to several hundreds of V), and hence the high pressure discharge lamp continues to be lighted in this state.

The half-wave discharge circuit unit 6 detects a half-wave discharge state in a startup process (process in which the lamp voltage gradually rises), and switches the operation of the control circuit unit 7 to a half-wave improvement mode upon detection of the half-wave discharge state in the startup process.

Hereinafter, a concrete operation will be described with reference to FIG. 21. First, as shown in the startup period Ta, when a commercial AC power 1 source is input, the switching elements Q3 to Q6 of the inverter circuit 4 are alternately turned on and off at a high frequency, by forming a pair of the switching elements Q3 and Q6 and a pair of the switching elements Q4 and Q5, and a high voltage is generated by an LC resonance operation of the starting circuit 5.

Figure 21:
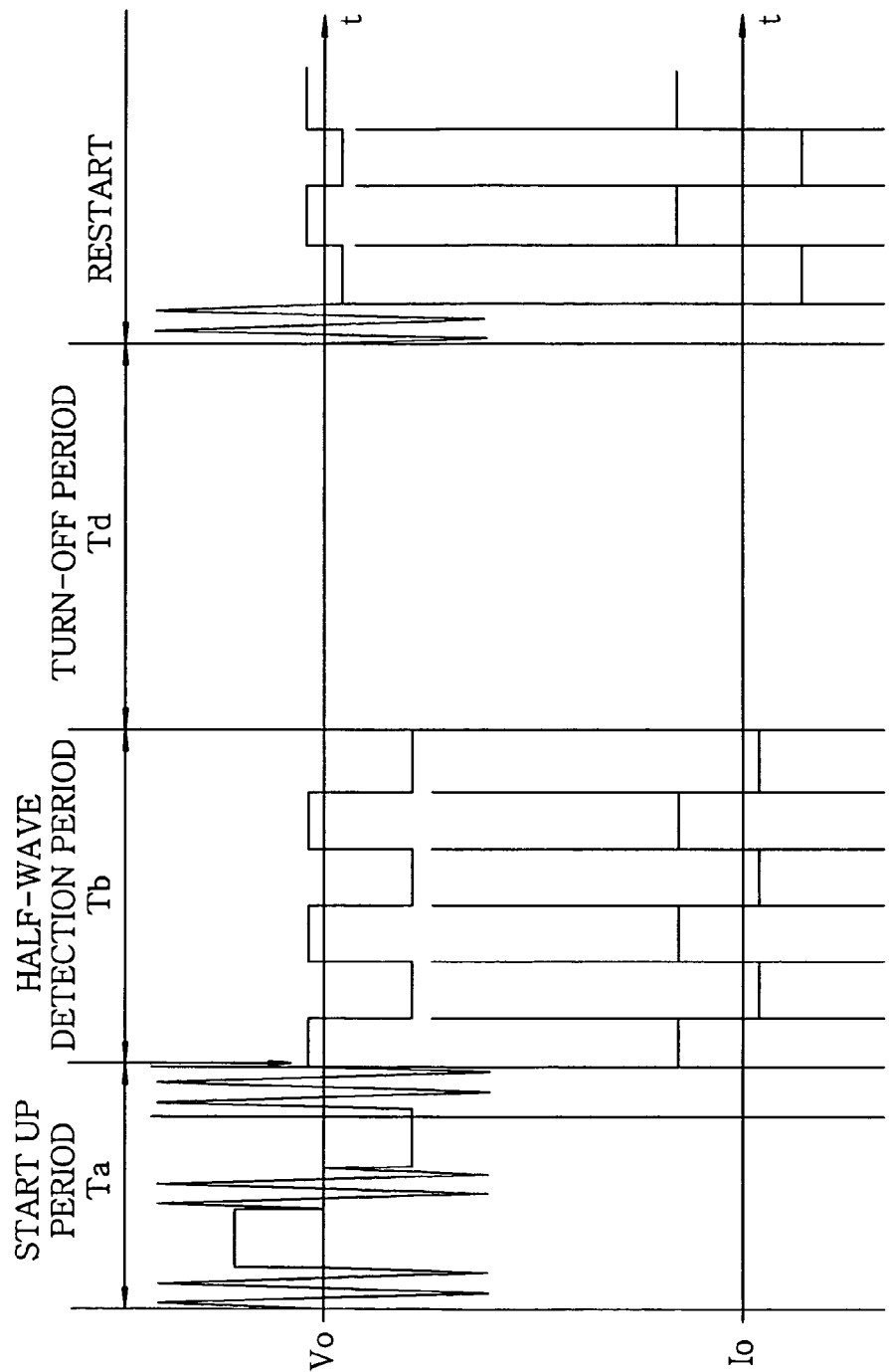
FIG. 21 is an operation waveform diagram of the ninth embodiment of the present invention.

Thereafter, the switching elements Q3 to Q6 of the inverter circuit 4 operate at a low frequency, and the square wave voltage of low frequency as shown in FIG. 21 is applied to both ends of the high pressure discharge lamp DL. If the high pressure discharge lamp DL is not brought into a lighted state, the above operation is repeated but the switching elements Q3 to Q6 of the inverter circuit 4 are operated such that the low frequency voltage may be alternately applied in an inverted polarity as shown in FIG. 21.

When the high pressure discharge lamp DL is started up by the high voltage obtained by the LC resonance operation, the both-end voltage of the high pressure discharge lamp DL is lowered as in point A in the drawing. However, as discharge becomes unstable right after the startup of the high pressure discharge lamp DL, the voltage of one polarity is lowered but the voltage of the other polarity is not lowered as shown in the half-wave discharge detection period Tb. The waveform of the lamp current Io at that time is shown in the lower part of FIG. 21. Looking at the waveform of the lamp current Io, the current of one polarity and the current of the other polarity have different values. This phenomenon is called a half-wave discharge.

Here, although the waveform of the lamp current Io of FIG. 21 shows a state in which current flows in both polarities, it is often the case that no current flows at all in one polarity. That is, a half-wave discharge state refers to a state in which a current or voltage of one polarity and a current or voltage of the other polarity are greater than a set voltage value or current value and become unbalanced. In short, the half-wave discharge state is a state in which the absolute value of a voltage difference or current difference of the other polarity is greater than a decision threshold value of half-wave discharge.

The lamp voltage Vo applied to both ends of the high pressure discharge lamp DL is always detected by the half-wave discharge detection circuit unit 6. Thus, if a half-wave discharge state continues for a predetermined time period Tb, the power converter circuit P (the step-down chopper circuit 3 and the inverter circuit 4) stops power supply to the high pressure discharge lamp DL. This is the turn-off period Td in the drawing.

After the lapse of the turn-off period Td, the power supply circuit P is operated in order to start up the high pressure discharge lamp DL again. At this point, during a restart period, the power supply circuit P applies a high voltage for startup and a load voltage of a square wave half period, preferably starting from the polarity having a load current of smaller magnitude in the half-wave discharge detection period Tb.

As a result, a half-wave discharge phenomenon hardly occurs upon restart after the lapse of the turn-off period Td. And, as shown in FIG. 21, after breakdown of the high pressure discharge lamp DL at a high voltage, load voltages of both polarities are concurrently lowered, thus maintaining good startability.

This series of operations allows the high pressure discharge lamp DL to be restarted without continuing the half-wave discharge.

Although the circuit diagram of FIG. 20 and the waveform diagram of FIG. 21 show that a high voltage for startup is generated by the resonant operation of the LC serial resonance circuit, the configuration of the starting circuit 5 for generating a high voltage is not limited thereto.

Embodiment 9'

Figure 22:
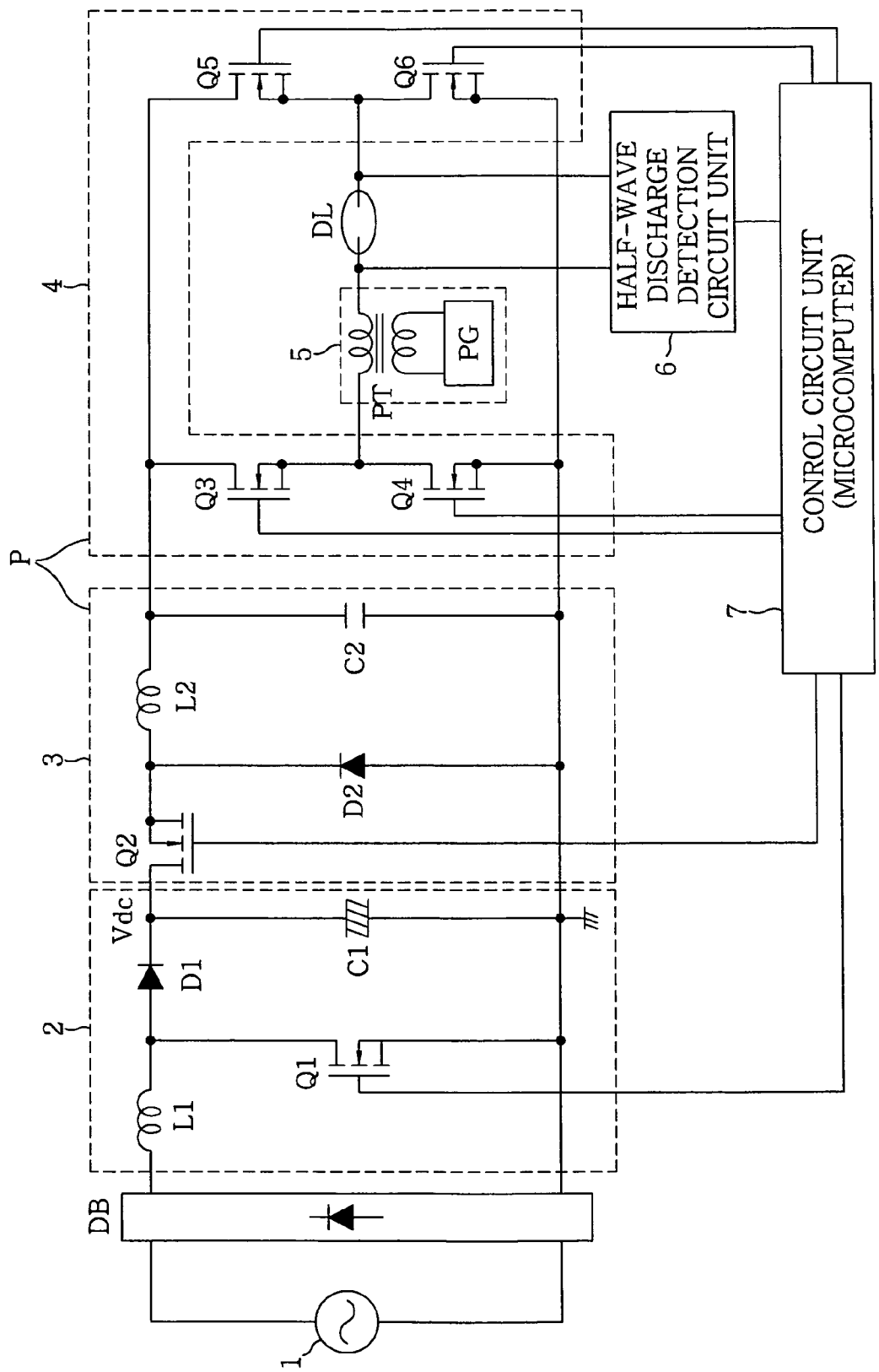
FIG. 22 is a circuit diagram of a modified example of the ninth embodiment of the present invention.

FIG. 22 is a circuit diagram of a modified example of the ninth embodiment. In this circuit, the starting circuit 5 has a different configuration, and a pulse generator PG and a pulse transformer PT are combined. The pulse generator PG is a circuit that generates a pulse voltage applied to the primary coil of the pulse transformer PT. Here, the pulse generator PG is a circuit capable of generating a startup pulse voltage at a given timing in response to a command from the control circuit unit 7. As for a concrete circuit configuration of the pulse generator PG, the pulse generator PG may have the same configuration as the conventional example (FIG. 50) as long as it generates a pulse voltage right after polarity inversion for example, but the on and off of the switching element Q7 for generating a startup pulse is preferably controllable by the control circuit unit 7.

A concrete operation will be described in FIG. 23. First, as shown in the startup period Ta in the drawing, when a commercial AC power source 1 is input, the switching elements Q3 to Q6 of the inverter circuit 4 are operated at a low frequency from startup, by forming a pair of the switching elements Q3 and Q6 and a pair of the switching elements Q4 and Q5, and a square wave voltage of low frequency shown in FIG. 23 is applied to both ends of the high pressure discharge lamp DL.

The pulse generator PG generates a pulse voltage when the polarity of the square wave voltage of low frequency is inverted. This pulse voltage is stepped up by the pulse transformer PT, and applied to both ends of the high pressure discharge lamp DL from the secondary coil of the pulse transformer PT through the capacitor C2. If the high pressure discharge lamp DL is not brought into a lighted state, the above operation is repeated and the switching elements Q3 to Q6 of the inverter circuit 4 are operated such that the low frequency voltage may be alternately applied in an inverted polarity as shown in FIG. 21.

When the high pressure discharge lamp DL is started up by the high voltage obtained by the pulse generation operation, the both-end voltage of the high pressure discharge lamp DL is lowered as in point A in the drawing. However, as discharge becomes unstable right after the startup of the high pressure discharge lamp DL, the voltage of one polarity is lowered but the voltage of the other polarity is not lowered as shown in the half-wave discharge detection period Tb. The waveform of the lamp current Io at that time is shown in the lower part of FIG. 23. Looking at the waveform of the lamp current Io, the current of one polarity and the current of the other polarity have different values. This phenomenon is called a half-wave discharge.

Figure 23:
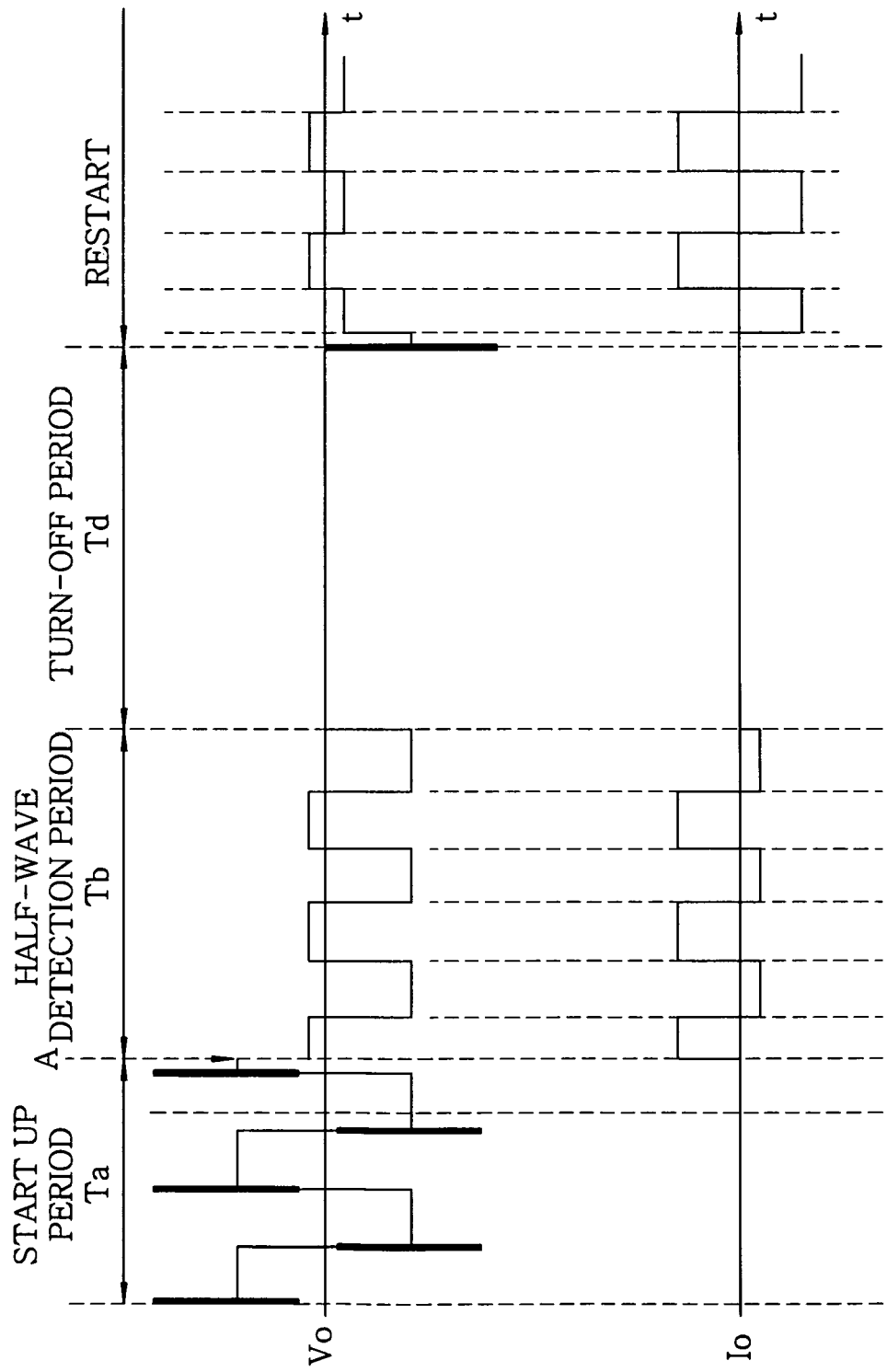
FIG. 23 is an operation waveform diagram of a modified example of the ninth embodiment of the present invention.

Here, although the waveform of the lamp current Io of FIG. 23 shows a state in which current flows in both polarities, it is often the case that no current flows at all in one polarity. That is, a half-wave discharge state refers to a state in which a current or voltage of one polarity and a current or voltage of the other polarity are greater than a set voltage value or current value and become unbalanced. In short, the half-wave discharge state is a state in which the absolute value of a voltage difference or current difference of the other polarity is greater than a decision threshold value of half-wave discharge.

The both-end voltage Vo of the discharge lamp DL is always detected by the half-wave discharge detection circuit unit 6. Thus, if a half-wave discharge state continues for a predetermined time period Tb, the power converter circuit P stops power supply to the discharge lamp DL. This is the turn-off period Td in the drawing.

After the lapse of the turn-off period Td, the power supply circuit P is operated in order to start up the high pressure discharge lamp DL again. At this point, during a restart period, the power supply circuit P applies a high voltage for startup and a load voltage of a square wave half period, preferably starting from the polarity having the load current of smaller magnitude in the half-wave discharge detection period Tb.

By such an operation, a half-wave discharge phenomenon hardly occurs upon restart after the lapse of the turn-off period Td. And, as shown in FIG. 23, after breakdown of the high pressure discharge lamp DL at a high voltage, load voltages of both polarities are concurrently lowered, thus maintaining good startability.

This series of operations allows the high pressure discharge lamp DL to be restarted without continuing the half-wave discharge.

Embodiment 10

A tenth embodiment of the present invention will be described with reference to FIGS. 24 to 27. The tenth embodiment describes a concrete form of half-wave discharge detection in the half-wave discharge detection period Tb. The circuit configuration thereof may be identical to that of FIG. 20 or 22.

In the high pressure discharge lamp, a half-wave discharge can be seen right after startup due to non-uniform electrode temperature or the like. However, it is common that after a half-wave discharge during startup, the discharge becomes bipolar and stable.

As described above, this embodiment makes it possible to prevent the detection of half-wave discharge during a short period right after startup, in which a half-wave discharge can be detected with good accuracy in a situation where a half-wave discharge occurs continuously or even after a certain period of time. A concrete operation will be explained with reference to FIGS. 24 and 25.

Figure 24:
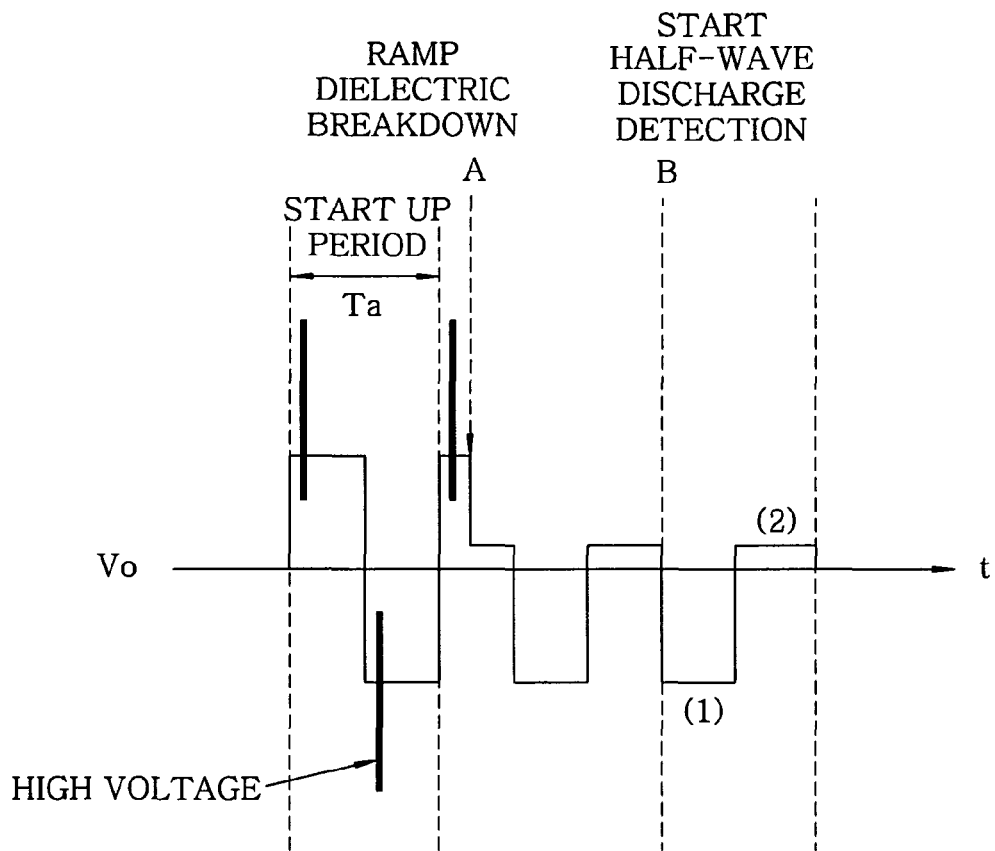
FIG. 24 is an operation waveform diagram of a tenth embodiment of the present invention.

In FIG. 24, after the startup period Ta of the high pressure discharge lamp DL, the lamp dielectrically breaks down at point A, and then the detection of a half-wave discharge is initiated at point B. As a result, it becomes possible to ignore a half-wave discharge (half-wave between point A and point B) that occurs right after the startup of the high pressure discharge lamp DL. At this time, the time period between point A and point B is set to a length of time enough for the high pressure discharge lamp DL to be immediately started by the restart after the turn-off caused by the detection of a half-wave discharge.

Figure 25:
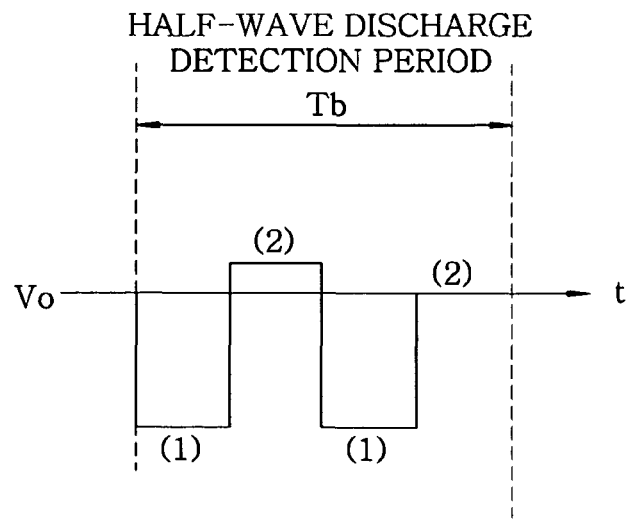
FIG. 25 is an operation waveform diagram of the tenth embodiment of the present invention.

FIG. 24 is an example in which it is determined that a half-wave discharge occurs if the absolute value of a voltage difference between a polarities (1) and (2) in the drawing is greater than a decision threshold value of half-wave discharge FIG. 25 is an example in which the absolute value of a voltage difference between the polarities (1) and t (2) in the drawing is calculated and it is regarded that a half-wave discharge occurs only when a first voltage difference and a second voltage difference are different.

Figure 26:
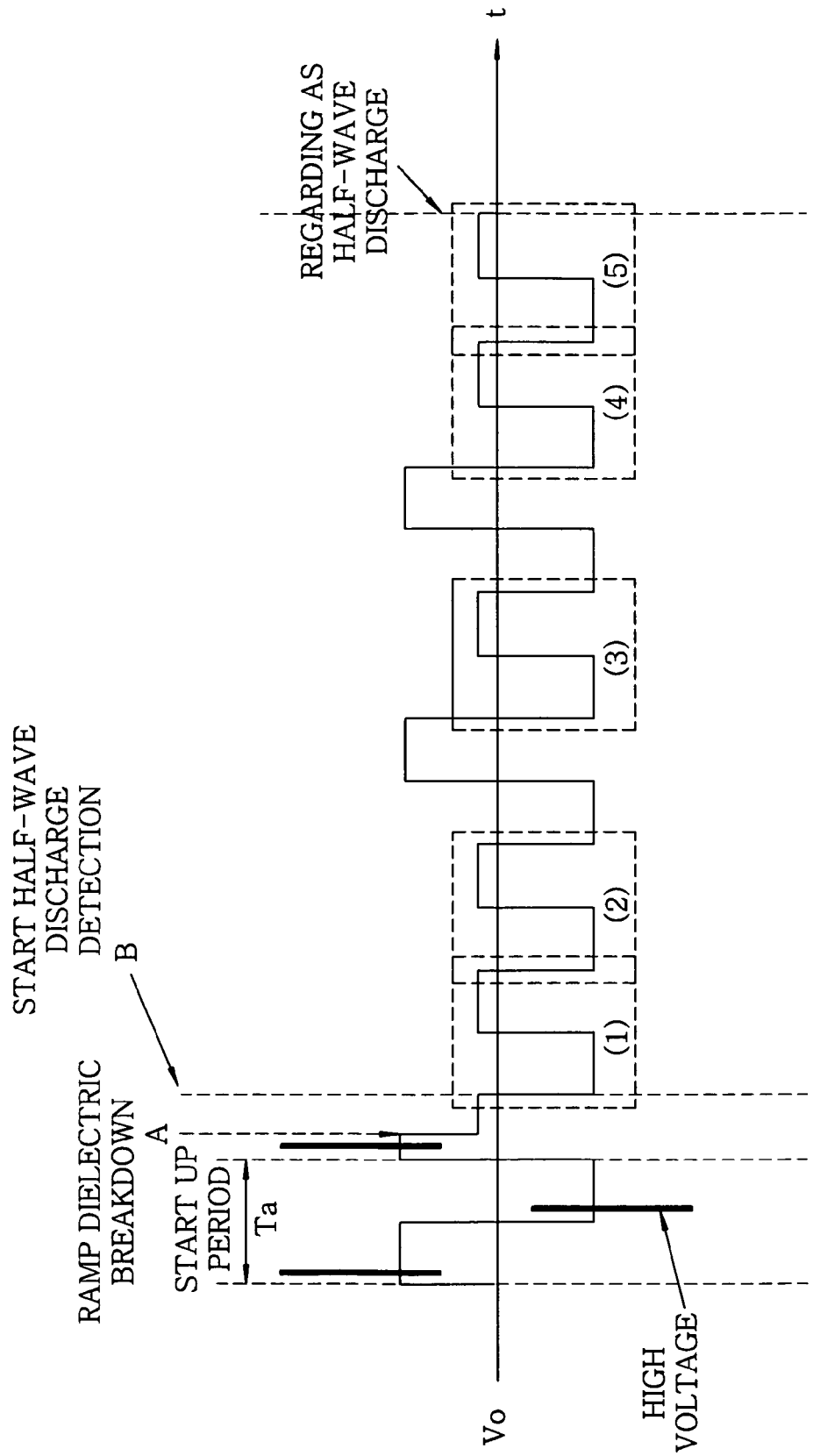
FIG. 26 is an operation waveform diagram of the tenth embodiment of the present invention.

FIG. 26 is an example in which the start (point B) of detection of half-wave discharge occurs right after the startup of the high pressure discharge lamp DL (specifically, e.g., from an inverting point right after the point A at which the lamp dielectrically breaks down) and it is regarded that a half-wave discharge occurs when the period of a half-wave discharge state is repeated multiple times. For example, in FIG. 26, it is regarded that a half-wave discharge occurs at the point of time when the half-wave discharge state occurs five times (five periods).

Figure 27:
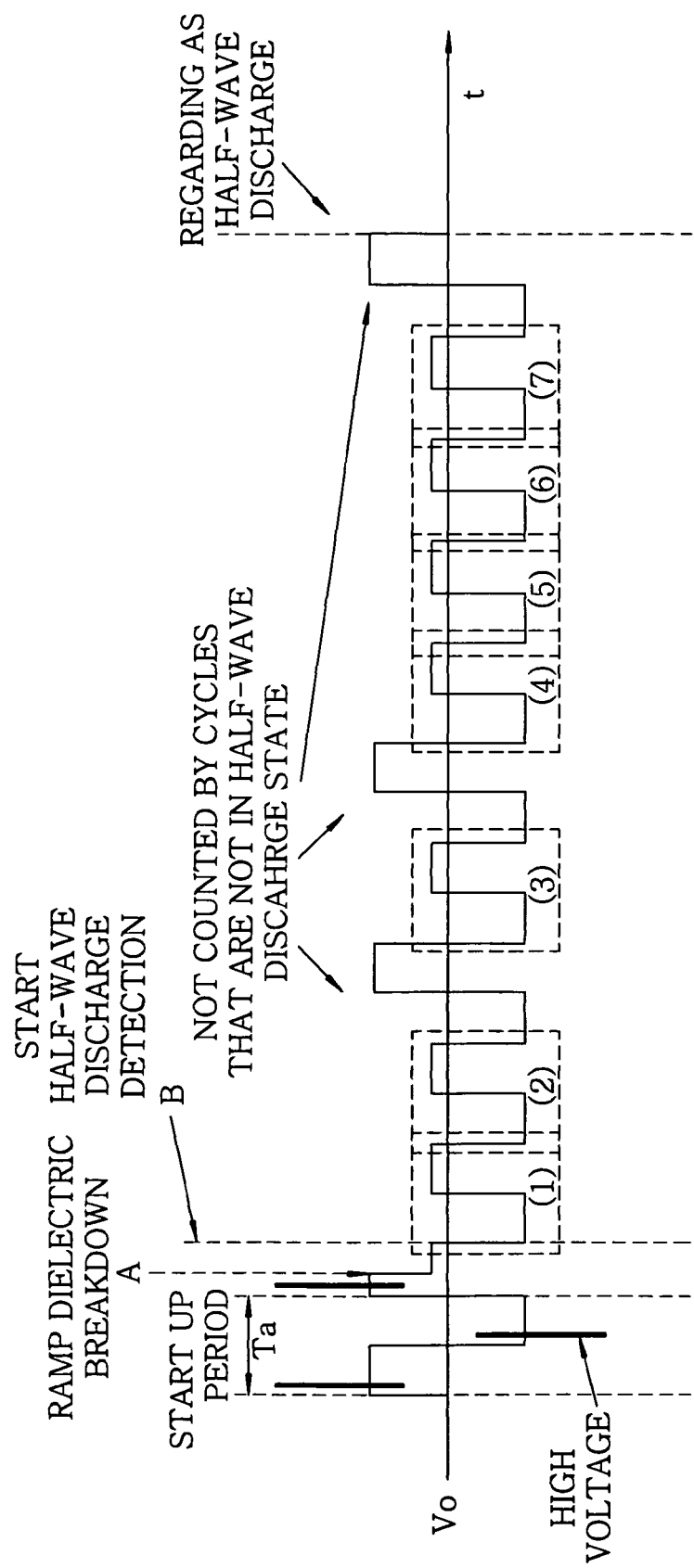
FIG. 27 is an operation waveform diagram of the tenth embodiment of the present invention.

FIG. 27 is an example in which the start (point B) of detection of half-wave discharge occurs right after the startup of the high pressure discharge lamp DL (specifically, e.g., from an inverting point right after the point A at which the lamp dielectrically breaks down) and it is determined that a half-wave discharge occurs when the ratio of occurrence of a half-wave discharge state during a predetermined period exceeds a predetermined value. For example, if a period of half-wave discharge state occurs more than six times out of ten, it is detected that a half-wave discharge occurs. In the illustrated example, it is regarded that a half-wave discharge occurs at the point of time when a half-wave discharge state occurs seven times out of ten (7 periods), that is, in the ratio of ten to seven.

Embodiment 11

An eleventh embodiment of the present invention will be described with reference to FIG. 28. A circuit configuration thereof may be identical to that of FIG. 22. The difference with the first and second embodiments is that a half-wave discharge suppression control (or start facilitation control) period Tc is provided before the turn-off period Td.

Figure 28:
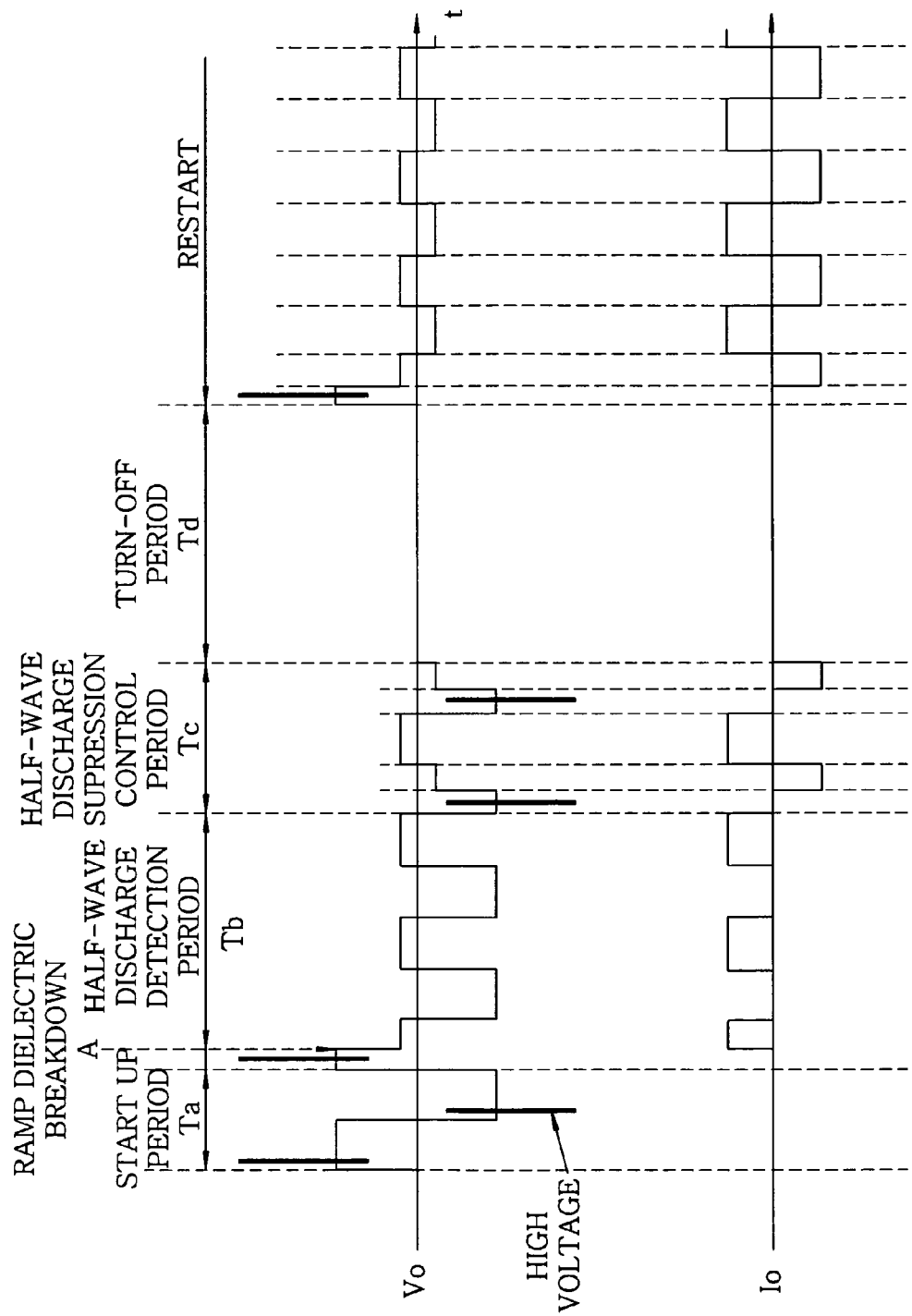
FIG. 28 is an operation waveform diagram of an eleventh embodiment of the present invention.

As for the operation of the half-wave discharge suppression control period Tc shown in FIG. 28, when it is decided that a half-wave discharge occurs in a half-wave discharge detection period Tb, the starting circuit 5 is operated for a predetermined time period such that a high voltage pulse is applied to the polarity having high voltage value (or the polarity having low current value) in the half-wave discharge detection period Tb. By such an operation, current readily flows in the polarity through which current hardly flows during the half-wave discharge detection period Tb by applying a high voltage pulse. As a result, the high pressure discharge lamp DL becomes readily dischargeable right before the turn-off period Td, thereby suppressing the occurrence of a half-wave discharge upon restart after the lapse of the turn-off period Td.

Embodiment 12

Figure 29:
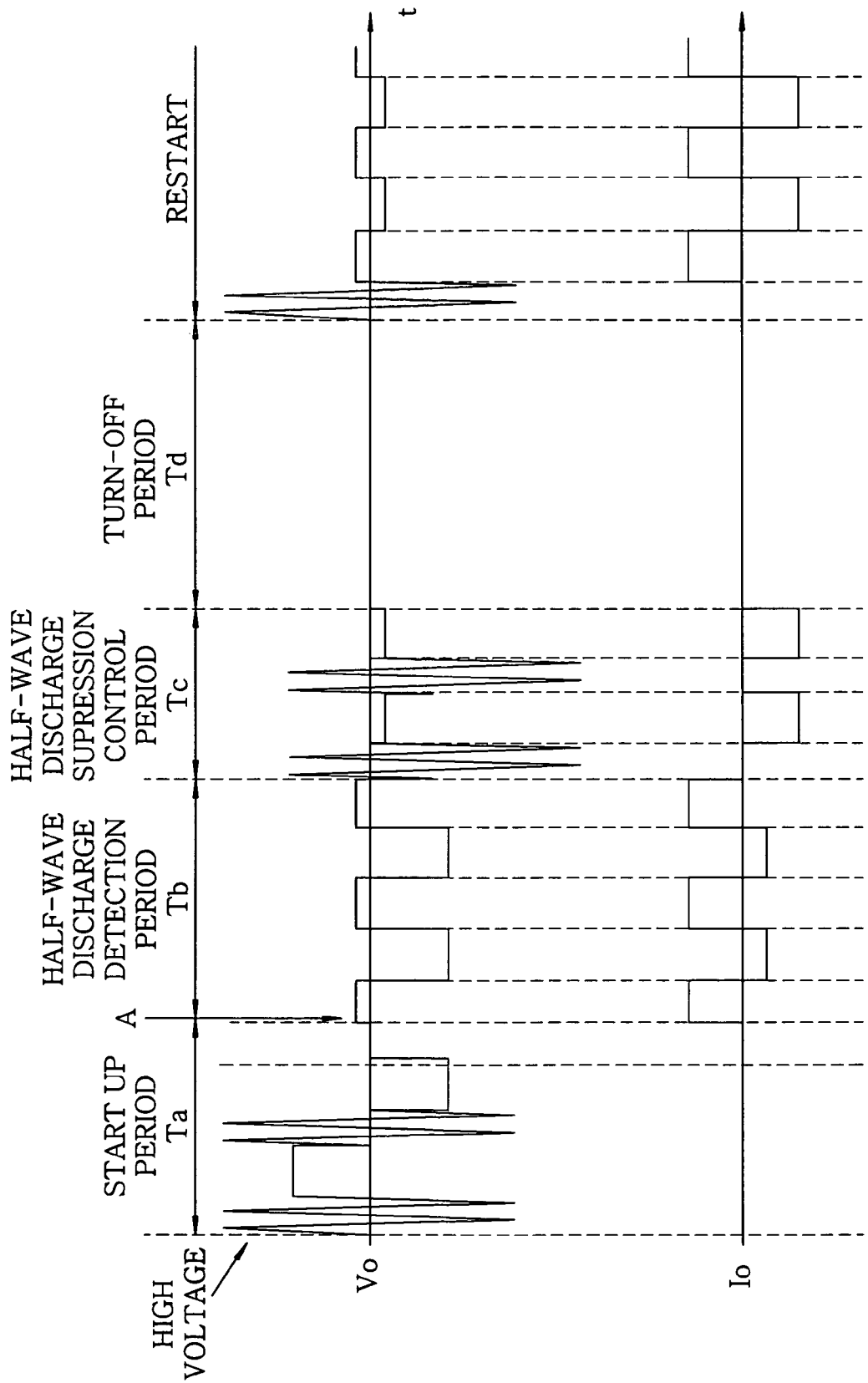
FIG. 29 is an operation waveform diagram of a twelfth embodiment of the present invention.

A twelfth embodiment of the present invention will be described with reference to FIG. 29. A circuit configuration thereof may be identical to that of FIG. 20. In the twelfth embodiment, a method of application of a high voltage upon starting and restarting the lamp is performed by a resonant operation, and, during the half-wave discharge suppression control period Tc, a high voltage at resonance superposed with a DC voltage is applied to the polarity having high voltage value (or the polarity having low current value) in the half-wave discharge detection period Tb.

By such an operation, even if the method of generation of a high voltage for startup is performed at resonance, a high voltage can be applied to the polarity through which current hardly flows during the half-wave discharge detection period Tb. As a result, the high pressure discharge lamp DL becomes readily dischargeable right before the turn-off period Td, thereby suppressing the occurrence of a half-wave discharge upon restart.

Embodiment 13

Figure 30:
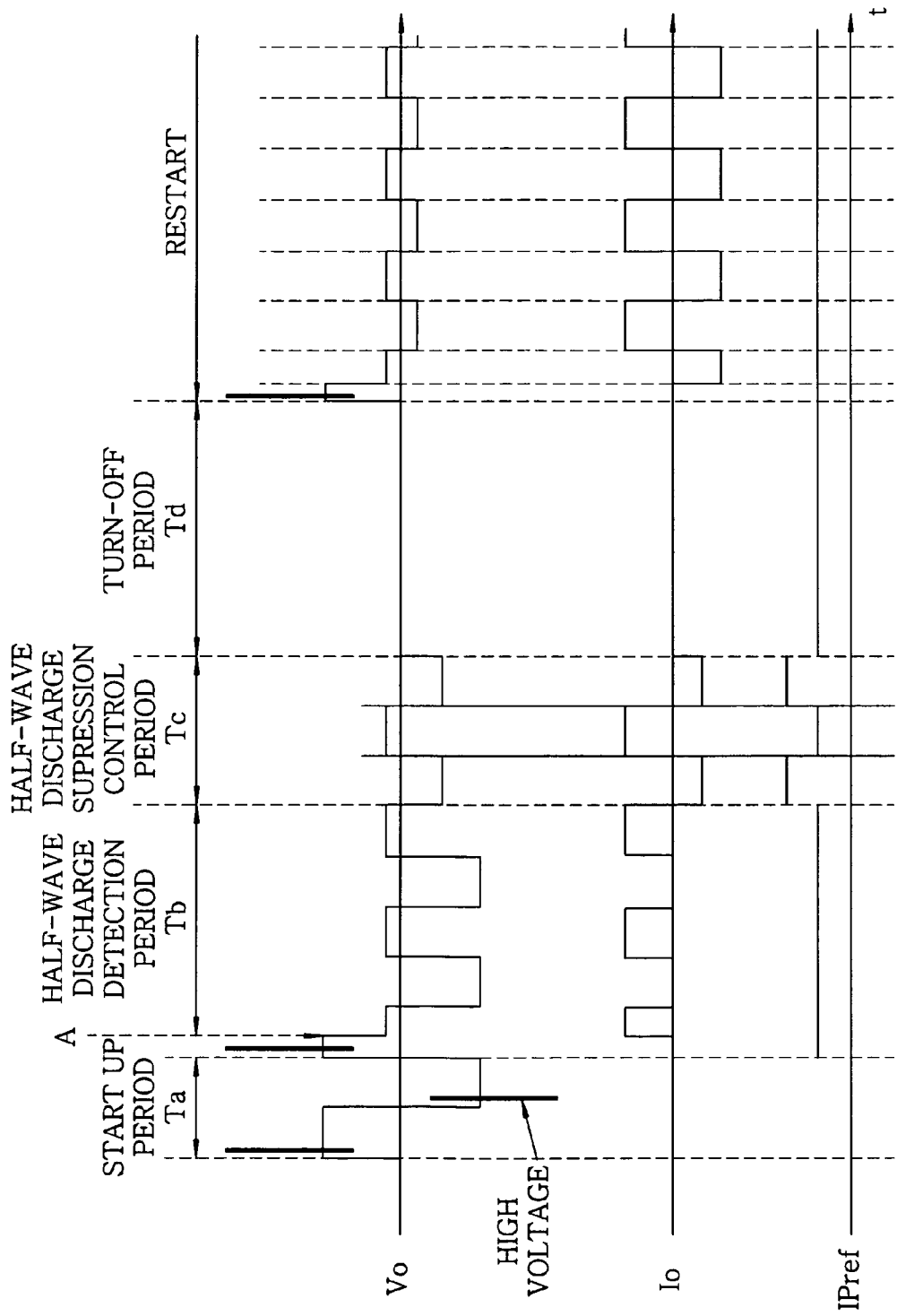
FIG. 30 is an operation waveform diagram of a thirteenth embodiment of the present invention.

A thirteenth embodiment of the present invention will be described with reference to FIG. 30. A circuit configuration thereof may be identical to that of FIG. 22. In the thirteenth embodiment, during the half-wave discharge suppression control period Tc, a current control target value IPref is increased higher than a normal reference value with respect to the polarity having high voltage value (or the polarity having low current value) in the half-wave discharge detection period Tb, thereby raising the level of the lamp current.

Here, the current control target value IPref is a target value of the peak value of a chopper current of the step-down chopper circuit 3. The chopper current flowing in the inductor L2 is detected by a detection means (not shown) and input to the control circuit unit 7, and when the current flowing in the inductor L2 reaches the current control target value IPref, the control circuit unit 7 turns off the switching element Q2 of the step-down chopper circuit 3. Also, when the regenerative current flowing through the diode D2 becomes zero, the switching element Q2 of the step-down chopper circuit 3 is turned on. The level of the lamp current can be raised by increasing the current control target value IPref.

As a result, the electrode at the side where the temperature is low and it is hard for the electrons to fly out is warmed up right before the turn-off period Td, thereby making the temperature of both electrodes uniform and suppressing the occurrence of a half-wave discharge upon restart.

Embodiment 14

Figure 31:
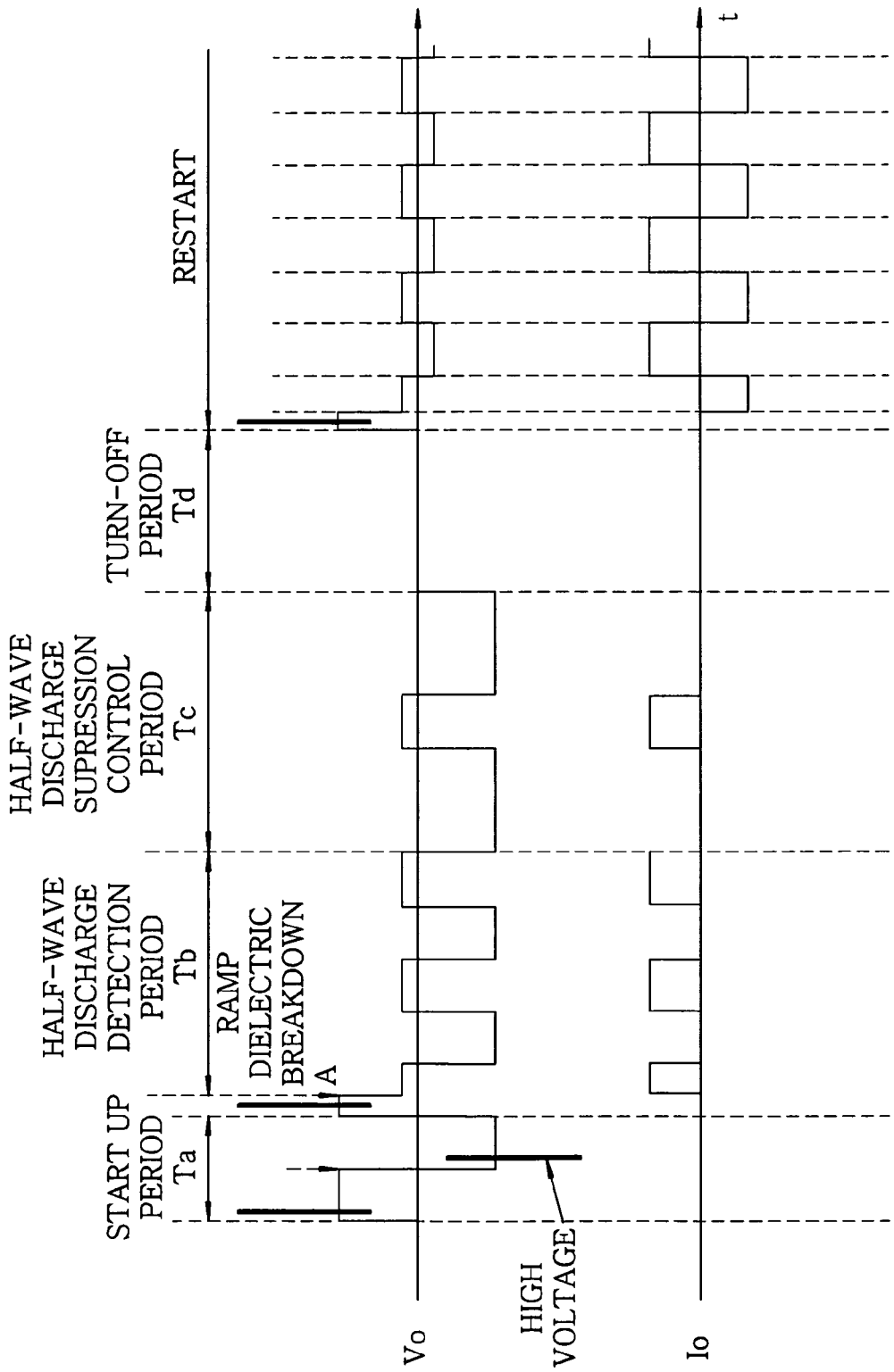
FIG. 31 is an operation waveform diagram of a fourteenth embodiment of the present invention.

A fourteenth embodiment of the present invention will be described with reference to FIG. 31. A circuit configuration thereof may be identical to that of FIG. 22. In the fourteenth embodiment of the present invention, during the half-wave discharge suppression control period Tc, the square wave half period of the polarity where the voltage value is larger (or the polarity where the current value is smaller) in the half-wave discharge detection period Tb is made longer than the normal time.

As a result, the electrode at the side where the temperature is low is warmed up right before the turn-off period Td, thereby making the temperature of both electrodes uniform and suppressing the occurrence of a half-wave discharge upon restart.

Embodiment 15

A fifteenth embodiment of the present invention will be described with reference to FIGS. 32 and 33. A circuit configuration thereof may be identical to that of FIG. 22. In this embodiment, an interruption time (turn-off period Td) after the detection of a half-wave discharge will be described.

Figure 32:
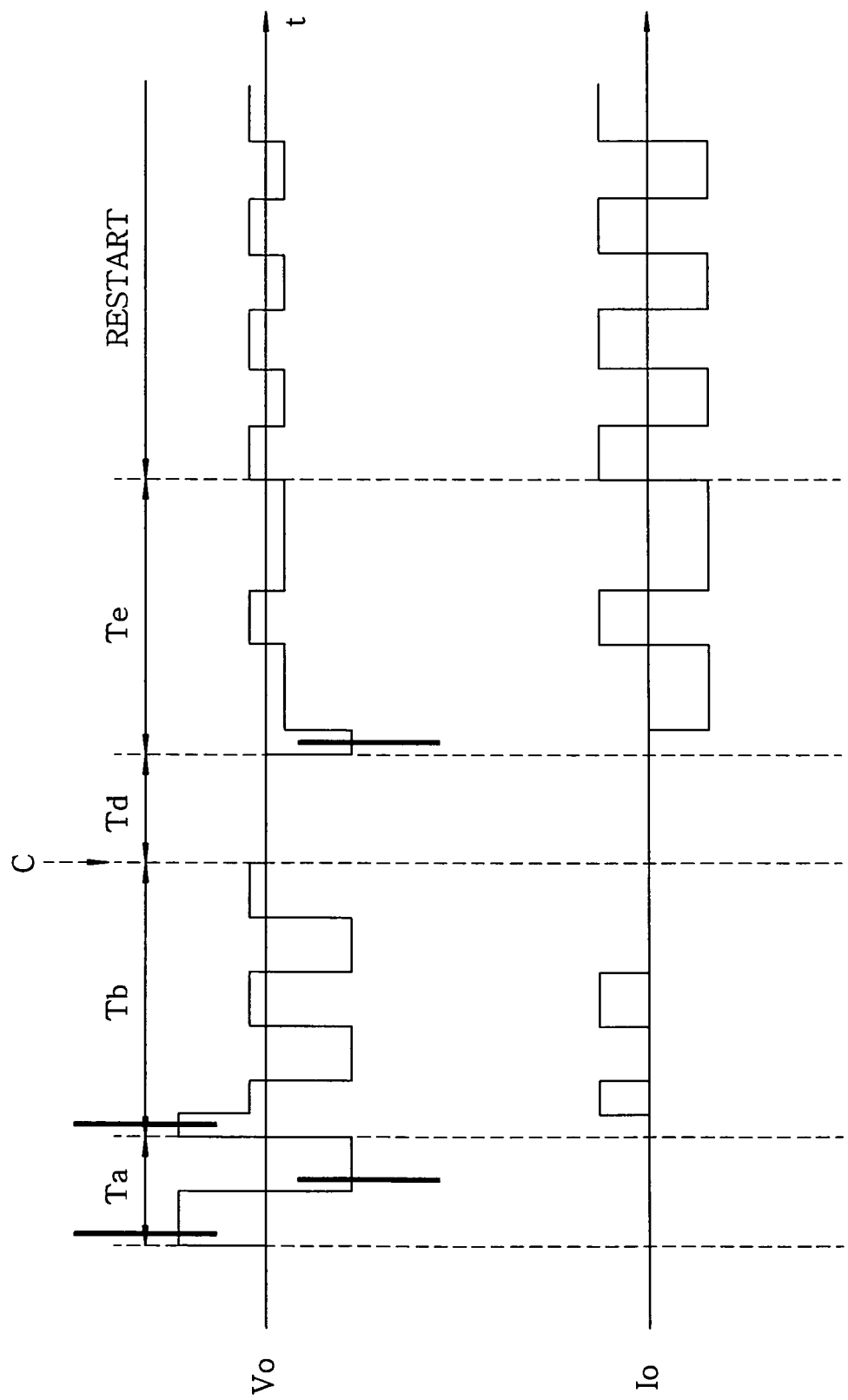
FIG. 32 is an operation waveform diagram of a fifteenth embodiment of the present invention.

As shown in FIG. 32, when it is decided that a half-wave discharge has occurred in the half-wave discharge detection period Tb (point C in the drawing), a transition is made to the turn-off period Td for a predetermined time, and after the turn-off for a predetermined time, a transition is made to the operation of the half-wave discharge avoidance period Te. Here, the turn-off period Td for a predetermined time involves a time period (at least one period), which necessarily includes both the polarity where a half-wave discharge occurs and the polarity where no half-wave discharge occurs. Thus, the high pressure discharge lamp DL can be completely lit out, and the state of the high pressure discharge lamp DL is reset for the moment to make a transition to the period Te.

Figure 33:
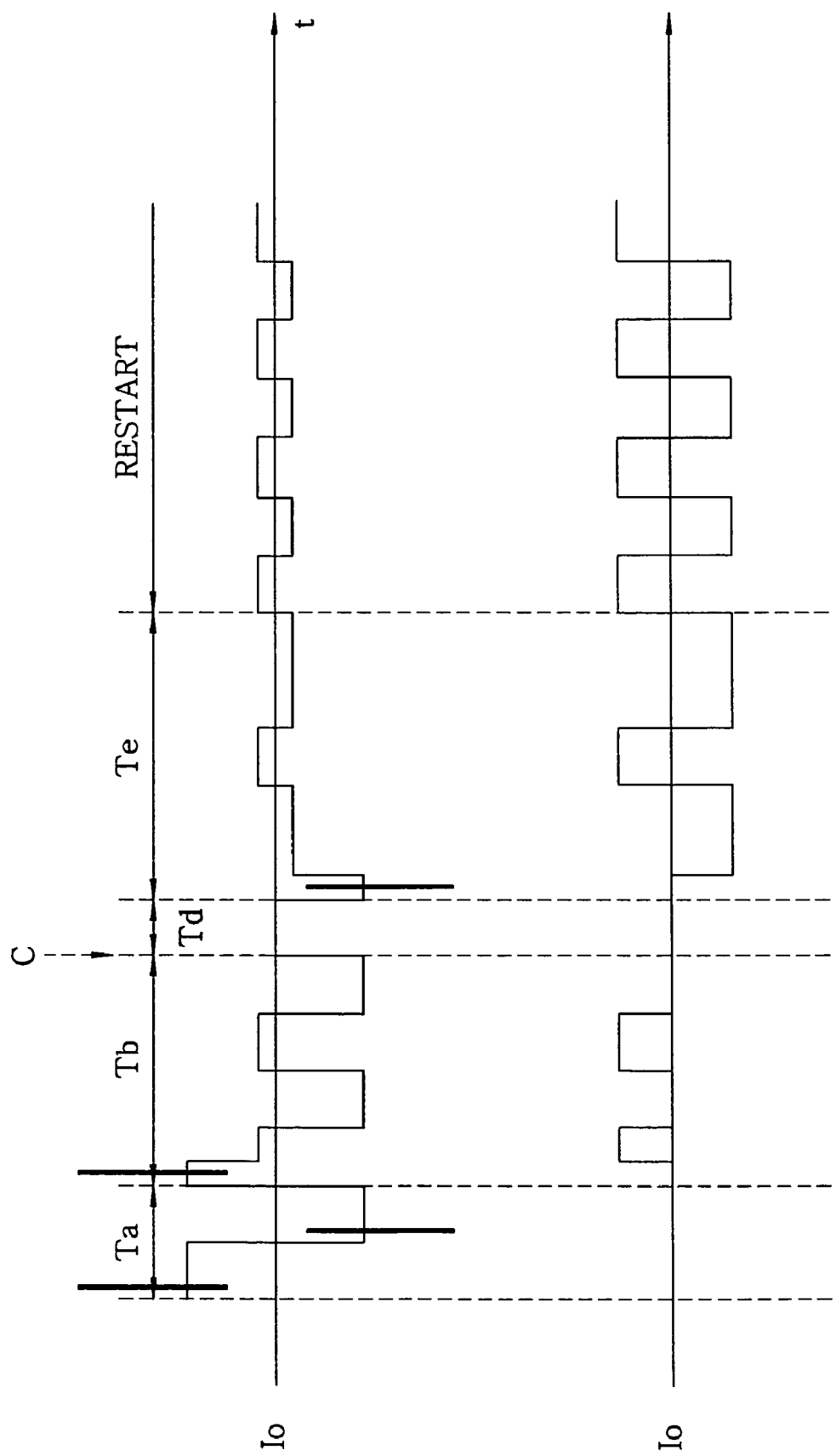
FIG. 33 is an operation waveform diagram of the fifteenth embodiment of the present invention.

Further, in FIG. 33, an interruption point C is different from that of FIG. 32. In FIG. 33, when it is determined that a half-wave discharge occurs in the half-wave discharge detection period Tb, transition to the turn-off period Td must be necessarily made at the point of time when the half period of the polarity having high voltage value (or the polarity having low voltage value) out of both polarities has elapsed. In this case, the stop time of the turn-off period Td corresponds to a half period. Accordingly, it is possible to stop the operation, light out the high pressure discharge lamp DL completely, and reset the state of the high pressure discharge lamp DL such that the polarity having low voltage value (the polarity where no half-wave discharge occurs) is necessarily included.

Embodiment 16

Figure 34:
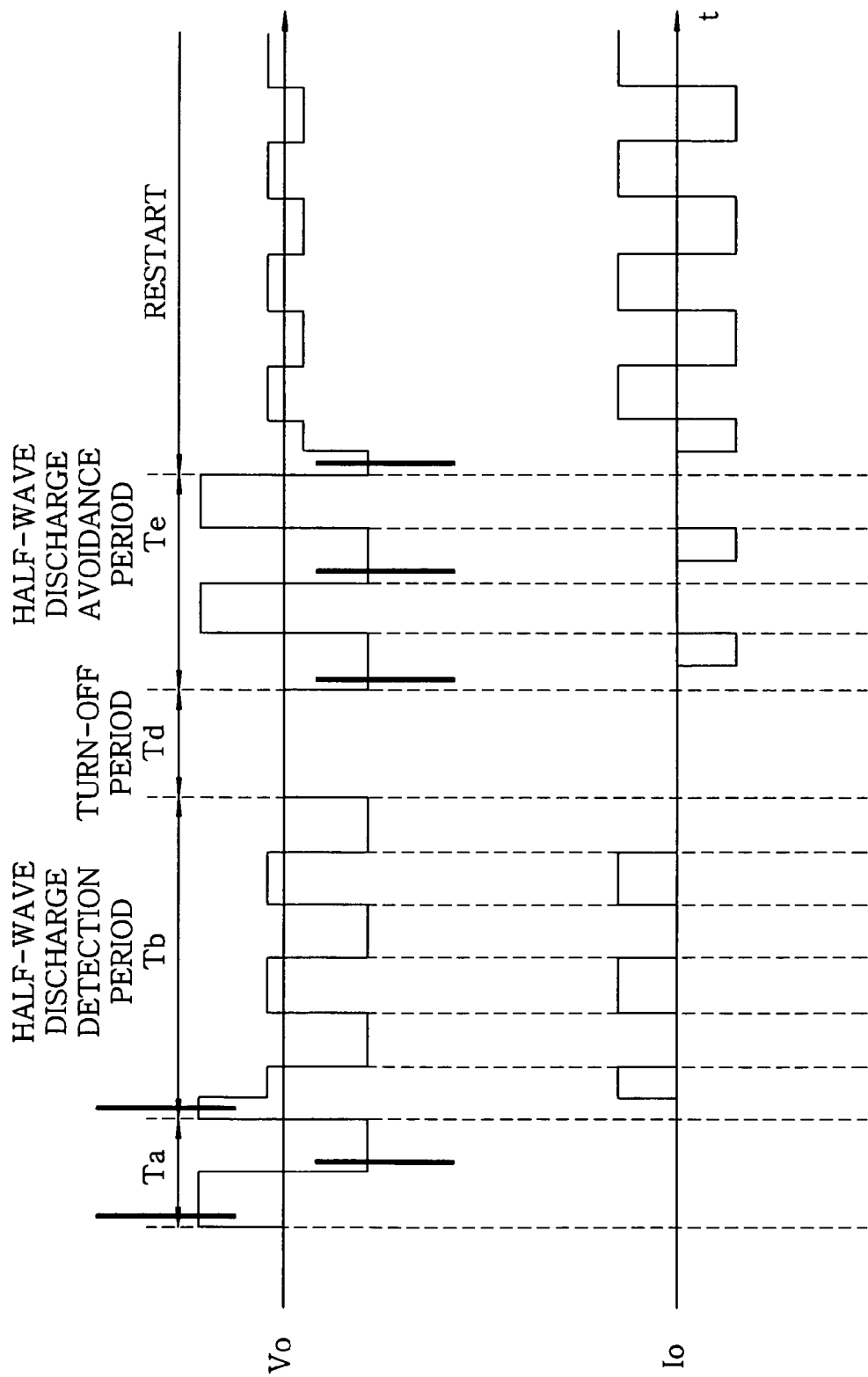
FIG. 34 is an operation waveform diagram of a sixteenth embodiment of the present invention.

A sixteenth embodiment of the present invention will be described with reference to FIG. 34. A circuit configuration thereof may be identical to that of FIG. 22. In this embodiment, as for the application of a high voltage in the half-wave discharge avoidance period Te, which corresponds to a half-wave improvement control when restarting the high pressure discharge lamp DL, a high voltage is applied only to the polarity having high voltage value (or the polarity having low voltage value) in the half-wave discharge detection period Tb, and discharge of the polarity where discharge is not readily available in the half-wave discharge detection period Tb is actively facilitated. Consequently, a square wave current can be made to flow in the high pressure discharge lamp DL right after startup at a high voltage with respect to the polarity where discharge is not readily available, and the duration of half-wave discharge can be avoided.

Embodiment 17

Figure 35:
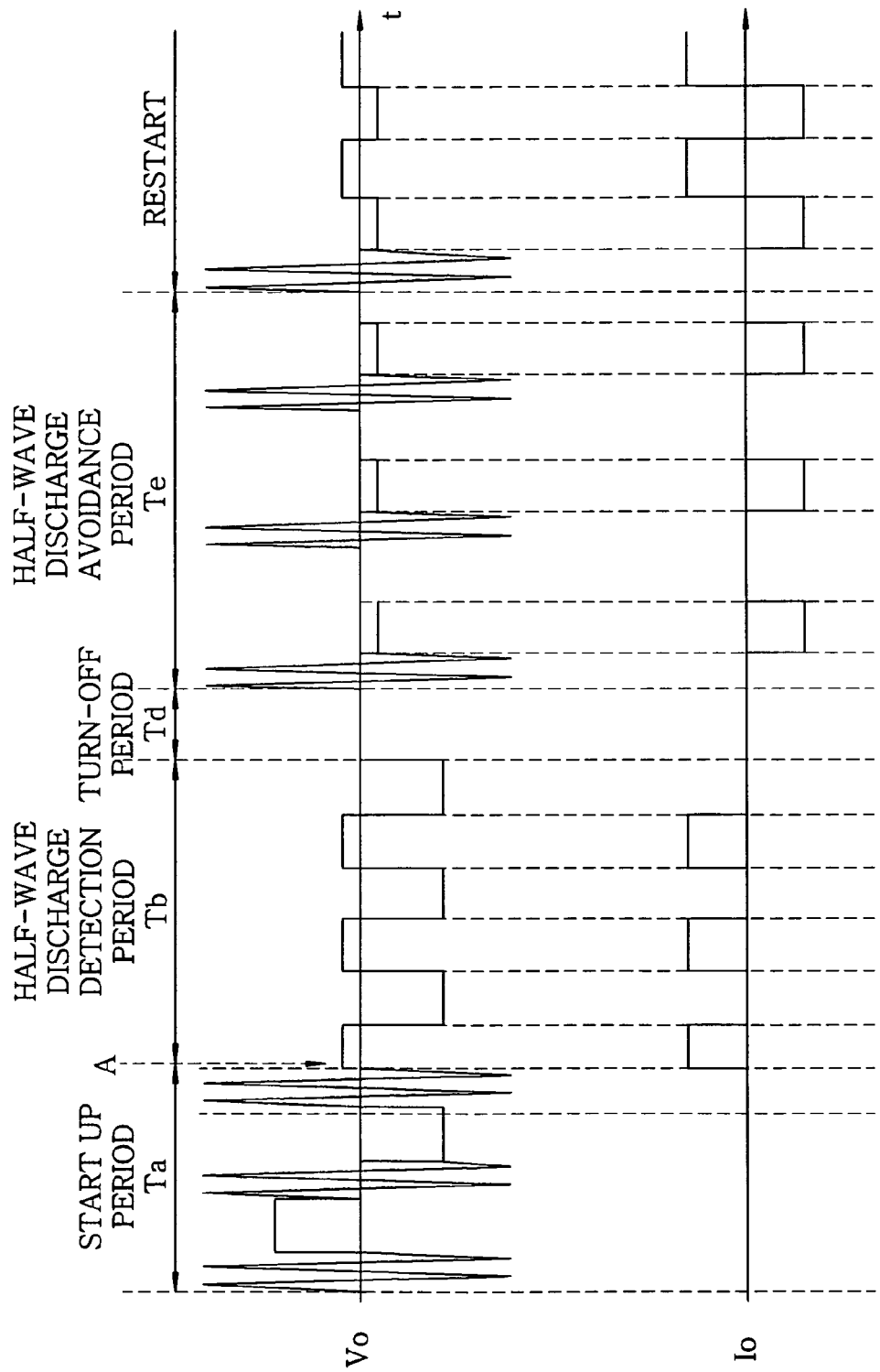
FIG. 35 is an operation waveform diagram of a seventeenth embodiment of the present invention.
Figure 36:
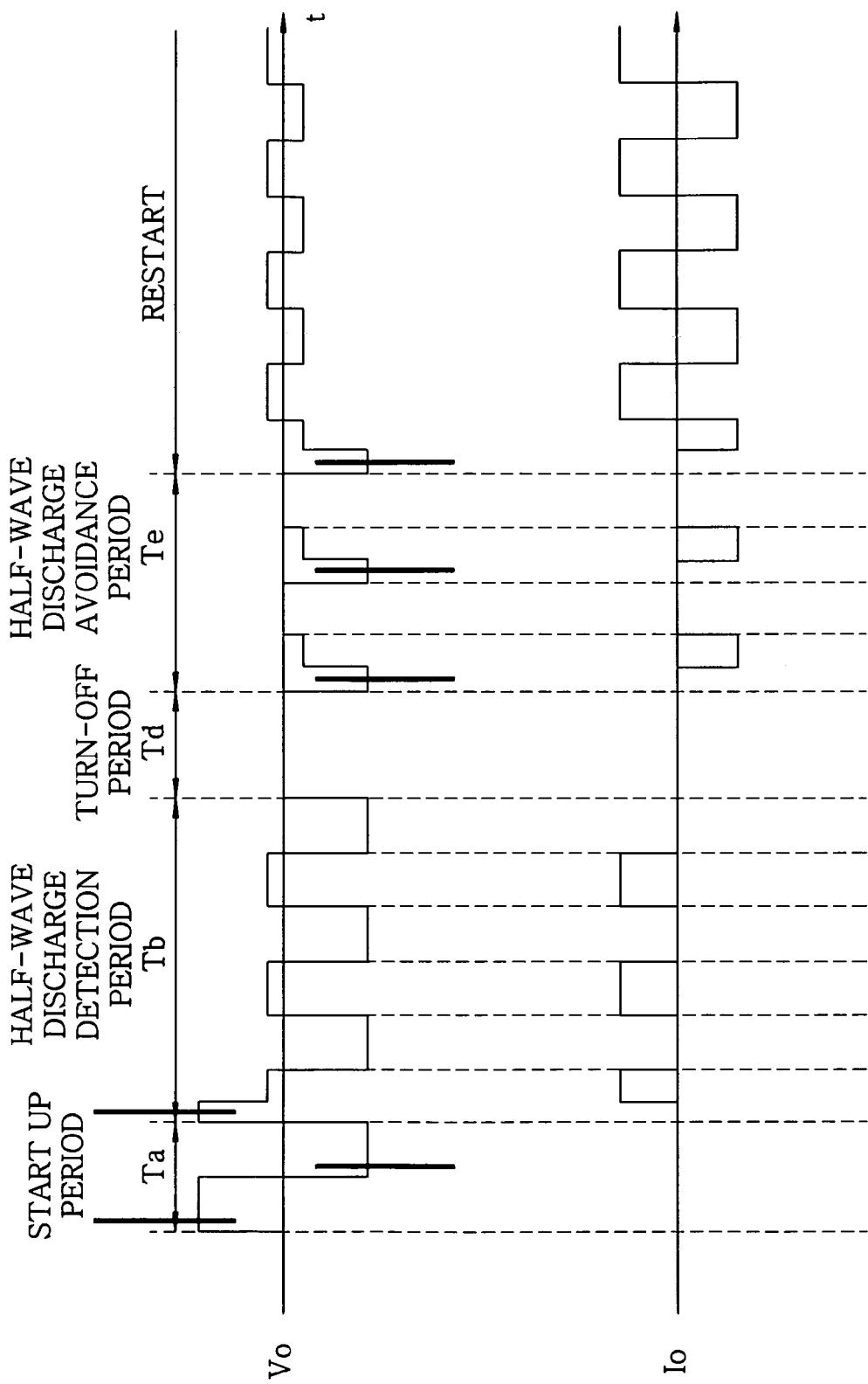
FIG. 36 is an operation waveform diagram of the seventeenth embodiment of the present invention.

A seventeenth embodiment of the present invention will be described with reference to FIGS. 35 and 36. FIG. 35 is a timing chart for a lighting device (FIG. 20) that generates a high voltage for startup by a resonant operation, and FIG. 36 is a timing chart for a lighting device (FIG. 22) that generates a high voltage for startup by a pulse generation operation.

Hereinafter, although the operation will be described with reference to FIG. 35, the same operation will be done for FIG. 36.

The both-end voltage of the high pressure discharge lamp is always detected by the half-wave discharge detection circuit unit 6. Thus, if a half-wave discharge continues for a predetermined time period Tb, the power supply circuit P stops its operation to interrupt power supply to the high pressure discharge lamp DL. This corresponds to the turn-off period Td in the drawing. After the lapse of the turn-off period Td, the power supply circuit P is operated in order to start up the high pressure discharge lamp DL again.

Here, in the half-wave discharge avoidance period Te, which corresponds to a half-wave improvement control upon restart, the power supply circuit P repeats a high-frequency operation, a low-frequency operation, and interruption as shown in FIG. 35 in the same way as in the startup period Ta. Here, the low-frequency operation of the power supply circuit P in the half-wave discharge avoidance period Te is performed for a predetermined time period on the polarity where the voltage is not lowered during the half-wave discharge detection period Tb, that is, the polarity where discharge is not readily available.

By such an operation, current can be made to flow only in the polarity where no current flows during the half-wave discharge detection period Tb, and the electrode temperature in the polarity where no current flows during the half-wave discharge detection period Tb can be raised in the period Te.

After the elapse of the half-wave discharge avoidance period Te, the power supply circuit P operates in the same way as in the startup period Ta. And, as shown in the drawing, the high pressure discharge lamp DL breaks down by application of a high voltage for startup, and then load voltages of both polarities are concurrently lowered, thus maintaining good startability.

That is, because of the half-wave discharge avoidance period T3, it is possible to raise the temperature of the electrode in the polarity where no current flows during the half-wave discharge detection period Tb. Moreover, when the same operation as in the startup period Ta is performed after the elapse of the half-wave discharge avoidance period Te, the electrode temperature of both sides becomes nearly uniform, and thus the high pressure discharge lamp DP can be started up without continuing the half-wave discharge.

Embodiment 18

An eleventh embodiment of the present invention will be described with reference to FIGS. 37 and 38. FIG. 38 is a timing chart for a lighting device (FIG. 20) that generates a high voltage for startup by a resonant operation, and FIG. 37 is a timing chart for a lighting device (FIG. 22) that generates a high voltage for startup by a pulse generating operation.

Figure 37:
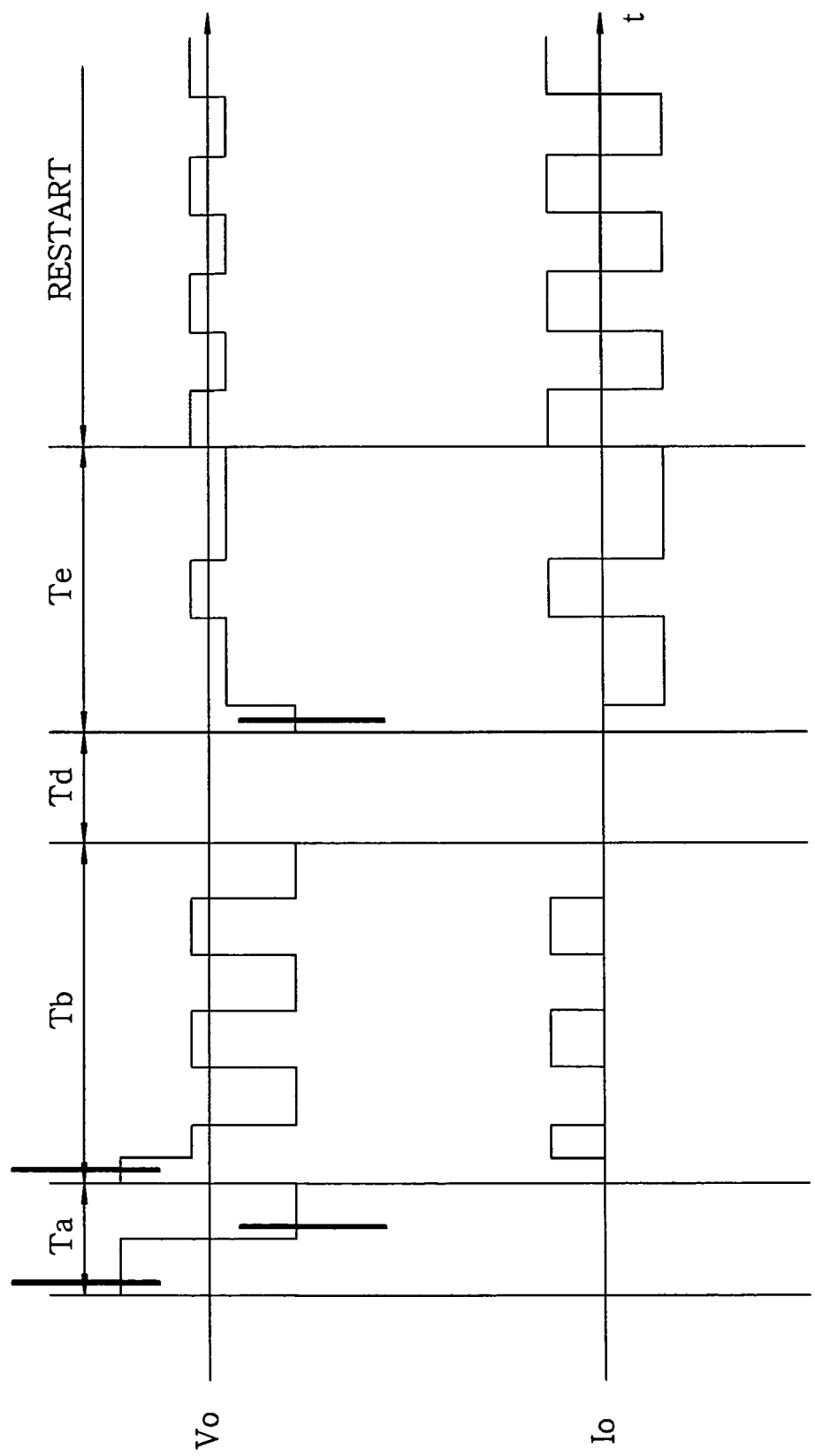
FIG. 37 is an operation waveform diagram of an eighteenth embodiment of the present invention.
Figure 38:
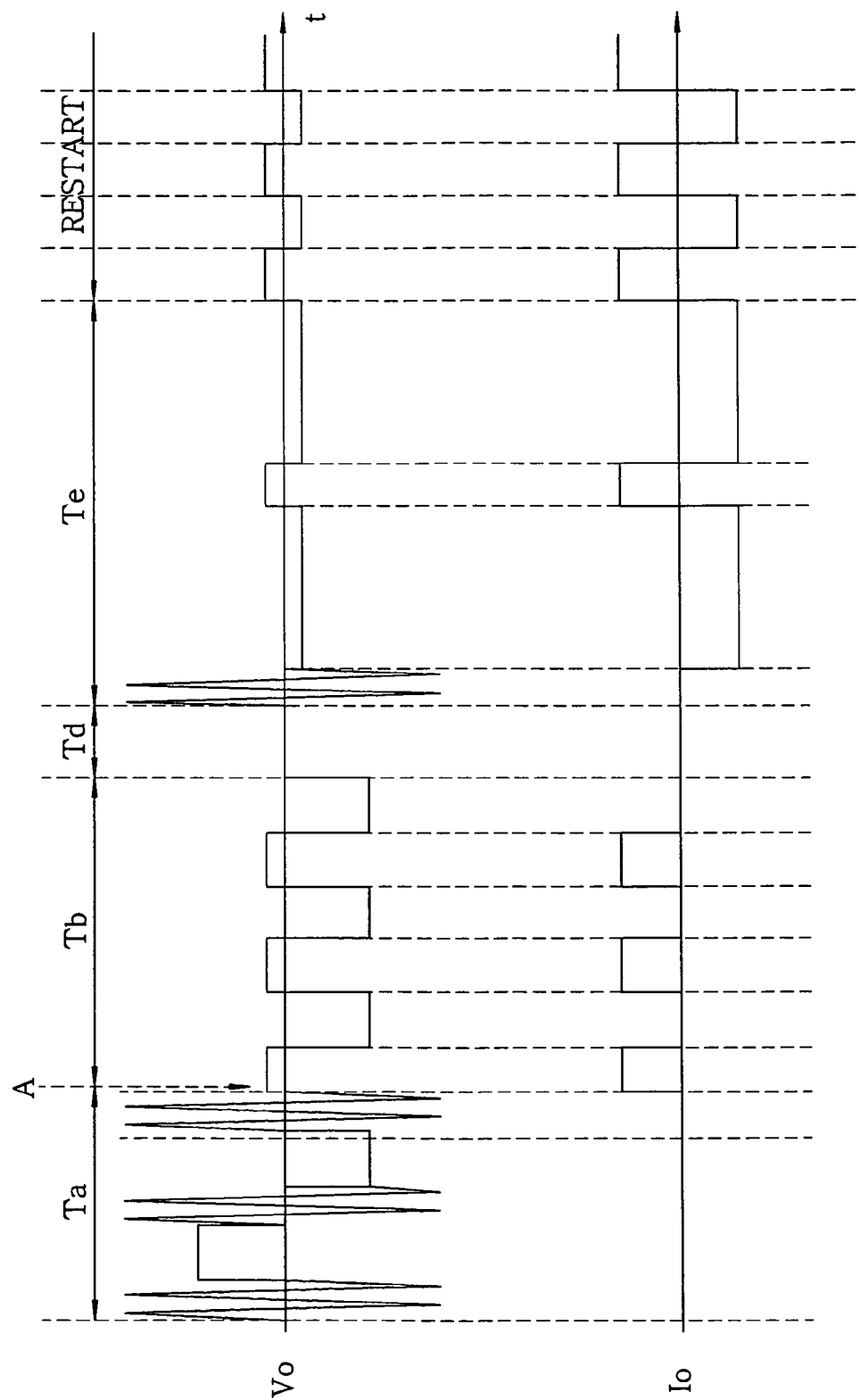
FIG. 38 is an operation waveform diagram of the eighteenth embodiment of the present invention.

In FIG. 37, during the half-wave discharge avoidance period Te after the turn-off period Td, the power supply circuit P is operated again to lengthen the period of the polarity where no current flows during the half-wave discharge detection period Tb upon startup of the high pressure discharge lamp DL and to cause a large temperature rise in that polarity. Further, when starting the high pressure discharge lamp DL during the half-wave discharge avoidance period Te, a high pulse voltage is applied only to the polarity where no current flows during the half-wave discharge detection period Tb, thus leading to dielectric breakdown at the high pulse voltage, and the polarity where no current flows during the half-wave discharge detection period Tb is necessarily used as the polarity to which the lamp current flows out. By such a control, the temperature of the two electrodes can be made nearly uniform, the duration of half-wave discharge can be prevented, and good startability can be secured.

FIG. 38 is an operation waveform diagram in a case of generating a high voltage for startup at LC resonance. In this case, too, as shown in FIG. 37, during the half-wave discharge avoidance period Te, when the lamp is started up at an LC resonance voltage, the square wave half period of only the polarity where no current flows during the period Tb is made longer than the normal time.

Embodiment 19

A nineteenth embodiment of the present invention will be described with reference to FIG. 39. A circuit configuration thereof may be identical to that of FIG. 22. In the circuit of FIG. 22, when the high pressure discharge lamp DL is not lighted, an output voltage Vdc of the DC power source circuit 2 and an output voltage value of the power supply circuit P are nearly equal. Next, when the high pressure discharge lamp DL is lighted, the circuit is operated such that the output voltage of the power supply circuit P is equal to the lamp voltage Vo.

Figure 39:
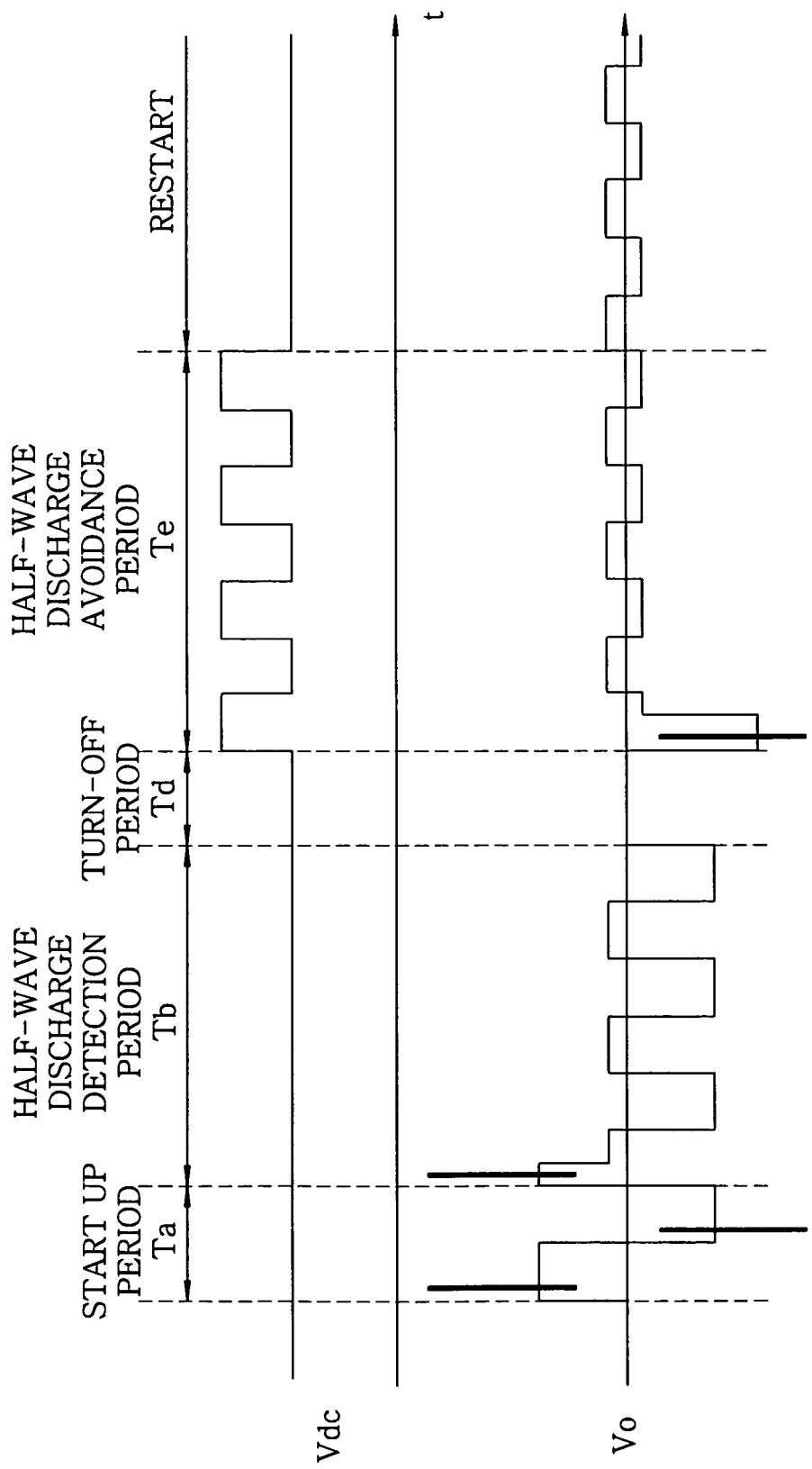
FIG. 39 is an operation waveform diagram of a nineteenth embodiment of the present invention.

In FIG. 39, Vdc represents the voltage of the polarity where a half-wave discharge occurs in the half-wave discharge detection period Tb but the voltage is not lowered, that is, the voltage of the polarity where the high pressure discharge lamp DL is not lighted. If the half-wave discharge continues for a predetermined period Tb, the power supply circuit P stops its operation. This is the turn-off period Td.

After the lapse of the turn-off period Td, transition is made back to the operation for starting up the high pressure discharge lamp DL. However, the output voltage Vdc of the DC power source circuit 2 is raised only in the polarity where the voltage is not lowered during the half-wave discharge detection period as shown in the half-wave discharge avoidance period Te in the drawing, so that the polarity where it is hard to light up the high pressure discharge lamp DL during the half-wave discharge detection period Tb becomes a state in which discharge is readily available by a high applied voltage. By doing so, the output voltage Vdc of the DC power source circuit 2 does not need to be always maintained at high voltage, and therefore the stress on the circuit can be reduced. Further, the duration of the half-wave discharge can be prevented.

Embodiment 20

Figure 40:
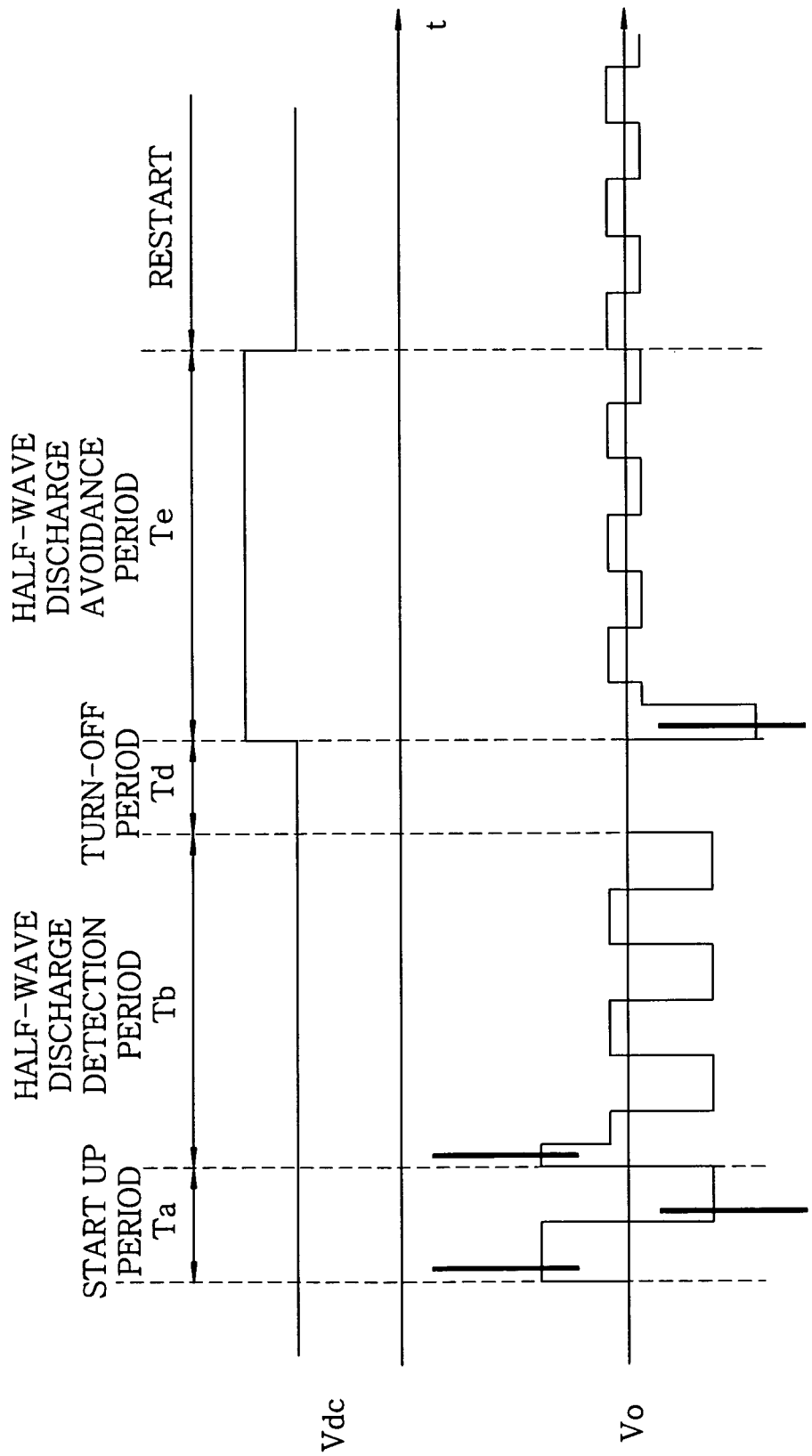
FIG. 40 is an operation waveform diagram of a twentieth embodiment of the present invention.

A twentieth embodiment of the present invention will be described with reference to FIG. 40. A circuit configuration thereof may be identical to that of FIG. 22. This embodiment is identical to the nineteenth embodiment except for the operation of the half-wave discharge avoidance period Te.

In this embodiment, a voltage difference between one polarity and the other polarity during the half-wave discharge detection period Tb is detected, and the rise of the output voltage Vdc of the DC power source circuit 2 in the half-wave discharge avoidance period Te is set based on the voltage difference. That is, when the voltage difference is large, the rise of the output voltage Vdc of the DC power source circuit 2 is made large, and when the voltage difference is small, the rise of the output voltage Vdc of the DC power source circuit 2 is made small. The output voltage Vdc of the DC power source circuit 2 is increased throughout the half-wave discharge avoidance period Te including the discharging and the non-discharging periods.

As a result, stress on the circuit can be further reduced, and the duration of the half-wave discharge can be prevented.

Embodiment 21

Figure 41:
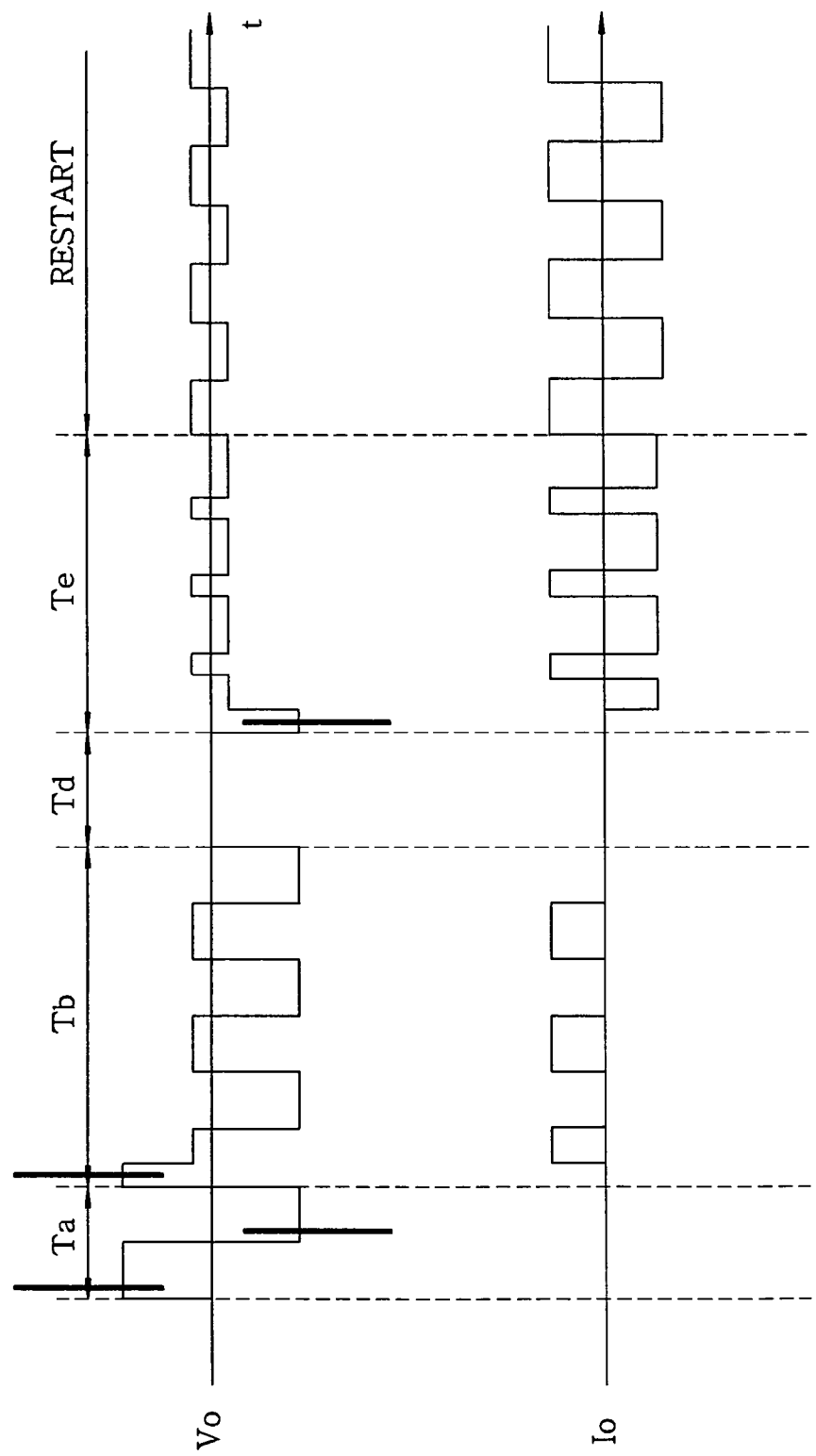
FIG. 41 is an operation waveform diagram of a twenty-first embodiment of the present invention.
Figure 42:
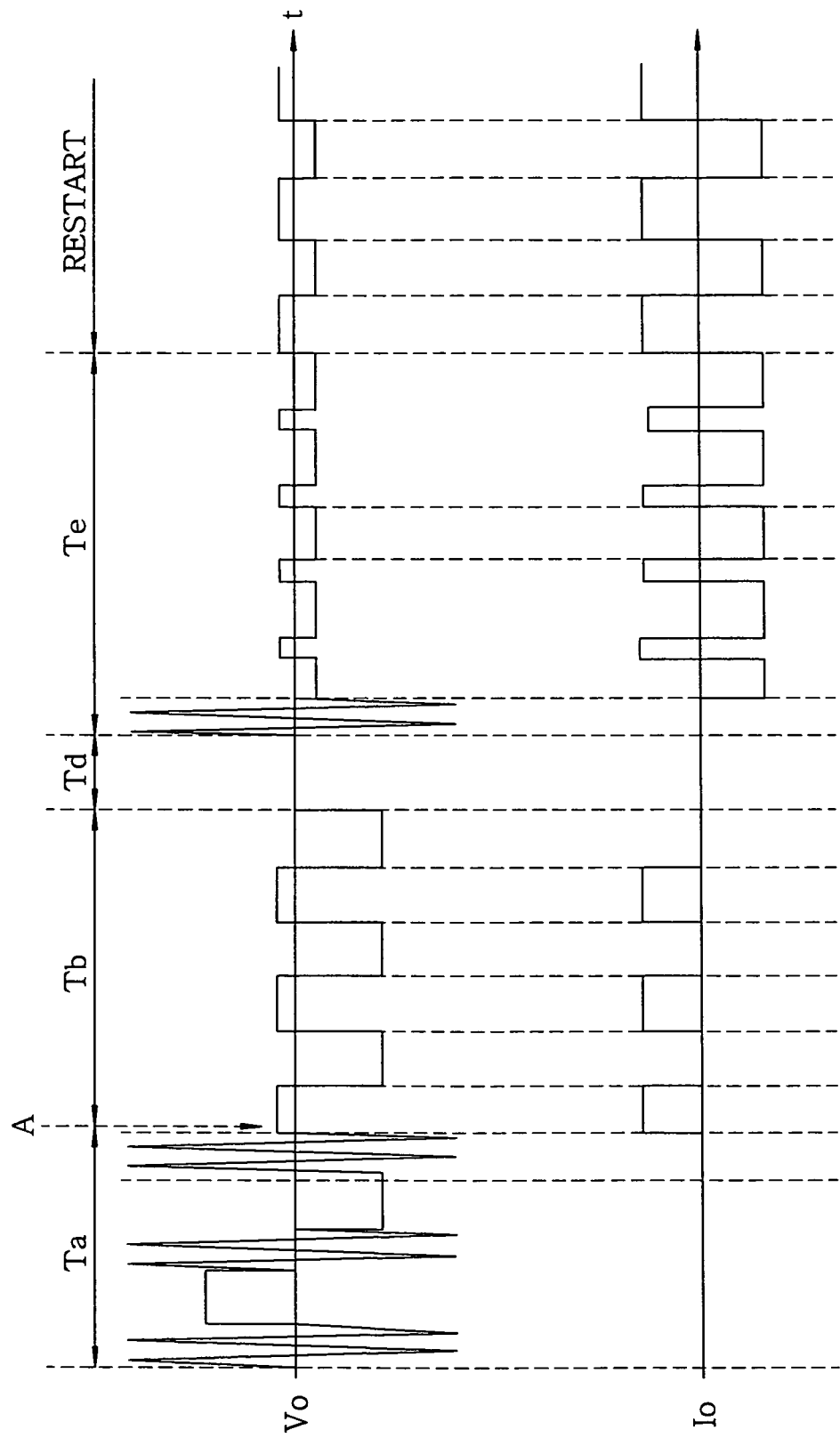
FIG. 42 an operation waveform diagram of the twenty-first embodiment of the present invention.

A twenty-first embodiment of the present invention will be described with reference to FIGS. 41 and 42. FIG. 42 is a timing chart for a lighting device (FIG. 20) that generates a high voltage for startup by a resonant operation, and FIG. 41 is a timing chart for a lighting device (FIG. 22) that generates a high voltage for startup by a pulse generating operation.

The operation of the period Te is different from that in the eighteenth embodiment. The operation till the period Td is exactly the same as the tenth embodiment, so the repletion of the same description will be omitted. In FIG. 41, after the elapse of the turn-off period Td, when the power supply circuit P is operated again to start up the high pressure discharge lamp DL, the period of the polarity where much current flows during the half-wave discharge detection period Tb is made shorter than the normal time, thus making a temperature rise of the electrode in that polarity as small as possible. Additionally, during the half-wave discharge avoidance period Te, a high pulse voltage for restarting to startup the high pressure discharge lamp DL is applied only to the polarity where no current flows during the half-wave discharge detection period Tb, thus leading to dielectric breakdown at a high pulse voltage, and the polarity where no current flows during the half-wave discharge detection period Tb is necessarily used as the polarity to which the lamp current flows out. Accordingly, the temperature of the two electrodes can be made nearly uniform, the duration of half-wave discharge can be prevented, and good startability can be attained.

FIG. 42 is an operation waveform diagram when a high voltage is generated at LC resonance. In this case, as shown in FIG. 41, in the half-wave discharge avoidance period Te, the half period of the square wave voltage is made shorter than the normal time only in the polarity where much current flows during the half-wave discharge detection period Tb upon starting up the lamp at a LC resonance voltage.

Embodiment 22

A twenty-second embodiment of the present invention will be described with reference to FIG. 43. A circuit configuration thereof may be identical to that of FIG. 22. In the circuit of FIG. 22, when the high pressure discharge lamp DL is in the unlighted state, the output voltage Vdc of the DC power source circuit 2 and the output voltage value of the power supply circuit P become nearly equal to each other. Next, when the high pressure discharge lamp DL is lighted, the circuit is operated such that the output voltage of the power supply circuit P is equal to the both-end voltage Vo of the lamp.

Figure 43:
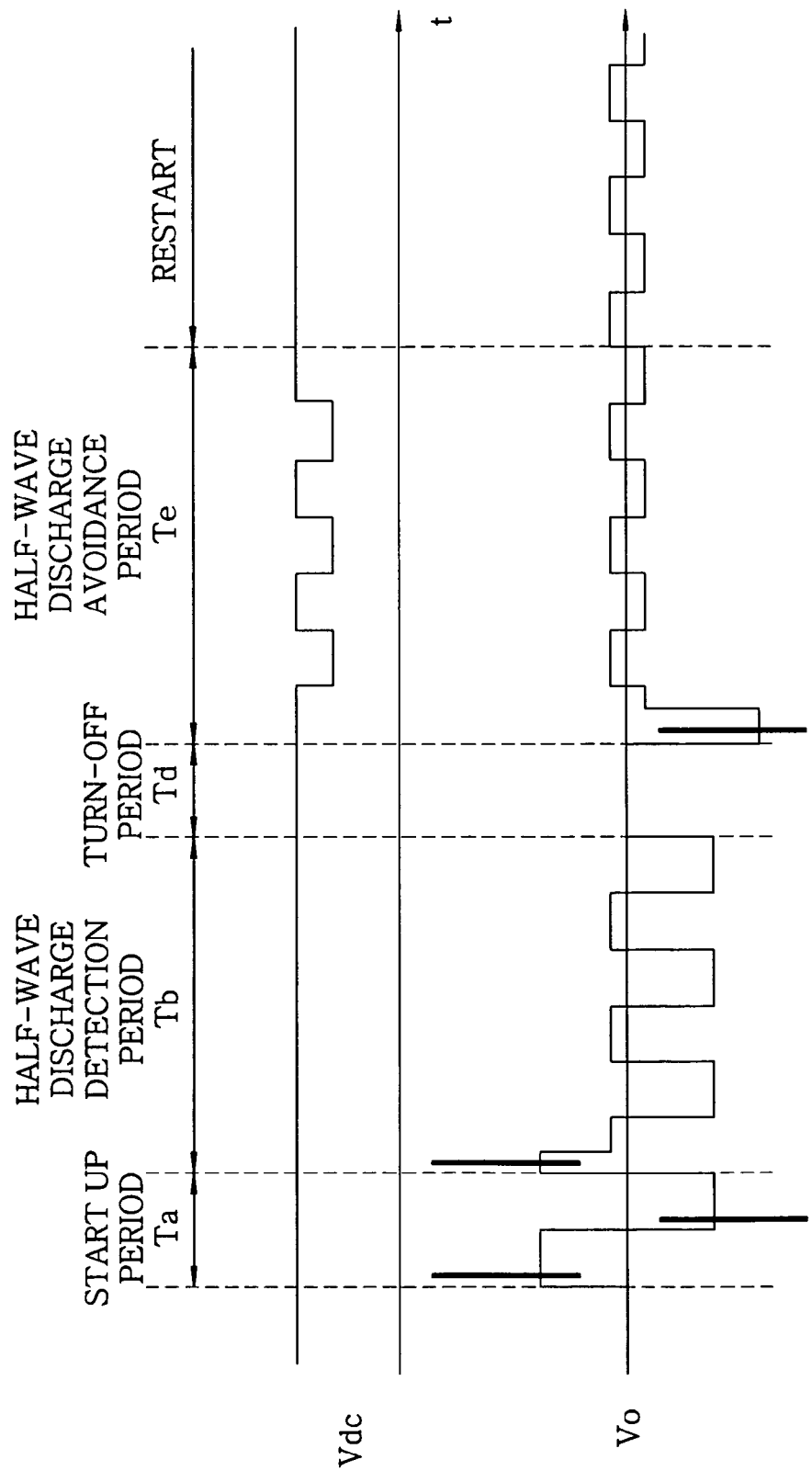
FIG. 43 is an operation waveform diagram of a twenty-second embodiment of the present invention.

In FIG. 43, the output voltage Vdc of the DC power source circuit 2 represents the voltage of the polarity where a half-wave discharge occurs in the half-wave discharge detection period Tb but the voltage is not lowered, that is, the voltage of the polarity where the high pressure discharge lamp DL is not lighted. If the half-wave discharge continues for a predetermined period Tb, the power supply circuit P stops its operation. This corresponds to the turn-off period Td. After the lapse of the turn-off period Td, transition is made back to the operation for starting up the high pressure discharge lamp DL.

However, the output voltage Vdc of the DC power source circuit 2 is reduced only in the polarity where the load voltage is lowered during the half-wave discharge detection period Tb as shown in the half-wave discharge avoidance period Te in the drawing, so that the polarity where the high pressure discharge lamp DL is easily lighted during the half-wave discharge detection period Tb becomes a state where it is hard to cause discharge by a low applied voltage. As a result, the output voltage Vdc of the DC power source circuit 2 can be lowered, and therefore the stress on the circuit can be reduced, and further, the duration of the half-wave discharge can be prevented.

Embodiment 23

A twenty-third embodiment of the present invention will be described with reference to FIG. 44. The operation of the half-wave discharge avoidance period Te is different from that in the eleventh embodiment. The operation till the turn-off period Td is exactly the same as the eleventh embodiment, so the repletion of the same description will be omitted.

Figure 44:
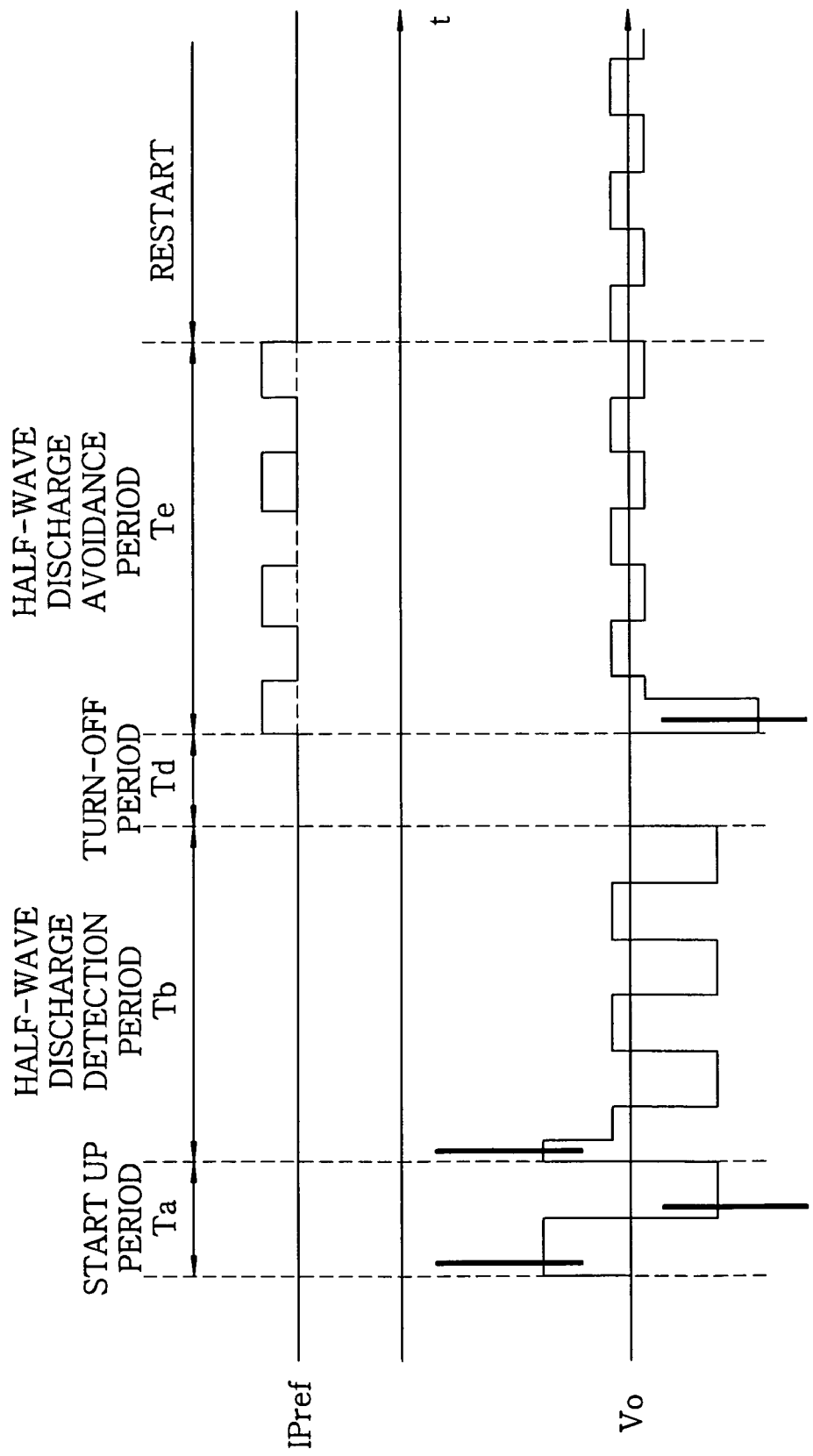
FIG. 44 is an operation waveform diagram of a twenty-third embodiment of the present invention.

In FIG. 44, after the elapse of the turn-off period Td, when the power supply circuit P is operated again to start up the high pressure discharge lamp DL, the current control target value IPref of the polarity where no current flows during the half-wave discharge detection period Tb is raised to a value higher than a reference value, thereby increasing the current level after the initiation of thermal electron emission.

Thus, an asymmetric discharge state of the high pressure discharge lamp DL is eliminated and the high pressure discharge lamp DL is quickly shifted to a stable lighting state, thereby realizing a high pressure discharge lamp lighting device with less startup failure and good startability.

Embodiment 24

A twenty-fourth embodiment of the present invention will be described with reference to FIG. 45. The operation of the half-wave discharge avoidance period Te is different from that in the twenty-third embodiment. The operation till the turn-off period Td is exactly the same as the twenty-third embodiment, so the repletion of the same description will be omitted.

Figure 45:
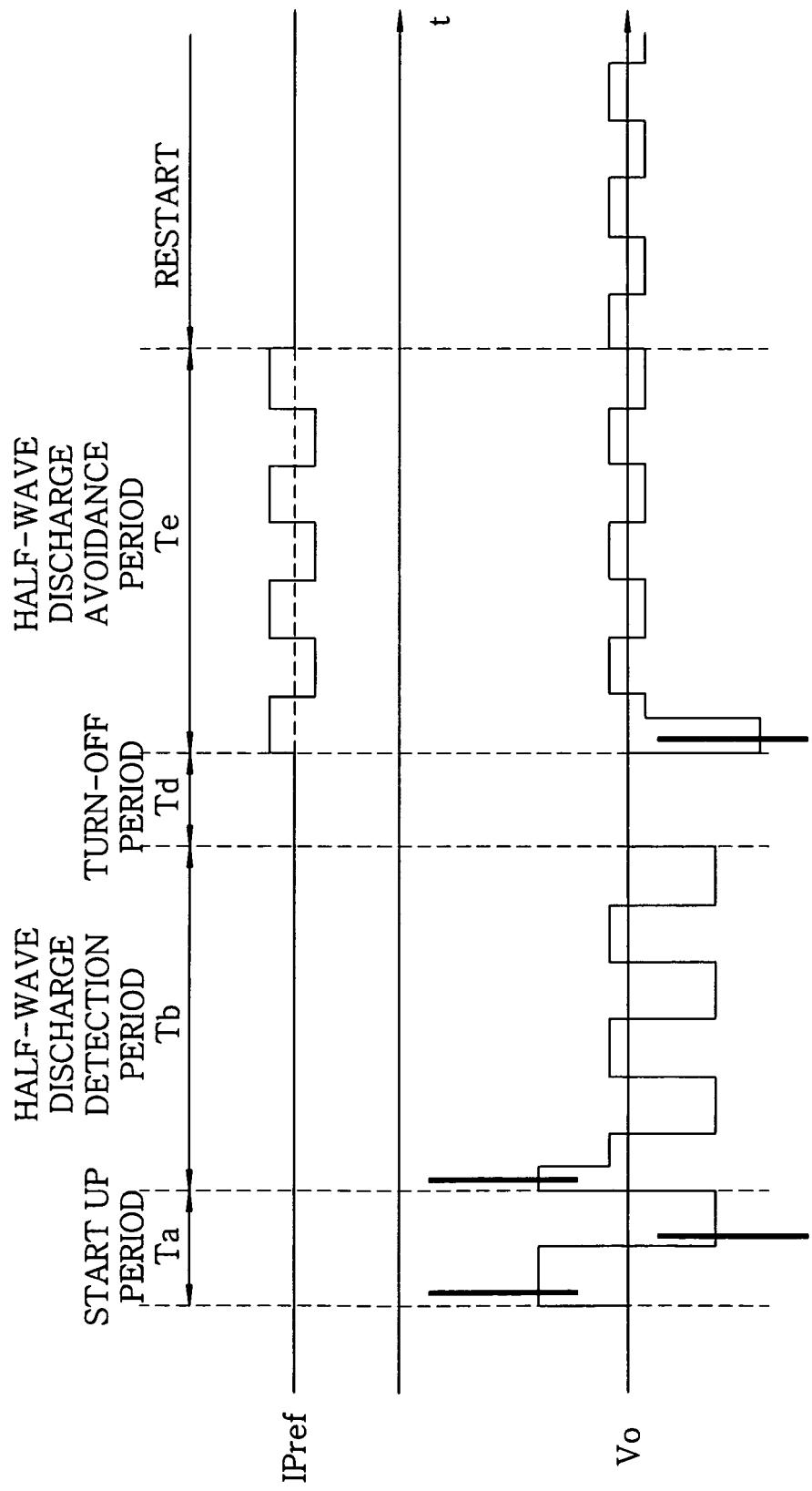
FIG. 45 is an operation waveform diagram of a twenty-fourth embodiment of the present invention.

In FIG. 45, after the elapse of the turn-off period Td, when the power supply circuit P is operated again to start up the high pressure discharge lamp DL, the current control target value IPref of the polarity where current easily flows during the half-wave discharge detection period Tb is reduced to a value lower than a reference value, thereby lowering the current level after the initiation of thermal electron emission. Moreover, at this time, the current control target value IPref of the polarity where no current flows during the half-wave discharge detection period Tb may be raised to a value higher than a reference value Thus, an asymmetric discharge state of the high pressure discharge lamp DL is eliminated and the high pressure discharge lamp DL is quickly shifted to a stable lighting state, thereby realizing a high pressure discharge lamp lighting device with less startup failure and good startability.

Embodiment 25

A twenty-fifth embodiment of the present invention will be described with reference to FIG. 46. The operation of the half-wave discharge avoidance period Te is different from that in the twenty-second embodiment. The operation till the turn-off period Td is exactly the same as the twenty-second embodiment.

Figure 46:
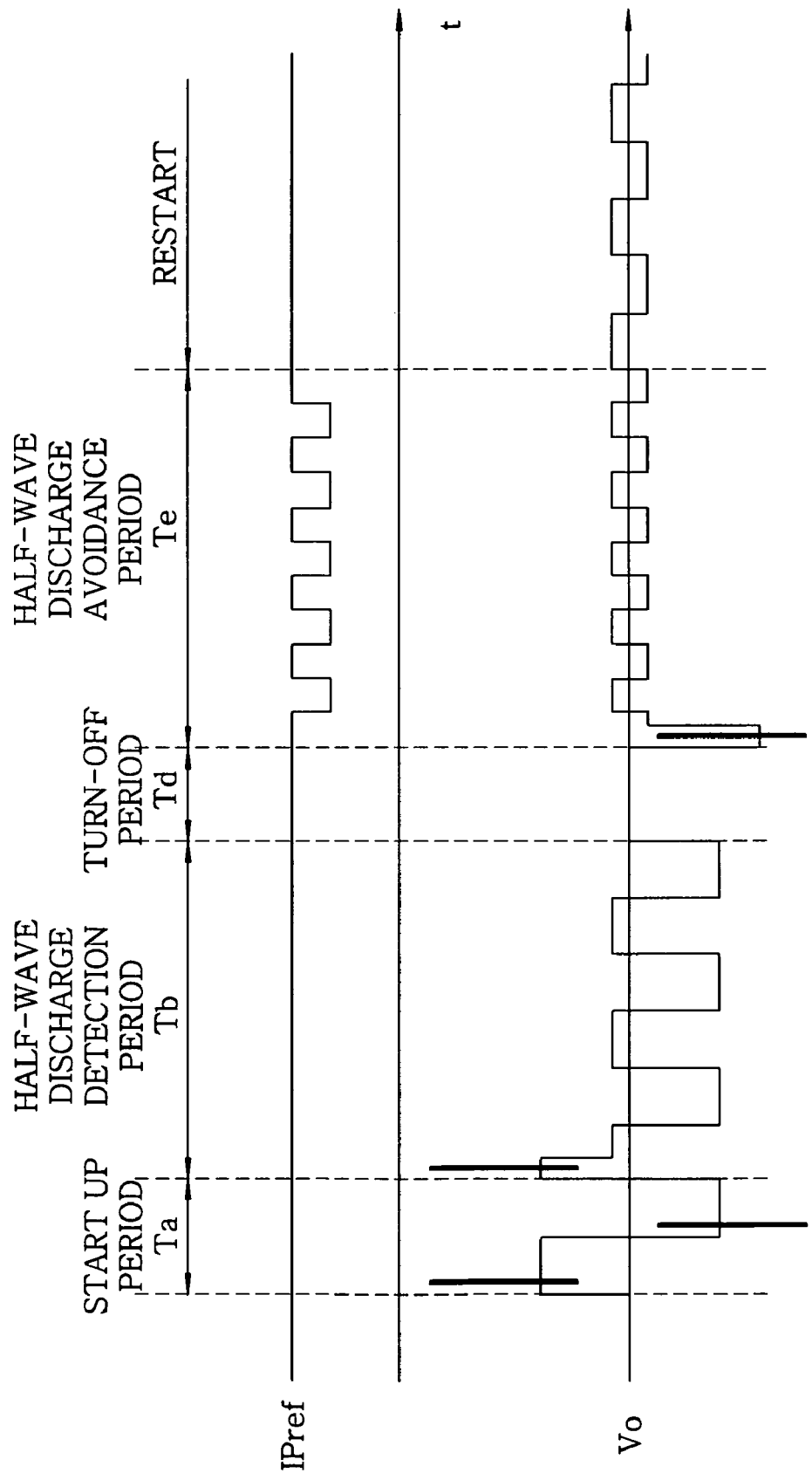
FIG. 46 is an operation waveform diagram of a twenty-fifth embodiment of the present invention.

In FIG. 46, the output voltage Vdc of the DC power source circuit 2 represents the voltage of the polarity where a half-wave discharge occurs in the half-wave discharge detection period Tb but the voltage is not lowered, that is, the voltage of the polarity where the high pressure discharge lamp DL is not lighted. If the half-wave discharge continues for a predetermined period Tb, the power supply circuit P stops its operation. This corresponds to the turn-off period Td. After the lapse of the turn-off period Td, transition is made back to the operation for starting up the high pressure discharge lamp DL.

However, the output voltage Vdc of the DC power source circuit 2 is reduced only in the polarity where the voltage is lowered during the half-wave discharge detection period Tb as shown in the half-wave discharge avoidance period Te in the drawing, so that the polarity where the high pressure discharge lamp DL is easily lighted during the half-wave discharge detection period Tb becomes a state where it is hard to cause discharge by a low applied voltage. Further, the discharge lamp is operated with a polarity inversion period shorter than the normal polarity inversion period in the half-wave discharge avoidance period Te, as in FIG. 46. By doing so, the output voltage Vdc of the DC power source circuit 2 can be lowered, and therefore the stress on the circuit can be reduced, and further, the discharge lamp can be operated in a shorter period. As a result, it is possible to realize a high pressure discharge lamp lighting device with less startup failure and secure startability.

Additionally, it is needless to say that the controls of the ninth to twenty-fifth embodiments may be properly combined and employed.

Embodiment 26

Figure 47A:
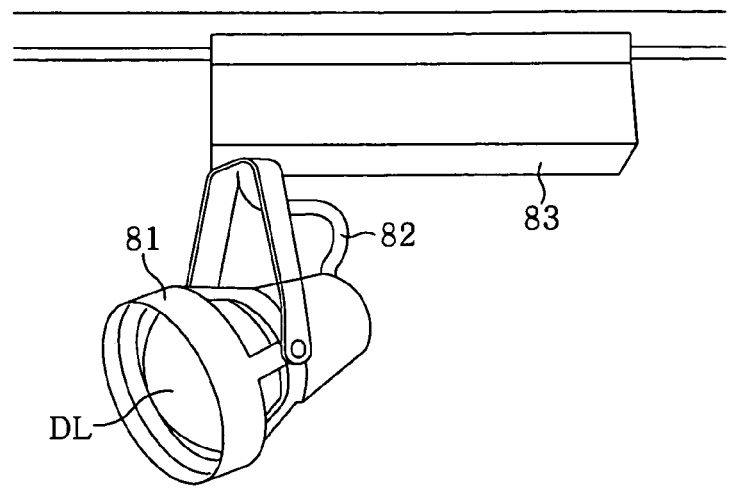
FIGS. 47A to 47C are perspective views showing the outer appearances of a luminaire of a twenty-sixth embodiment of the present invention.
Figure 47B:
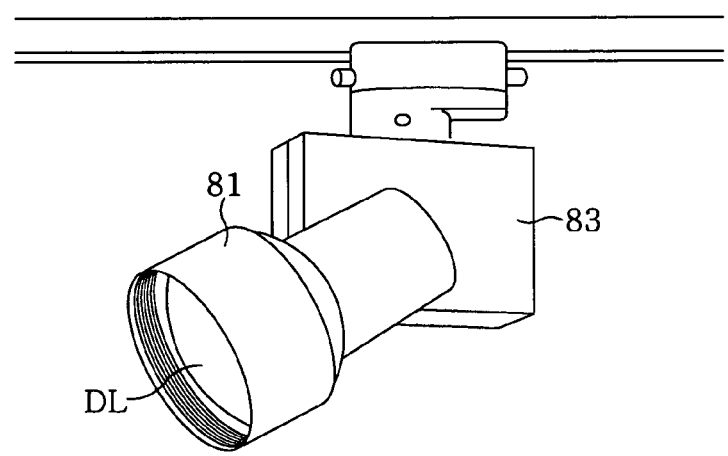
Figure 47C:
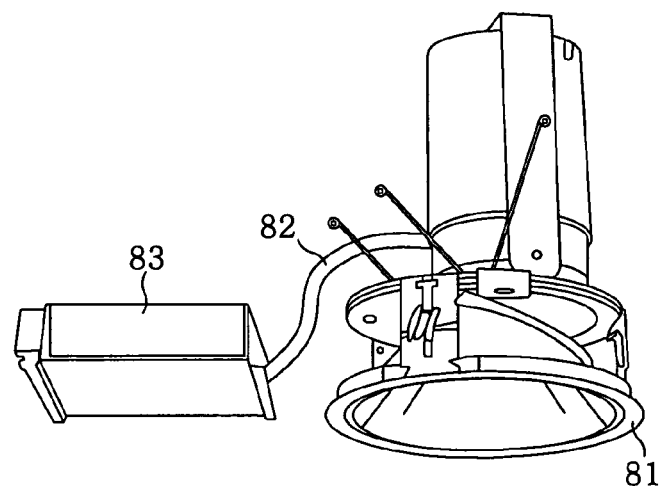
Figure 48:
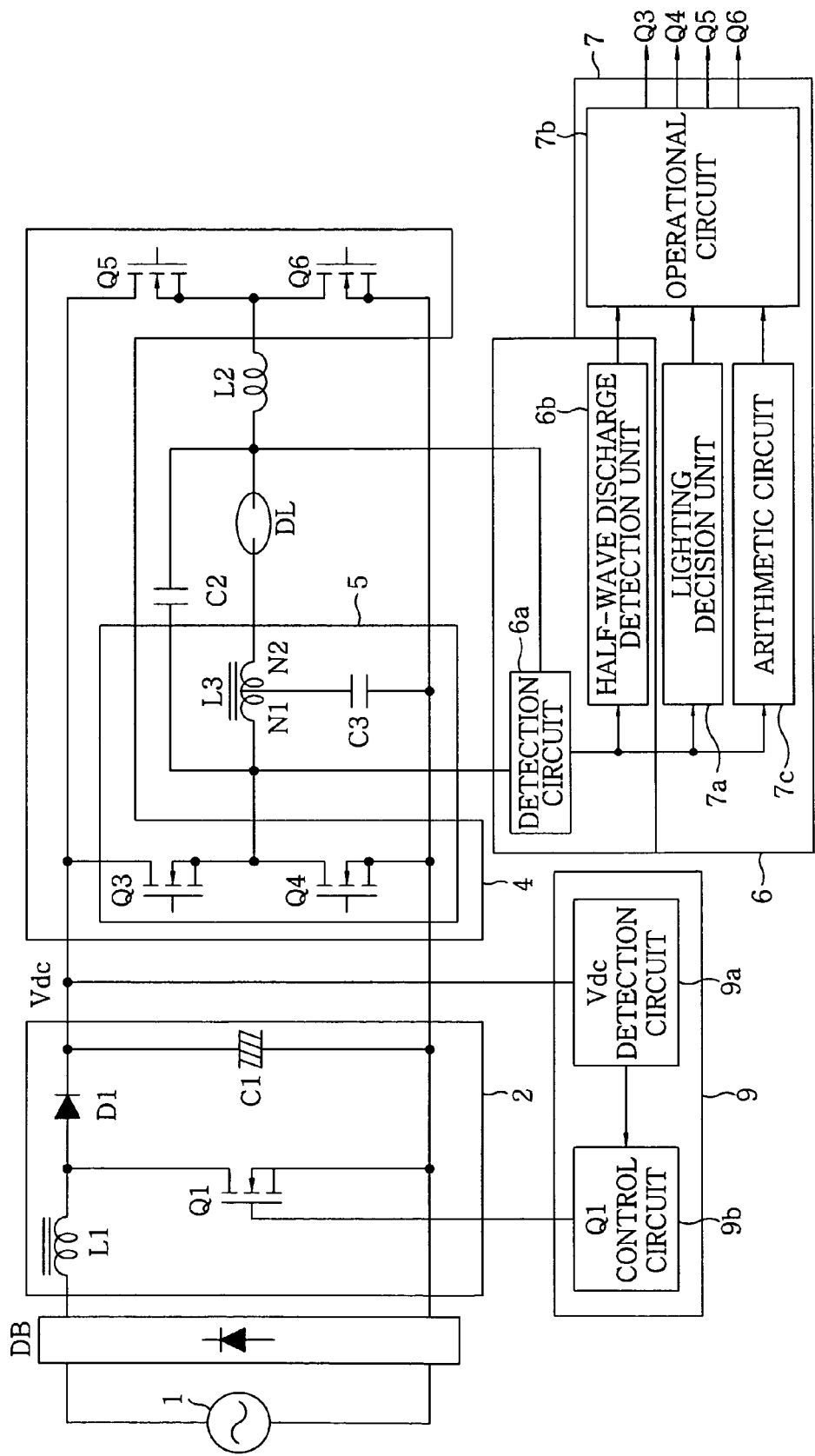
FIG. 48 is a circuit diagram of a first conventional example.
Figure 49:
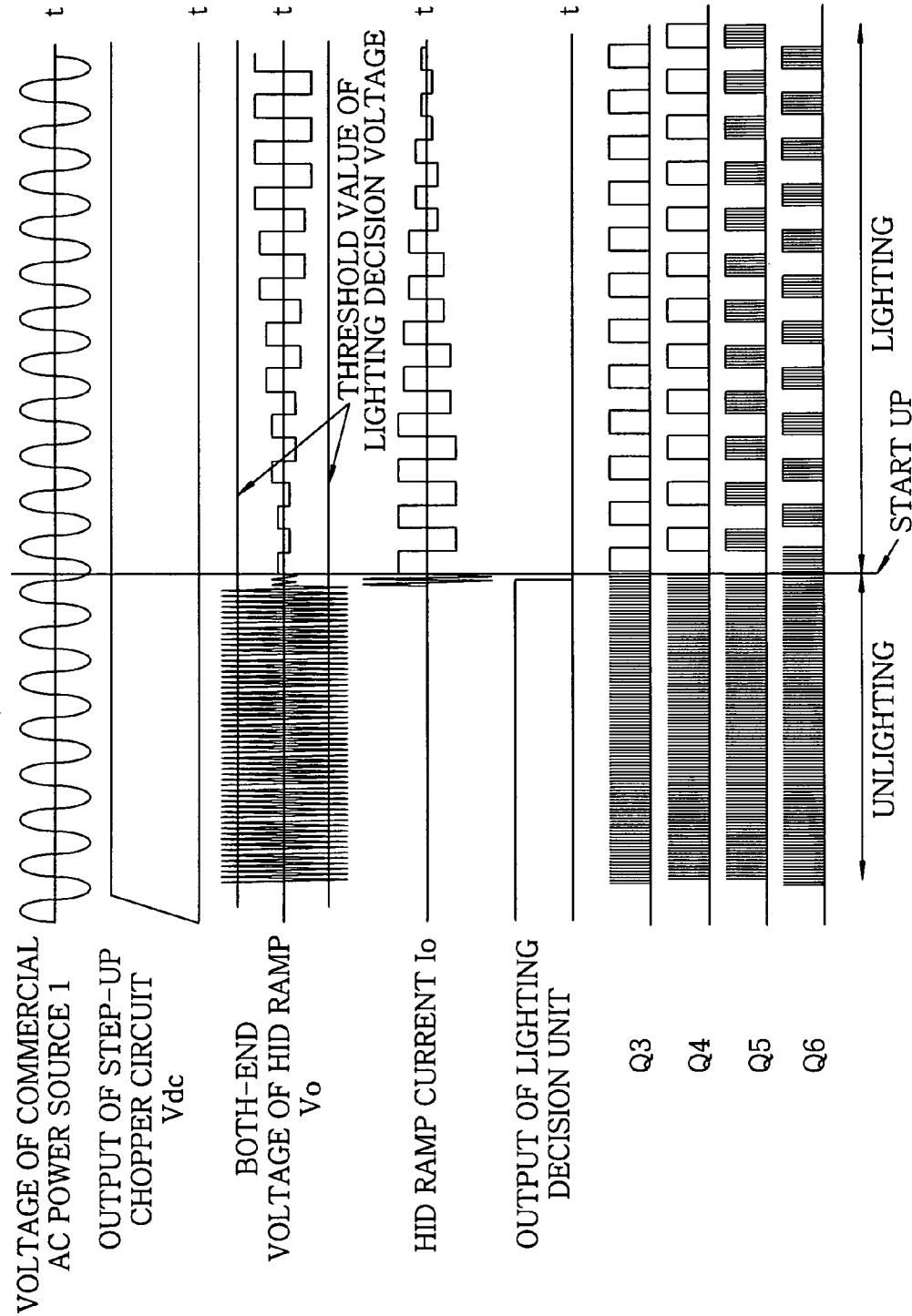
FIG. 49 is an operation waveform diagram of the first conventional example.

FIGS. 47A to 47C show a configuration example of a luminaire using a high pressure discharge lamp lighting device of the present invention. In FIGS. 47A and 47B are examples in which a HID lamp is used as a spotlight, and FIG.

47C is an example in which a HID lamp is used as a downlight. In the drawing, DL is a high pressure discharge lamp, reference numeral 81 is a lamp body having a high pressure discharge lamp mounted therein, reference numeral 82 is a wire, and reference numeral 83 is a stabilizer storing a circuit of a lighting device.

By using the above-described high pressure discharge lamp lighting device as a lighting device of this type, the duration of an asymmetric discharge state during startup can be prevented, and the high pressure discharge lamp can be quickly shifted to a stable lighting state. Thus, it is possible to provide a luminaire with less startup failure and good startability. Moreover, a lighting system may be provided by combining multiple luminaires of this kind.

While the invention has been shown and described with respect to the embodiments, it will be understood by those skilled in the art that various changes and modification may be made without departing from the scope of the invention as defined in the following claims.

What is claimed is:

1. A high pressure discharge lamp lighting device, comprising:
   a DC power source circuit;
   a power supply circuit for converting an output from the DC power source circuit into a square wave AC output to be supplied to a high pressure discharge lamp;
   a starting circuit for applying a high voltage output for lamp startup to the high pressure discharge lamp;
   a control circuit for controlling the DC power source circuit, the power supply circuit and the starting circuit; and
   a half-wave discharge detection circuit for detecting a half-wave discharge in which load voltages or load currents of two half periods of two different polarities of the square wave AC output are asymmetric with each other,
   wherein the half-wave discharge detection circuit detects the half-wave discharge at an initial stage of the lamp startup from dielectric breakdown of the high pressure discharge lamp until a lamp voltage of the high pressure discharge lamp approximates a rated lamp voltage, and judges that the half wave discharge has occurred, when the half-wave discharge detection circuit detects that the absolute value of a load voltage difference or a load current difference of the two different polarities is larger than a maximum variation of a load voltage difference or a load current difference of the two different polarities of the square wave AC output during lighting of the discharge lamp when the lamp voltage of the high pressure discharge lamp approximates the rated lamp voltage, and
   wherein the control circuit adjusts the output of each of at least one of the DC power source circuit, the power supply circuit, and the starting circuit when the half-wave discharge detection circuit detects the half-wave discharge, thereby controlling the magnitude of a voltage of a square wave half period of one polarity having a load voltage of a larger magnitude and that of a square wave half period of the other polarity having a load voltage of a smaller magnitude to approximate to each other.

2. The lamp lighting device of claim 1, wherein the control circuit adjusts the output of each of at least one of the DC power source circuit, the power supply circuit, and the starting circuit during or right before the square wave half period of the polarity having the load voltage of the larger magnitude.

3. The lamp lighting device of claim 2, wherein the control circuit adjusts the output of the starting circuit such that the high voltage output for the lamp startup is applied during the square wave half period of the polarity having the load voltage of the larger magnitude.

4. The lamp lighting device of claim 2, wherein the control circuit adjusts the output of the DC power source circuit or the power supply circuit such that the magnitude of an output voltage of the DC power source circuit or the power supply circuit is increased only during the whole power supply period of the square wave half period of the polarity having the load voltage of the larger magnitude, or only during an initial part of the power supply period of the square wave half period of the polarity having the load voltage of the larger magnitude.

5. The lamp lighting device of claim 2, wherein the control circuit adjusts the output of the power supply circuit such that the magnitude of a current supplied from the power supply circuit is raised only during the whole power supply period of the square wave half period of the polarity having the load voltage of the larger magnitude, or only during an initial part of the power supply period of the square wave half period of the polarity having the load voltage of the larger magnitude.

6. The lamp lighting device of claim 2, wherein the control circuit adjusts the output of the power supply circuit such that the power supply period of the square wave half period of the polarity having the load voltage of the larger magnitude is set longer.

7. The lamp lighting device of claim 1, wherein the control circuit adjusts the output of the DC power source circuit or the power supply circuit during the square wave half period of the polarity having the load voltage of the smaller magnitude.

8. The lamp lighting device of claim 7, wherein rise of the vapor pressure in an arc tube of the high pressure discharge lamp is controlled to be suppressed by reducing a supply current or an output voltage from the DC power source circuit or the power supply circuit during the power supply period of the square wave half period of the polarity having the load voltage of the smaller magnitude.

9. The lamp lighting device of claim 7, wherein the rise of the vapor pressure in the arc tube of the high pressure discharge lamp is controlled to be suppressed by shortening the power supply period of the square wave half period of the polarity having the load voltage of the smaller magnitude.

10. The lamp lighting device of claim 7, wherein an electrode of the high pressure discharge lamp is controlled to be preheated by increasing a supply current from the power supply circuit during the power supply period of the square wave half period of the polarity having the load voltage of the smaller magnitude.

11. The lamp lighting device of claim 7, wherein an electrode of the high pressure discharge lamp is controlled to be preheated by lengthening the power supply period of the square wave half period of the polarity having the load voltage of the smaller magnitude.

12. The lamp lighting device of claim 1, wherein a square wave AC output frequency of the power supply circuit is set higher when the control circuit controls the absolute values of the voltages than that during the normal lighting of the discharge lamp.

13. The lamp lighting device of claim 1, wherein the outputs of the DC power source circuit, the power supply circuit, and the starting circuit are selectively adjusted based on an electric state or lighting elapsed time of the high pressure discharge lamp.

14. A luminaire comprising the lamp lighting device of claim 1.

15. A high pressure discharge lamp lighting device, comprising:

a DC power source circuit;

a power supply circuit for converting an output from the DC power source circuit into a square wave AC output to be supplied to a high pressure discharge lamp;

a starting circuit for applying a high voltage output for lamp startup to the high pressure discharge lamp;

a control circuit for controlling the DC power source circuit, the power supply circuit and the starting circuit; and a half-wave discharge detection circuit for detecting a half-wave discharge in which load voltages or load currents of two half periods of two different polarities of the square wave AC output are asymmetric with each other, wherein the half-wave discharge detection circuit detects the half-wave discharge at an initial stage of startup from dielectric breakdown of the high pressure discharge lamp until a lamp voltage of the high pressure discharge lamp approximates a rated lamp voltage, judges that a half-wave discharge condition has occurred, when the absolute value of a load voltage difference or a load current difference of the two different polarities is larger than a maximum variation of a load voltage difference or a load current difference of the two different polarities of the square wave AC output during normal lighting of the discharge lamp, wherein if the half-wave discharge detection circuit detects the half-wave discharge, the control circuit turns off the high pressure discharge lamp for a predetermined time period and then restarts the lamp, and wherein when restarting the lamp, the control circuit adjusts the output of each of at least one of the DC power source circuit, the power supply circuit, and the starting circuit, thereby controlling the magnitude of a voltage or a current of a square wave half period of one polarity having a load voltage of a larger magnitude to approximate to that of a square wave half period of the other polarity having a load voltage of a smaller magnitude.

16. The lamp lighting device of claim 15, wherein the half-wave discharge detection circuit judges that a half-wave discharge has occurred, when the half-wave discharge condition is successively detected multiple times.

17. The lamp lighting device of claim 15, wherein the half-wave discharge detection circuit judges that a half-wave discharge has occurred, when the accumulated number detected half-wave discharge conditions is equal to or larger than a predetermined value.

18. The lamp lighting device of claim 15, wherein the half-wave discharge detection circuit judges that a half-wave discharge has occurred, when a ratio of half-wave discharge conditions occurring during a predetermined time period is equal to or larger than a threshold.

19. The lamp lighting device of claim 15, wherein the half-wave discharge detection circuit starts judging the half-wave discharge condition at a predetermined time after startup of the high pressure discharge lamp.

20. The lamp lighting device of claim 19, wherein the predetermined time for judging the half-wave discharge is set such that the high pressure discharge lamp is allowed to be immediately started when performing the restarting after turning off the high pressure discharge lamp.

21. The lamp lighting device of claim 15, wherein, if the half-wave discharge detection circuit judges that a half-wave discharge has occurred, when the control circuit performs a start facilitation control before turning off of the high pressure discharge lamp for the predetermined time period.

22. The lamp lighting device of claim 21, wherein the start facilitation control involves applying, by the starting circuit, a high voltage to the polarity which had the load voltage of the larger magnitude when the half-wave discharge was detected.

23. The lamp lighting device of claim 21, wherein the start facilitation control involves superposing, by the starting circuit, a high voltage of high frequency on the polarity which had the load voltage of the larger magnitude when the half-wave discharge was detected.

24. The lamp lighting device of claim 21, wherein the start facilitation control involves increasing, by the power supply circuit, only the square wave half period AC output of the polarity which had the load voltage of the larger magnitude of when the half-wave discharge was detected.

25. The lamp lighting device of claim 21, wherein the start facilitation control involves controlling the power supply circuit such that a supply current is increased only with respect to the polarity which had the load voltage of the larger magnitude when the half-wave discharge was detected.

26. The lamp lighting device of claim 15, wherein, the half-wave discharge detection circuit detects a half-wave discharge has occurred, when the control circuit extinguishes the high pressure discharge lamp for a predetermined period including at least the square wave half period of the polarity which had the load voltage of the smaller magnitude when half-wave discharge was detected.

27. The lamp lighting device of claim 26, wherein, the half-wave discharge detection circuit detects the half-wave discharge, when the control circuit stops power supply to the high pressure discharge lamp for one square wave half period, starting from the end of the square wave half period of the polarity having the load voltage of the larger magnitude.

28. The lamp lighting device of claim 26, wherein, the half-wave discharge detection circuit detects the half-wave discharge, when the control circuit stops power supply to the high pressure discharge lamp during two square wave half periods.

29. The lamp lighting device of claim 15, wherein the control circuit performs half-wave improvement control when restarting the lamp, the half-wave improvement control being carried out during or right before the square wave half period of the polarity which had the load voltage of the larger magnitude when the half-wave discharge was detected.

30. The lamp lighting device of claim 29, wherein the half-wave improvement control restart involves applying, by the starting circuit, the high voltage output for the lamp startup only to the polarity which had the load voltage of the larger magnitude when the half-wave discharge was detected.

31. The lamp lighting device of claim 29, wherein the half-wave improvement control involves setting a number of operation periods, each operation period including a period of applying the high voltage output for the lamp startup and a period of supplying power during the square wave half period of the polarity which had the load voltage of the larger magnitude when the half-wave discharge was detected.

32. The lamp lighting device of claim 29, wherein the half-wave improvement control involves increasing, by the power supply circuit, the length of only the square wave half period of the polarity which had the load voltage of the larger magnitude when the half-wave discharge was detected for a predetermined period.

33. The lamp lighting device of claim 29, wherein the half-wave improvement control involves controlling, for a predetermined period, the power supply circuit to increase a supply current only with respect to the polarity which had the load voltage of the larger magnitude when the half-wave discharge was detected.

34. The lamp lighting device of claim 29, wherein the half-wave improvement control involves controlling, for a predetermined period, an output voltage of the power supply circuit be increased only with respect to the polarity which had the load voltage of the larger magnitude when the half-wave discharge was detected.

35. The lamp lighting device of claim 34, wherein a DC output voltage of the DC power source circuit is raised to raise the output voltage of the power supply circuit.

36. The lamp lighting device of claim 15, wherein the control circuit performs a half-wave improvement control when restarting the lamp, the half-wave improvement control being carried out during the square wave half period of the polarity which had the load voltage of the smaller magnitude when the half-wave discharge was detected.

37. The lamp lighting device of claim 36, wherein the half-wave improvement control involves controlling, for a predetermined period, the power supply circuit to decrease only the square wave half period of the polarity which had the load voltage of the smaller magnitude when the half-wave discharge was detected.

38. The lamp lighting device of claim 36, wherein the half-wave improvement control involves controlling, for a predetermined period, the power supply circuit to decrease a supply current only with respect to the polarity which had the load voltage of the smaller magnitude when the half-wave discharge was detected.

39. The lamp lighting device of claim 36, wherein the half-wave improvement control involves controlling, for a predetermined period, an output voltage of the power supply circuit to be decreased only with respect to the polarity which had the load voltage of the smaller magnitude when the half-wave discharge was detected.

40. The lamp lighting device of claim 39, wherein a DC output voltage of the DC power source circuit is decreased to decrease the output voltage of the power supply circuit.

41. The lamp lighting device of claim 15, wherein while performing the half-wave improvement control a square wave AC output frequency of the power supply circuit is controlled, for a predetermined period, to be higher than that during detecting the half-wave discharge.

42. A luminaire comprising the lamp lighting device of claim 15.

* * * * *

UNITED STATES PATENT AND TRADEMARK OFFICE
CERTIFICATE OF CORRECTION

PATENT NO.        : 8,115,405 B2                                Page 1 of 1
APPLICATION NO.   : 12/585773
DATED             : February 14, 2012
INVENTOR(S)       : Daisuke Yamahara et al.

It is certified that error appears in the above-identified patent and that said Letters Patent is hereby corrected as shown below:

Please correct Col. 38, lines 18-35; claims 26-28, as follows:

26. The lamp lighting device of claim 15, wherein, <u>when</u> the half-wave discharge detection circuit detects [a] <u>the</u> half-wave discharge [has occurred], [when] the control circuit extinguishes the high pressure discharge lamp for a predetermined period including at least the square wave half period of the polarity which had the load voltage of the smaller magnitude when half-wave discharge was detected.

27. The lamp lighting device of claim 26, wherein, <u>when</u> the half-wave discharge detection circuit detects the half-wave discharge, [when] the control circuit stops power supply to the high pressure discharge lamp for one square wave half period, starting from the end of the square wave half period of the polarity having the load voltage of the larger magnitude.

28. The lamp lighting device of claim 26, wherein, <u>when</u> the half-wave discharge detection circuit detects the half-wave discharge, [when] the control circuit stops power, supply to the high pressure discharge lamp during two square wave half periods.

Signed and Sealed this
Twenty-fourth Day of July, 2012

David J. Kappos
*Director of the United States Patent and Trademark Office*